(12) United States Patent
Swager et al.

(10) Patent No.: US 11,472,915 B2
(45) Date of Patent: Oct. 18, 2022

(54) POROUS COMPOSITIONS AND RELATED METHODS

(71) Applicant: Massachusetts Institute of Technology, Cambridge, MA (US)

(72) Inventors: Timothy M. Swager, Newton, MA (US); Yuan He, Cambridge, MA (US); Zachary Smith, Belmont, MA (US); Sharon Lin, Somerville, MA (US); Francesco Maria Benedetti, Urbania (IT)

(73) Assignee: Massachusetts Institute of Technology, Cambridge, MA (US)

( * ) Notice: Subject to any disclaimer, the term of this patent is extended or adjusted under 35 U.S.C. 154(b) by 600 days.

(21) Appl. No.: 16/435,397

(22) Filed: Jun. 7, 2019

(65) Prior Publication Data
US 2019/0375887 A1 Dec. 12, 2019

Related U.S. Application Data

(60) Provisional application No. 62/812,549, filed on Mar. 1, 2019, provisional application No. 62/682,676, filed on Jun. 8, 2018.

(51) Int. Cl.
*C08G 61/08* (2006.01)
*B01D 71/44* (2006.01)
(Continued)

(52) U.S. Cl.
CPC ........... *C08G 61/08* (2013.01); *B01D 53/228* (2013.01); *B01D 71/28* (2013.01); *B01D 71/44* (2013.01);
(Continued)

(58) Field of Classification Search
CPC ..................... C08G 61/08; C08G 2261/148
See application file for complete search history.

(56) References Cited

U.S. PATENT DOCUMENTS 6,783,814 B2 * 8/2004 Swager .................. C09K 11/06
349/1
7,041,910 B2 * 5/2006 Swager .................. C09K 11/06
349/1
(Continued)

FOREIGN PATENT DOCUMENTS

WO       WO 02/16463 A2       2/2002

OTHER PUBLICATIONS

Zhao, Y.; He, Y.; Swager, T.M. ACS Macro Lett. Mar. 20, 2018, 7(3), 300-304. (Year: 2018).*
(Continued)

*Primary Examiner* — Rip A Lee
(74) *Attorney, Agent, or Firm* — Wolf, Greenfield & Sacks, P.C.

(57) ABSTRACT

Porous compositions such as flexible polymers with side chain porosity are generally provided. In some embodiments, the composition comprises a flexible polymer backbone and a plurality of rigid side chains. In some embodiments, the rigid side chains form pores. In some embodiments, the rigid side chains may comprise two or more [2.2.2] bicyclic cores (e.g., formed by a ring opening metathesis polymerization. The compounds and methods described herein may be useful in various applications including, for example, gas separation.

12 Claims, 50 Drawing Sheets

(51) Int. Cl.
 B01D 71/28 (2006.01)
 B01D 53/22 (2006.01)
(52) U.S. Cl.
 CPC ...... *B01D 2325/02* (2013.01); *B01D 2325/20* (2013.01); *C08G 2261/3324* (2013.01); *C08G 2261/3325* (2013.01)

(56) References Cited

U.S. PATENT DOCUMENTS

| | | | | |
|---|---|---|---|---|
| 7,208,122 | B2* | 4/2007 | Swager | C08L 101/12 528/392 |
| 7,494,698 | B2* | 2/2009 | Swager | H01L 51/0044 349/1 |
| 8,283,423 | B2* | 10/2012 | Swager | C08G 61/02 526/284 |
| 8,617,819 | B2* | 12/2013 | Swager | G01N 33/542 435/7.1 |
| 8,802,447 | B2* | 8/2014 | Swager | G01N 33/442 436/524 |
| 8,847,068 | B2* | 9/2014 | Swager | H01L 51/4253 252/511 |
| 9,156,938 | B2* | 10/2015 | Swager | A61B 5/1468 |
| 10,160,715 | B2 | 12/2018 | Swager et al. | |
| 11,109,619 | B2* | 9/2021 | Swager | B01J 20/3255 |
| 2002/0150697 | A1 | 10/2002 | Swager et al. | |

OTHER PUBLICATIONS

EP 19816024.4, Feb. 1, 2022, Extended European Search Report.
International Search Report and Written Opinion dated Aug. 1, 2019, for Application No. PCT/US2019/035968.
Zhao et al., Porous Organic Polymers via Ring Opening Metathesis Polymerization. ACS Macro Lett. Mar. 20, 2018;7(3):300-304. Epub Feb. 15, 2018, 6 pages.
International Preliminary Report on Patentability for International Application No. PCT/US2019/035968, dated Dec. 17, 2020.
Adewole et al., Current challenges in membrane separation of CO2 from natural gas: A review. International Journal of Greenhouse Gas Control. Sep. 2013;17:46-65. Epub May 21, 2013.
Alaslai et al., Pure- and mixed-gas permeation properties of highly selective and plasticization resistant hydroxyl-diamine-based 6FDA polyimides for CO2/CH4 separation. Journal of Membrane Science. May 1, 2016;505:100-7. Epub Jan. 5, 2016.
Benedetti et al., 527435: Side Chain Rigidity and Backbone Flexibility: New Microporous Polymers for Gas Separations. North American Membrane Society. Abstract. Jun. 11, 2018. 4 pages.
Bernardo et al., Effect of physical aging on the gas transport and sorption in PIM-1 membranes. Polymer. Mar. 24, 2017;113:283-94. Epub Oct. 20, 2016.
Bezzu et al., A Spirobifluorene-Based Polymer of Intrinsic Microporosity with Improved Performance for Gas Separation. Advanced Materials. Nov. 20, 2012;24(44):5930-3. Epub Sep. 7, 2012.
Bielawski et al., Living ring-opening metathesis polymerization. Progress in Polymer Science. Jan. 2007;32(1):1-29. Epub Oct. 10, 2006.
Bos et al., CO2-induced plasticization phenomena in glassy polymers. Journal of Membrane Science. Mar. 31, 1999;155(1):67-78.
Bos et al., Plasticization-resistant glassy polyimide membranes for CO2/CO4 separations. Separation and Purification Technology. Aug. 27, 1998;14(1-3):27-39. Epub Dec. 9, 1998.
Brunauer et al., Adsorption of Gases in Multimolecular Layers. J. Am. Chem. Soc. 1938;60(2):309-19.
Budd et al., Gas permeation parameters and other physicochemical properties of a polymer of intrinsic microporosity: Polybenzodioxane PIM-1. Journal of Membrane Science. Dec. 1, 2008;325(2):851-60. Epub Sep. 16, 2008.
Budd et al., Gas separation membranes from polymers of intrinsic microporosity. Journal of Membrane Science. Apr. 1, 2005;251(1-2):263-9.
Budd et al., Polymers of intrinsic microporosity (PIMs): robust, solution-processable, organic nanoporous materials. Chemical Communications. 2004:230-1. Epub Dec. 5, 2003.
Carta et al., An Efficient Polymer Molecular Sieve for Membrane Gas Separations. Science. Jan. 18, 2013;339(6117):303-7.
Carta et al., Triptycene induced enhancement of membrane gas selectivity for microporous Tröger's base polymers. Adv Mater. Jun. 4, 2014;26(21):3526-31. doi: 10.1002/adma.201305783. Epub Mar. 14, 2014.
Chiou et al., Plasticization of glassy polymers by CO2. Journal of Applied Polymer Science. Jun. 1985;30(6):2633-42.
Chiou et al., Sorption and transport of inert gases in PVF2/PMMA blends. Journal of Applied Polymer Science. Oct. 1986;32(5):4793-814.
Coleman et al., Conditioning of Fluorine-Containing Polyimides. 2. Effect of Conditioning Protocol at 8 Volume Dilation on Gas-Transport Properties. Macromolecules. 1999;32(9):3106-13. Epub Apr. 9, 1999.
Dhara et al., Fluorinated high-performance polymers: Poly(arylene ether)s and aromatic polyimides containing trifluoromethyl groups. Progress in Polymer Science. 2010;35(8):1022-77.
Doris et al., Understanding and controlling the chemical evolution and polysulfide-blocking ability of lithium-sulfur battery membranes cast from polymers of intrinsic microporosity. Journal of Materials Chemistry A. 2016;4:16946-52. Epub Oct. 14, 2016.
Du et al., Decarboxylation-Induced Cross-Linking of Polymers of Intrinsic Microporosity (PIMs) for Membrane Gas Separation. Macromolecules. 2012;45(12):5134-9. Epub Jun. 11, 2012.
Du et al., Polymer nanosieve membranes for CO2-capture applications. Nat Mater. May 2011;10(5):372-5. doi: 10.1038/nmat2989. Epub Apr. 3, 2011.
Fraga et al., A novel time lag method for the analysis of mixed gas diffusion in polymeric membranes by on-line mass spectrometry: Method development and validation. Journal of Membrane Science. Sep. 1, 2018;561:39-58. Epub Apr. 24, 2018.
Freeman et al., Basis of Permeability/Selectivity Tradeoff Relations in Polymeric Gas Separation Membranes. Macromolecules. 1999;32(2):375-80. Epub Jan. 5, 1999.
Galizia et al., 50th Anniversary Perspective: Polymers and Mixed Matrix Membranes for Gas and Vapor Separation: A Review and Prospective Opportunities. Macromolecules. 2017;50(20):7809-43. Epub Oct. 3, 2017.
Garrido et al., Determination of Gas Transport Coefficients of Mixed Gases in 6FDA-TMPDA Polyimide by NMR Spectroscopy. Macromolecules. 2017;50(9):3590-7. Epub Apr. 18, 2017.
Gleason et al., Pure- and mixed-gas permeation of CO2 and CH4 in thermally rearranged polymers based on 3,3'-dihydroxy-4,4'-diaminobiphenyl (HAB) and 2,2'-bis-(3,4-dicarboxyphenyl) hexafluoropropane dianhydride (6FDA). Journal of Membrane Science. Feb. 1, 2015;475:204-14. Epub Oct. 19, 2014.
Gomes et al., Interactions of Carbon Dioxide with Liquid Fluorocarbons. J. Phys. Chem. B. 2003;107(50):14020-4. Epub Nov. 21, 2003.
Halgren, Merck molecular force field. I. Basis, form, scope, parameterization, and performance of MMFH94. Journal of Computational Chemistry. Apr. 1996;17(5-6):490-519.
Halgren, Merck molecular force field. II. MMFH94 van der Waals and electrostatic parameters for intermolecular interactions. Journal of Computational Chemistry. Apr. 1996;17(5-6):520-52.
Halgren, Merck molecular force field. III. Molecular geometries and vibrational frequencies for MMHH94. Journal of Computational Chemistry. Apr. 1996;17(5-6):553-86.
Hanwell et al., Avogadro: an advanced semantic chemical editor, visualization, and analysis platform. J Cheminform. Aug. 13, 2012;4(1):17. doi: 10.1186/1758-2946-4-17. 17 pages.
Hellums et al., Fluorinated polycarbonates for gas separation applications. Journal of Membrane Science. Sep. 1989;46(1):93-112.
Hill et al., Influence of methanol conditioning and physical aging on carbon spin-lattice relaxation times of poly(1-trimethylsilyl-1-propyne). Journal of Membrane Science. Nov. 1, 2004;243(1-2):37-44. Epub Jul. 31, 2004.

(56) References Cited

OTHER PUBLICATIONS

Horn et al., Carbon dioxide plasticization and conditioning effects in thick vs. thin glassy polymer films. Polymer. 2011;52:1619-27. Epub Feb. 12, 2011.

Horn et al., Carbon dioxide plasticization of thin glassy polymer films. Polymer. Nov. 10, 2011;52(24):5587-94. Epub Oct. 6, 2011.

Huang et al., Effect of Temperature on Physical Aging of Thin Glassy Polymer Films. Macromolecules. 2005;38(24): 10148-54. Epub Oct. 28, 2005.

Huang et al., Physical aging of thin glassy polymer films monitored by gas permeability. Polymer. Nov. 2004;45(25):8377-93. Epub Nov. 5, 2004.

Jordan et al., Permeability of carbon dioxide at elevated pressures in substituted polycarbonates. Journal of Polymer Science Part B: Polymer Physics. Nov. 1990;28(12):2305-27.

Kim et al., Physical aging of thin 6FDA-based polyimide membranes containing carboxyl acid groups. Part I. Transport properties. Polymer. Apr. 2006;47(9):3094-103.

Kim et al., Physical aging of thin 6FDA-based polyimide membranes containing carboxyl acid groups. Part II. Optical Properties. Polymer. Apr. 2006;47(9):3104-111.

Kratochvil et al., Decarboxylation-Induced Cross-Linking of a Polyimide for Enhanced CO2 Plasticization Resistance. Macromolecules. 2008;41(21):7920-7. Epub Oct. 15, 2008.

Li et al., Gas sorption and permeation in PIM-1. Journal of Membrane Science. Apr. 1, 2013;432:50-7. Epub Jan. 14, 2013.

Li et al., Polysulfide-Blocking Microporous Polymer Membrane Tailored for Hybrid Li-Sulfur Flow Batteries. Nano Lett. 2015;15(9):5724-9. Epub Aug. 3, 2015.

Lin, Integrated membrane material and process development for gas separation. Current Opinion in Chemical Engineering. May 2014;4:54-61. Epub Feb. 22, 2014.

Liu et al., Efficient Synthesis of Rigid Ladder Polymers via Palladium Catalyzed Annulation. J. Am. Chem. Soc. 2014;136(50):17434-7. Epub Nov. 25, 2014.

Long et al., Molecular Design of Free Volume as a Route to Low-k Dielectric Materials. J. Am. Chem. Soc. 2003;125(46):14113-9. Epub Oct. 17, 2003.

Low et al., Gas Permeation Properties, Physical Aging, and Its Mitigation in High Free Volume Glassy Polymers. Chem Rev. Jun. 27, 2018;118(12):5871-5911. doi: 10.1021/acs.chemrev.7b00629. Epub May 8, 2018.

Mason et al., Polymer of Intrinsic Microporosity Incorporating Thioamide Functionality: Preparation and Gas Transport Properties. Macromolecules. 2011;44(16):6471-9. Epub Jul. 27, 2011.

McKeown et al., Polymers of intrinsic microporosity (PIMs): organic materials for membrane separations, heterogeneous catalysis and hydrogen storage. Chemical Society Reviews. 2006;35:675-83. Epub Mar. 17, 2006.

Merkel et al., Mixed-gas permeation of syngas components in poly(dimethylsiloxane) and poly(1-trimethylsilyl-1-propyne) at elevated temperatures. Journal of Membrane Science. Sep. 30, 2001;191(1-2):85-94.

Peng et al., A New Two-Constant Equation of State. Ind. Eng. Chem., Fundam. 1976;15(1):59-64.

Qiu et al., Sub-Tg Cross-Linking of a Polyimide Membrane for Enhanced CO2 Plasticization Resistance for Natural Gas Separation. Macromolecules. 2011;44(15):6046-56. Epub Jul. 13, 2011.

Robeson et al., Analysis of the transport properties of thermally rearranged (TR) polymers and polymers of intrinsic microporosity (PIM) relative to upper bound performance. Journal of Membrane Science. Mar. 1, 2017;525:18-24. Epub Dec. 2, 2016.

Robeson et al., Contributions of diffusion and solubility selectivity to the upper bound analysis for glassy gas separation membranes. Journal of Membrane Science. Mar. 1, 2014;453:71-83. Epub Nov. 4, 2013.

Robeson, Correlation of separation factor versus permeability for polymeric membranes. Journal of Membrane Science. Oct. 1, 1991;62(2):165-85.

Robeson, The upper bound revisited. Journal of Membrane Science. Jul. 15, 2008;320(1-2):390-400. Epub Apr. 22, 2008.

Rogan et al., Synthesis and gas permeation properties of novel spirobisindane-based polyimides of intrinsic microporosity. Polym. Chem. 2013;4:3813-20. Epub May 17, 2013.

Rose et al., Polymer ultrapermeability from the inefficient packing of 2D chains. Nat Mater. Sep. 2017;16(9):932-937. doi: 10.1038/nmat4939. Epub Jul. 31, 2017.

Sanders et al., Energy-efficient polymeric gas separation membranes for a sustainable future: A review. Polymer. Aug. 16, 2013;54(18):4729-61. Epub Jul. 4, 2013.

Srinivasan et al., Elucidating the mechanism(s) of gas transport in poly[1-(trimethylsilyl)-1-propyne] (PTMSP) membranes. Journal of Membrane Science. Jan. 27, 1994;86(1-2):67-86.

Stern et al., Polymers for gas separations: the next decade. Journal of Membrane Science. Sep. 1994;94(1):1-65.

Struik, Physical aging in plastics and other glassy materials. Polymer Engineering and Science. Mar. 1977; 17(3):165-73.

Swaidan et al., Physical Aging, Plasticization and Their Effects on Gas Permeation in "Rigid" Polymers of Intrinsic Microporosity. Macromolecules. 2015;48(18):6553-61. Epub Aug. 29, 2015.

Swaidan et al., Pure- and mixed-gas CO2/CH4 separation properties of PIM-1 and an amidoxime-functionalized PIM-1. Journal of Membrane Science. May 1, 2014;457:95-102. Epub Feb. 3, 2014.

Swaidan et al., Role of Intrachain Rigidity in the Plasticization of Intrinsically Microporous Triptycene-Based Polyimide Membranes in Mixed-Gas CO2/CH4 Separations. Macromolecules. 2014;47(21):7453-62. Epub Oct. 22, 2014.

Tiwari et al., Gas permeation in thin films of "high free-volume" glassy perfluoropolymers: Part I. Physical Aging. Polymer. 2014;55:5788-800. Epub Sep. 19, 2014.

Tiwari et al., Gas permeation in thin films of "high free-volume" glassy perfluoropolymers: Part II. CO2 plasticization and sorption. Polymer. Mar. 20, 2015;61:1-14. Epub Dec. 15, 2014.

Tiwari et al., Physical aging, CO2 sorption and plasticization in thin films of polymer with intrinsic microporosity (PIM-1). Journal of Membrane Science. Sep. 1, 2017;537:362-71. Epub May 2, 2017.

Vopička et al., Mixed gas sorption in glassy polymeric membranes: I. CO2/CH4 and n-C4/CH4 mixtures sorption in poly(1-trimethylsilyl-1-propyne) (PTMSP). Journal of Membrane Science. 2014;449:97-108. Epub Aug. 28, 2013.

Vopička et al., Mixed gas sorption in glassy polymeric membranes: II. CO2/CH4 mixtures in a polymer of intrinsic microporosity (PIM-1). Journal of Membrane Science. Jun. 1, 2014;459:264-76. Epub Feb. 11, 2014.

Wang et al., Advances in high permeability polymer-based membrane materials for CO2 separations. Energy & Environmental Science. 2016;9:1863-90. Epub Apr. 5, 2016.

Wiederhorn et al., Mechanical Properties. In: Czichos H., Saito T., Smith L. (eds) Springer Handbook of Materials Measurement Methods. Springer Handbooks. Springer, Berlin, Heidelberg. 2006:283-397.

Wiegand et al., Synthesis and characterization of triptycene-based polyimides with tunable high fractional free volume for gas separation membranes. J. Mater. Chem. A. 2014;2:13309-20. Epub Jun. 13, 2014.

Wijmans et al., The solution-diffusion model: a review. Journal of Membrane Science. Nov. 15, 1995;107(1-2):1-21.

Wind et al., The Effects of Crosslinking Chemistry on CO2 Plasticization of Polyimide Gas Separation Membranes. Ind. Eng. Chem. Res. 2002;41(24):6139-48. Epub Oct. 30, 2002.

Yampolskii, Polymeric Gas Separation Membranes. Macromolecules. 2012;45(8):3298-311. Epub Mar. 28, 2012.

Zhang et al., Post-crosslinking of triptycene-based Tröger's base polymers with enhanced natural gas separation performance. Journal of Membrane Science. Jun. 15, 2018;556:277-84. Epub Apr. 9, 2018.

PCT/US2019/035968, Aug. 1, 2019, International Search Report and Written Opinion.

Extended European Search Report for EP Application No. 19816024.4, dated Feb. 1, 2022.

(56) References Cited

OTHER PUBLICATIONS

Alentiev et al., Microporous Materials Based on Norbornadiene-Based Cross-Linked Polymers. Polymers. Dec. 13, 2018;10(12):1382. 16 pages.

* cited by examiner a)

b)

c)

POROUS COMPOSITIONS AND RELATED METHODS

RELATED APPLICATIONS

This application claims priority under 35 U.S.C. § 119(e) to U.S. Provisional Patent Application Ser. No. 62/682,676, filed Jun. 8, 2018, entitled "SIDE CHAIN RIGIDITY AND BACKBONE FLEXIBILITY: NEW MICROPOROUS POLYMERS FOR GAS SEPARATION," and to U.S. Provisional Patent Application Ser. No. 62/812,549, filed Mar. 1, 2019, entitled "POROUS COMPOSITIONS AND RELATED METHODS," each of which is incorporated herein by reference in its entirety for all purposes.

STATEMENT OF GOVERNMENT SUPPORT

This invention was made with government support under DMR-1410718 awarded by the National Science Foundation (NSF), and under DE-SC0019087 awarded by the Department of Energy (DOE). The government has certain rights in the invention.

FIELD OF THE INVENTION

This invention generally relates to porous compositions such as flexible polymers with side chain porosity for, for example, gas-phase separation.

BACKGROUND OF THE INVENTION

Membranes are a promising platform technology for energy-efficient chemical separations. Unlike other separation processes, membranes do not generally require thermal regeneration, phase changes, or moving parts. Exemplary membrane applications include natural gas purification, hydrogen separations, air separation, and $CO_2$ capture from flue gas.

Over the past decade, polymers of intrinsic microporosity (PIMs) have been used for gas separations. Their rigid and contorted backbone structures provide separation performance for a variety of separations (e.g., $CO_2/N_2$, $CO_2/CH_4$, $O_2/N_2$, and $H_2/CH_4$). However, such polymers often suffer from drawbacks such as plasticization and physical aging.

As such, improved materials and approaches are needed.

SUMMARY OF THE INVENTION

The present invention generally relates to porous compositions such as flexible polymers with side chain porosity for, for example, gas-phase separation.

In one aspect, compositions are provided. In some embodiments, the composition comprises a flexible polymer backbone and a plurality of rigid side chains associated with the flexible polymer backbone, each rigid side chain comprising a bridged bicyclic-based compound comprising two or more [2.2.2] bicyclic cores, wherein the composition is porous.

In some embodiments, the composition exhibits a $CO_2$ plasticization pressure of greater than or equal to 50 bar.

In some embodiments, the composition has a gas permeability to $CO_2$ of greater than or equal to 20000 Barrer.

In some embodiments, the composition has a gas permeability to $H_2$ of greater than or equal to 8000 Barrer.

In some embodiments, the composition has a BET internal surface area of greater than or equal to 100 $m^2g^{-1}$.

In some embodiments, the flexible polymer backbone comprises poly(norbenzene).

In some embodiments, at least one of the two or more [2.2.2] bicyclic cores has the following structure:

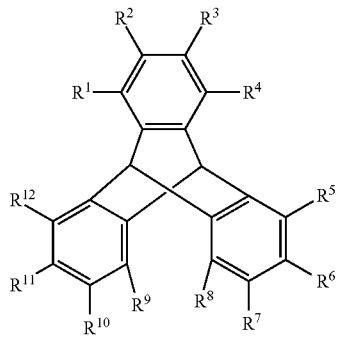

wherein:

$R^1$-$R^{12}$ can be the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or, any two adjacent groups of $R^1$-$R^{12}$ can be joined together to form an optionally substituted ring.

In some embodiments, at least a portion of pores present in the composition have a pore size of greater than or equal to 40 nm.

In some embodiments, the bridged bicyclic-based compound is an oligoiptycene.

In some embodiments, the bridged bicyclic-based compound has a structure as in:

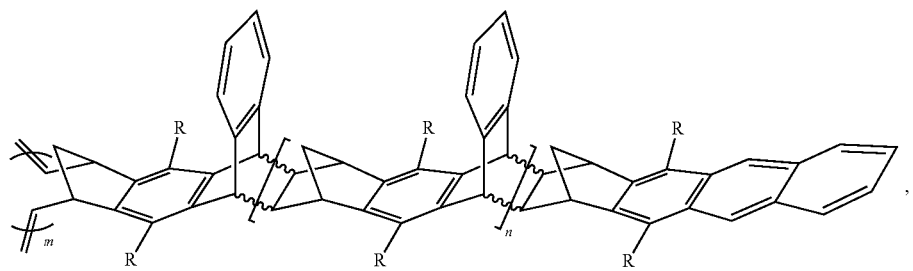

wherein:
   each R can be the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or can be joined together to form an optionally substituted ring,
   m is an integer and is at least 1, and
   n is an integer and is at least 1.

In some embodiments, each R is $CF_3$ or OMe.

In another aspect, articles such as membranes configured for gas separation are provided. In some embodiments, the membrane comprises an article as described herein.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

(FIGS. 14B-14C) TGA of different $CF_3$-ROMP and OMe-ROMP samples, respectively, treated following different procedures: (B), (D), and (E), according to one set of embodiments;

(FIG. 15A) permeability, (FIG. 15B) diffusion coefficient, (FIG. 15C) solubility coefficient, and (FIG. 15D) permselectivity, according to one set of embodiments;

FIGS. 29A-29C show plots of fugacity-based $CO_2$ plasticization curves for liquid ethanol treated samples: (FIG. 29A) $CF_3$-ROMP aged 2100 h, (FIG. 29B) OMe-ROMP aged 300 h, and (FIG. 29C) PIM-1 aged 2000 h, according to one set of embodiments;

(FIG. 30A) treatment (E), (FIG. 30B) treatment (F), and (FIG. 30C) treatment (G), according to one set of embodiments, Gray dots are data from the Robeson database;

DETAILED DESCRIPTION OF THE INVENTION

Porous compositions such as flexible polymers with side chain porosity are generally provided. In some embodiments, the composition comprises a flexible polymer backbone and a plurality of rigid side chains. In some embodiments, the rigid side chains form pores. In some embodiments, the rigid side chains may comprise two or more [2.2.2] bicyclic cores (e.g., formed by a ring opening metathesis polymerization. The compounds and methods described herein may be useful in various applications including, for example, gas separation.

Advantageously, the compositions described herein may be flexible, ultrapermeable, and/or plasticization resistant. In some embodiments, the compositions described herein may exhibit slower rates of physical aging as compared to traditional porous polymers such as polymers of intrinsic microporosity (PIMs).

Figure 1A:
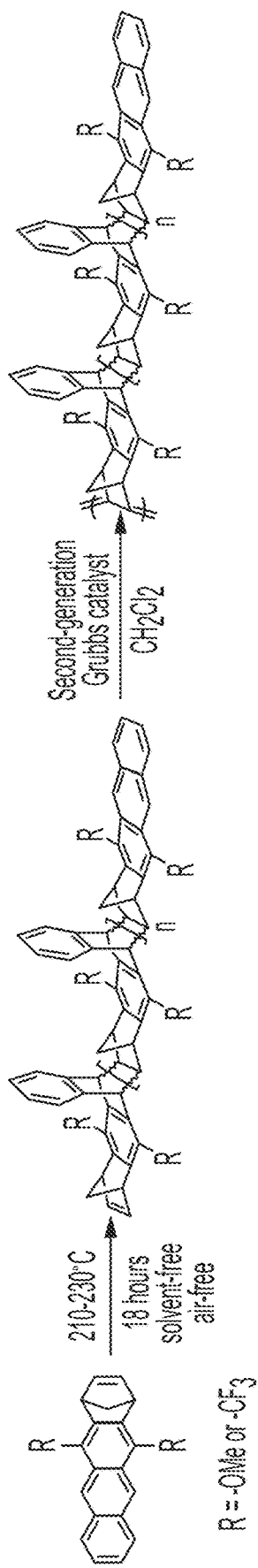
FIG. 1A is an exemplary schematic of a generalized synthetic procedure for $CF_3$-ROMP and OMe-ROMP, as shown in FIG. 1B, according to one set of embodiments.
Figure 1B:
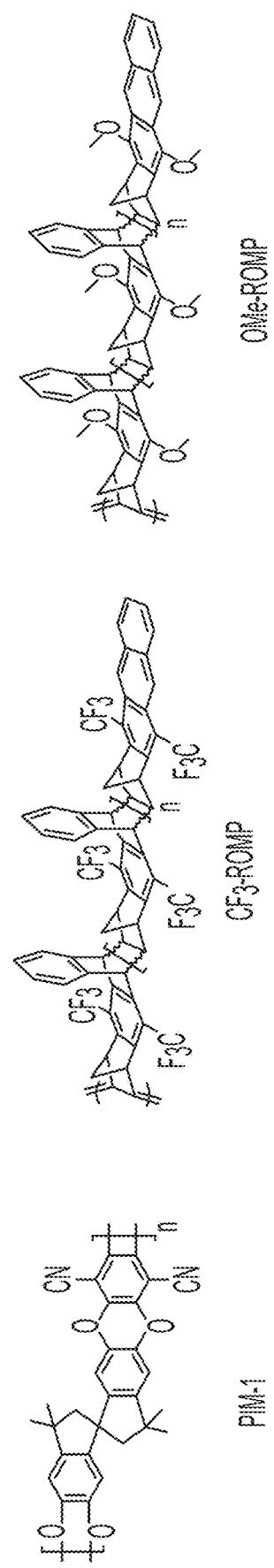
FIG. 1B shows the molecular structures of PIM-1, $CF_3$-ROMP, and OMe-ROMP, according to one set of embodiments.
Figure 1C:
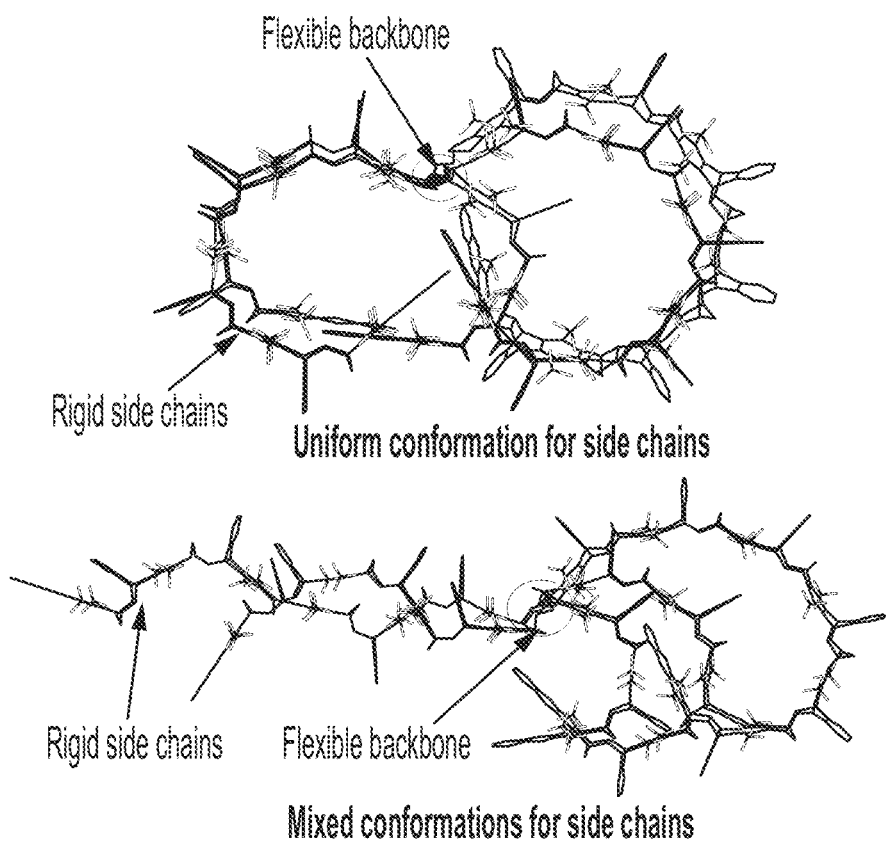
FIG. 1C is a top-view schematic representation of $CF_3$-ROMP with 5 repeating units having a uniform or mixed conformation for side chains, according to one set of embodiments.
Figure 1D:
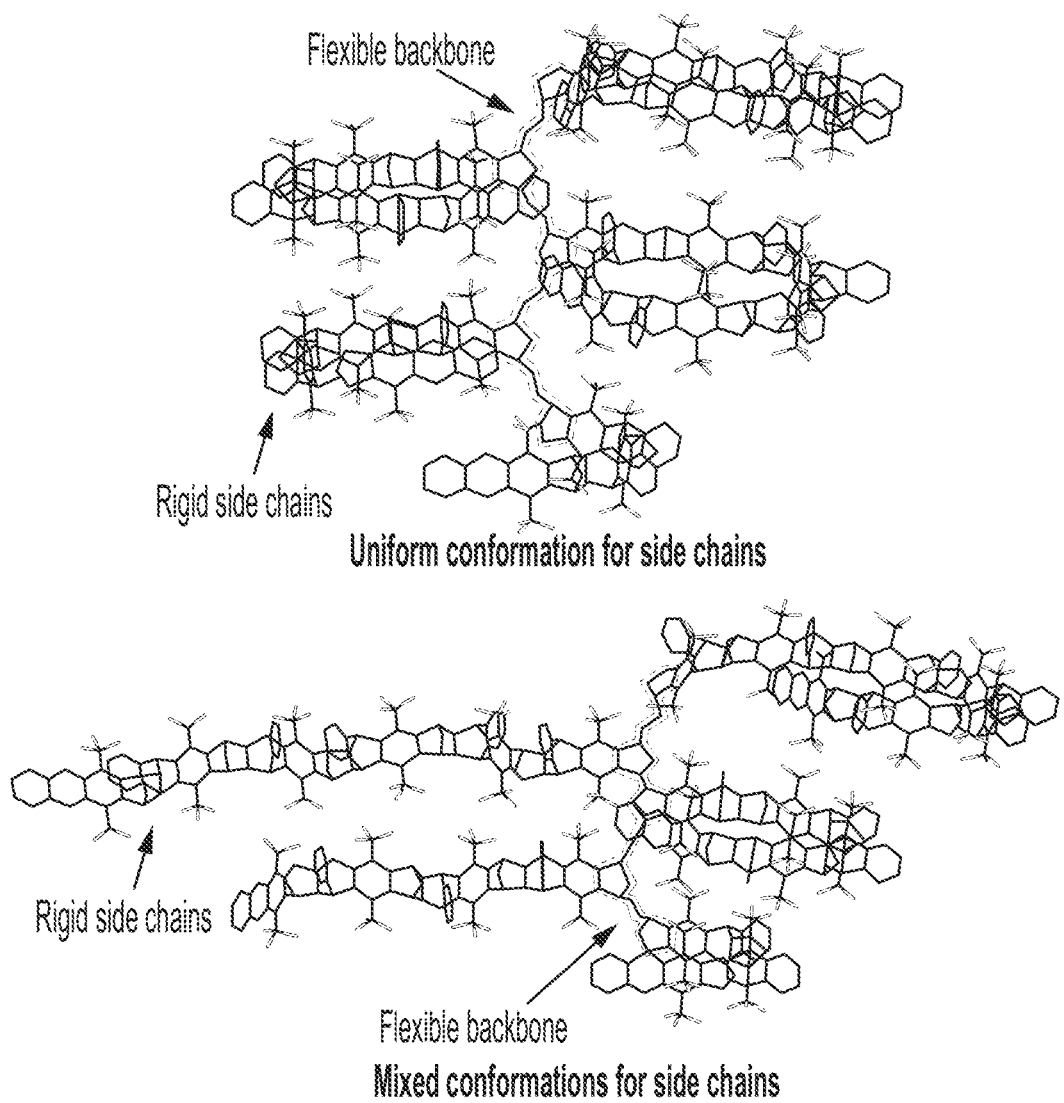
FIG. 1D is a side-view schematic representation of $CF_3$-ROMP with 5 repeating units having a uniform or mixed conformation for side chains, according to one set of embodiments.
Figure 1E:
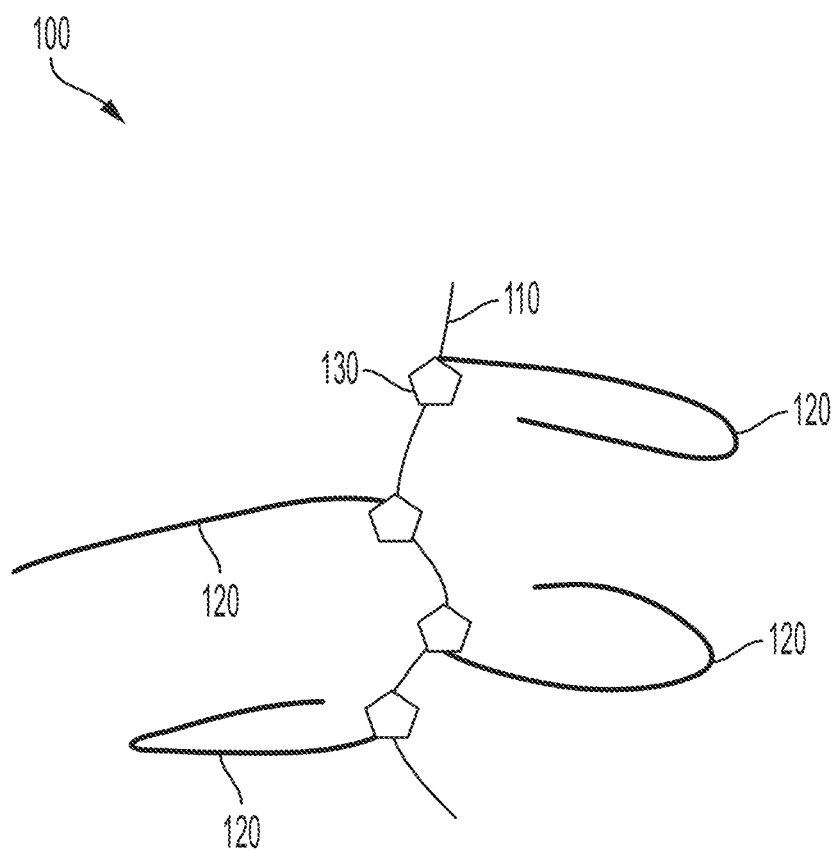
FIG. 1E is a schematic illustration of an exemplary composition comprising a flexible backbone and a plurality of rigid side chains, according to one set of embodiments.

As illustrated in FIG. 1E, composition 100 comprises a flexible backbone 110 and a plurality of rigid side chains 120, associated with the flexible backbone 110. In some embodiments, rigid side chains 120 are associated with the flexible backbone via formation of one or more bonds (e.g., one or more covalent bonds). In some embodiments, attachment point 130 between flexible backbone 110 and rigid side chain 120 comprises an optionally substituted alicyclic group or optionally substituted aromatic group. While attachment point 130 is depicted in FIG. 1E as a cyclopentane group, those of ordinary skill in the art would understand based upon the teachings of this specification that other groups are also possible. Non-limiting examples of suitable optionally substituted alicyclic organics or optionally substituted aromatic groups include cyclopropane, cyclobutane, cyclopentane, cyclohexane, cyclobutadiene, benzene, naphthalene, anthracene, triphenylene, pyrene, triptycene, phenol, toluene, furan, thiophene, pyrrole, pyridine, pyran, quinoline, parazene, thianthrene, oxazine, thiazine, pyrimidine, piperazine, and thiine. Substituents on the aromatic rings include, but are not limited to, perfluoroalkanes, trifluoromethyl, ethers, esters, fluorides, chlorides, bromides, silicons, t-butyl, phenyls, polycyclic aromatics, thioethers, phenols, amines, alkynes, nitriles, and alkenes.

In some embodiments, the rigid side chains may comprise a bridged cyclic compound (e.g., a bridged bicyclic compound, a bridged tricyclic compound). For example, the bridged compounds described herein may, in some cases, comprise the structure as in Formula (I):

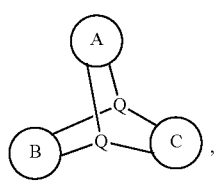

(I)

wherein A, B, and C are the same or different and at least two of A, B, and C include an aromatic hydrocarbon and Q is a tetrahedral bridgehead group. For example, in some embodiments, the bridged bicyclic compound is a [2.2.1] bridged bicyclic compound having a structure as in Formula (I) wherein A and B are the same or different and comprise an aromatic group, and C is oxygen, NR, or $CR_2$, where R is H or phenyl. In certain embodiments, the bridged bicyclic compound is a [2.2.2] bridged bicyclic compound having a structure as in Formula (I) wherein A, B, and C are the same or different and include aromatic groups. In some embodiments, Q is CH. In some embodiments Q is COH. In some embodiments, Q is Z wherein Z can be a halogen, ether, ester, carboxylate, or alkyl.

In some embodiment, the compositions described herein comprise a bridged bicyclic-based compound comprising two or more [2.2.2] bicyclic cores. For example, in some embodiments, at least one of A, B, and C are attached to a second bridged bicyclic compound. In certain embodiments, the bridged bicyclic-based compounds described herein may comprise a first bridged bicyclic compound bound to a second bridged bicyclic compounds, each bridged bicyclic compound comprising a structure as in Formula (I).

In some embodiments, at least one of the two or more [2.2.2] bicyclic cores has the following structure:

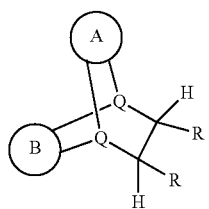

wherein each R can be the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or can be joined together to form an optionally substituted ring. Non-limiting examples of suitable [2.2.2] bicyclic cores include:

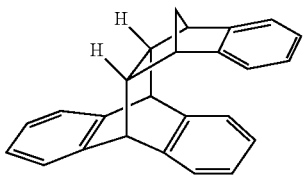

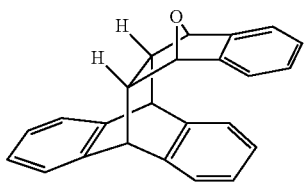

In some embodiments, at least one of the two or more [2.2.2] bicyclic cores has the following structure:

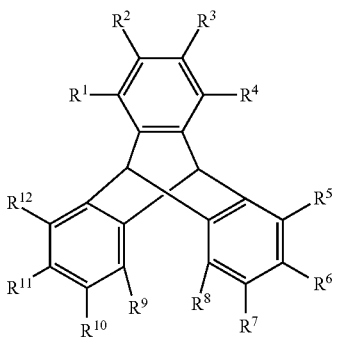

wherein:

$R^1$-$R^{12}$ can be the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or, any two adjacent groups of $R^1$-$R^{12}$ can be joined together to form an optionally substituted ring.

In some embodiments, the bridged bicyclic compound is a higher order polyiptcyene (e.g., an extended iptycene). In some such embodiments, the bridged bicyclic compound may have a structure as in:

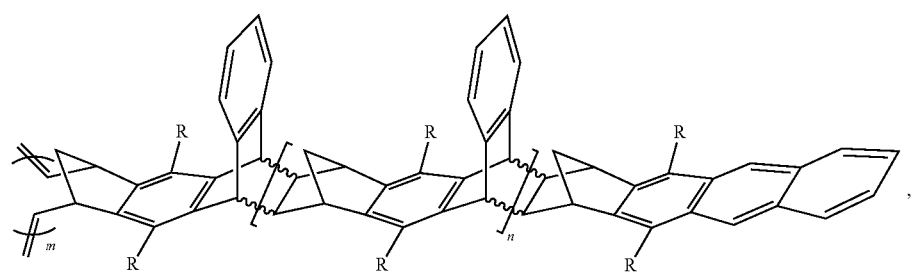

wherein each R can be the same or different and are hydrogen, halo, hydroxyl, amino, alkyl (e.g., $C_mH_{2m+1}$ where m is an integer and is at least 1), heteroalkyl, alkenyl, alkynyl, aryl, heteroaryl, heterocyclyl, or a carbonyl group, any of which is optionally substituted, or can be joined together to form an optionally substituted ring, m is an integer and is at least 1, and n is an integer and is at least 1.

In an exemplary set of embodiments, each R is $CF_3$. In another exemplary set of embodiments, each R is OMe.

In some embodiments, m is an integer and is at least 1. In certain embodiments, n ranges between about 1 and 100,000. For example, in some cases, n is at least about 2, at least about 10, at least about 100, at least about 1,000, at least about 10,000, at least about 20,000, at least about 50,000 or at least about 75,000. In some embodiments, n is less than or equal to about 100,000, less than or equal to about 75,000, less than or equal to about 50,000, less than or equal to about 20,000, less than or equal to about 10,000, less than or equal to about 1,000, less than or equal to about 100, or less than or equal to about 10. Combinations of the above-referenced ranges are also possible (e.g., between about 2 and about 1,000, between about 1 and about 100,000, between about 10,000 and about 100,000). Other ranges are also possible.

In some embodiments, n is an integer and is at least 1. In certain embodiments, n ranges between about 1 and 100,000. For example, in some cases, n is at least about 2, at least about 10, at least about 100, at least about 1,000, at least about 10,000, at least about 20,000, at least about 50,000 or at least about 75,000. In some embodiments, n is less than or equal to about 100,000, less than or equal to about 75,000, less than or equal to about 50,000, less than or equal to about 20,000, less than or equal to about 10,000, less than or equal to about 1,000, less than or equal to about 100, or less than or equal to about 10. Combinations of the above-referenced ranges are also possible (e.g., between about 2 and about 1,000, between about 1 and about 100,000, between about 10,000 and about 100,000). Other ranges are also possible.

In some embodiments, the composition exhibits a $CO_2$ plasticization pressure of greater than or equal to 50 bar. In some embodiments, the composition exhibits a $CO_2$ plasticization pressure of greater than or equal to 1 bar, greater than or equal to 5 bar, greater than or equal to 10 bar, greater than or equal to 25 bar, greater than or equal to 50 bar, greater than or equal to 60 bar, or greater than or equal to 65 bar. In some embodiments, the composition exhibits a $CO_2$ plasticization pressure of less than or equal to 70 bar, less than or equal to 65 bar, less than or equal to 60 bar, less than or equal to 50 bar, less than or equal to 25 bar, less than or equal to 10 bar, or less than or equal to 5 bar. Combinations of the above-referenced ranges are also possible (e.g., greater than or equal to 1 bar and less than or equal to 70 bar, greater than or equal to 50 bar and less than or equal to 70 bar). Other ranges are also possible. $CO_2$ plasticization pressure as described herein may be measured by, for example, increasing the pressure of $CO_2$ until the permeability of $CO_2$ is observed to increase in the composition.

In some embodiments, the composition has a gas permeability to $CO_2$ of greater than or equal to 20000 Barrer. In some embodiments, the gas permeability to $CO_2$ is greater than or equal to 20000 Barrer, greater than or equal to 25000 Barrer, greater than or equal to 30000 Barrer, greater than or equal to 35000 Barrer, greater than or equal to 40000 Barrer, greater than or equal to 50000 Barrer, greater than or equal to 60000 Barrer, greater than or equal to 70000 Barrer, greater than or equal to 80000 Barrer, or greater than or equal to 90000 Barrer. In some embodiments, the gas permeability to $CO_2$ is less than or equal to 100000 Barrer, less than or equal to 90000 Barrer, less than or equal to 80000 Barrer, less than or equal to 70000 Barrer, less than or equal to 60000 Barrer, less than or equal to 50000 Barrer, less than or equal to 40000 Barrer, less than or equal to 35000 Barrer, less than or equal to 30000 Barrer, or less than or equal to 25000 Barrer. Combinations of the above-referenced ranges are also possible (e.g., greater than or equal to 20000 Barrer and less than or equal to 100000 Barrer, greater than or equal to 35000 Barrer and less than or equal to 100000 Barrer, greater than or equal to 50000 Barrer and less than or equal to 100000 Barrer). Other ranges are also possible. $CO_2$ gas permeability may be determined, for example, using a constant volume-variable pressure method as described on pages 434-435 of Czichos, Horst, and Tetsuya Saito. *Springer handbook* of materials measurement methods. Ed. Leslie Smith. Vol. 978. Berlin: Springer, 2006, which is incorporated herein by reference for all purposes.

In some embodiments, the composition has a gas permeability to $H_2$ of greater than or equal to 8000 Barrer. In some embodiments, the gas permeability to $H_2$ is greater than or equal to 8000 Barrer, greater than or equal to 10000 Barrer, greater than or equal to 15000 Barrer, greater than or equal to 20000 Barrer, greater than or equal to 25000 Barrer, greater than or equal to 30000 Barrer, greater than or equal to 35000 Barrer, greater than or equal to 40000 Barrer, greater than or equal to 50000 Barrer, greater than or equal to 60000 Barrer, greater than or equal to 70000 Barrer, greater than or equal to 80000 Barrer, or greater than or equal to 90000 Barrer. In some embodiments, the gas permeability to $H_2$ is less than or equal to 100000 Barrer, less than or equal to 90000 Barrer, less than or equal to 80000 Barrer, less than or equal to 70000 Barrer, less than or equal to 60000 Barrer, less than or equal to 50000 Barrer, less than or equal to 40000 Barrer, less than or equal to 35000 Barrer, less than or equal to 30000 Barrer, less than or equal to 25000 Barrer, less than or equal to 20000 Barrer, less than or equal to 15000 Barrer, or less than or equal to 10000 Barrer. Combinations of the above-referenced ranges are also possible (e.g., greater than or equal to 8000 Barrer and less than or equal to 100000 Barrer, greater than or equal to 15000 Barrer and less than or equal to 100000 Barrer, greater than or equal to 50000 Barrer and less than or equal to 100000 Barrer). Other ranges are also possible. $H_2$ gas permeability may be determined, for example, using a constant volume-variable pressure method as described on pages 434-435 of Czichos, Horst, and Tetsuya Saito. *Springer handbook of materials measurement methods*. Ed. Leslie Smith. Vol. 978. Berlin: Springer, 2006, which is incorporated herein by reference for all purposes.

In some embodiments, the composition described herein may be formed via a ring-opening metathesis polymerization process.

In some embodiments, the core flexible backbone comprises a substituted poly(norbenene). Other flexible backbones are also possible. In some embodiments, a polymer having a flexible backbone exhibits an elongation of break of greater than or equal to 2%.

In some embodiments, the bridged bicyclic compound comprises a pore. For example, in some embodiments the composition is porous.

The composition may have a particular average pore size. For example, in some embodiments, the composition (e.g., a polymer comprising the bridged bicyclic-based compound) may have an average pore size of at least 2 nm, at least 3 nm, at least 4 nm, at least 5 nm, at least 10 nm, at least 20 nm, at least 30 nm, at least 40 nm, at least 50 nm, at least 60 nm, or at least 70 nm. In certain embodiments, the device may have an average pore size of less than or equal to 80 nm, less than or equal to 70 nm, less than or equal to 60 nm, less than or equal to 50 nm, less than or equal to 40 nm, less than or equal to 30 nm, less than or equal to 20 nm, less than or equal to 10 nm, less than or equal to 5 nm, less than or equal to 4 nm, or less than or equal to 3 nm. Combinations of the above-referenced ranges are also possible (e.g., at least 2 nm and less than or equal to 20 nm, at least 2 nm and less than or equal to 80 nm, at least 20 nm and less than or equal to 80 nm). Other ranges are also possible.

In some embodiments, at least a portion of the pores in the composition have a pore-size of greater than or equal to 40 nm, greater than or equal to 50 nm, greater than or equal to 60 nm, greater than or equal to 70 nm, or greater than or equal to 80 nm. In some embodiments, at least a portion of the pores in the composition have a pore-size of less than or equal to 100 nm, less than or equal to 90 nm, less than or equal to 80 nm, less than or equal to 70 nm, less than or equal to 60 nm, or less than or equal to 50 nm. Combinations of the above-referenced ranges are also possible (e.g., greater than or equal to 40 nm and less than or equal to 100 nm). Other ranges are also possible. Pore-size as described herein may be determined using Non-Local Density Functional Theory (NLDFT) based on the adsorption part of isotherm and carbon slit pore geometry.

In some embodiments, the composition has a particular free volume and/or free volume distribution. Advantageously, the free volume of the composition may be suitable for, for example, separating $CO_2$ from $CH_4$ with selectivity on the order of 10 or greater. In some embodiments, the average free volume elements of the composition are less than or equal to 2 nm, less than or equal to 1 nm, less than or equal to 0.8 nm, less than or equal to 0.6 nm, less than or equal to 0.5 nm, or less than or equal to 0.4 nm. In some embodiments, the average free volume elements of the composition are greater than or equal to 0.3 nm, greater than or equal to 0.4 nm, greater than or equal to 0.5 nm, greater than or equal to 0.6 nm, greater than or equal to 0.8 nm, or greater than or equal to 1 nm. Combinations of the above-referenced ranges are also possible (e.g., less than or equal to 2 nm and greater than or equal to 0.3 nm). Other ranges are also possible.

In some embodiments, the composition has a particular Brunauer-Emmett-Teller (BET) internal surface area. In some embodiments, the composition has a BET internal surface area of greater than or equal to 100 $m^2 g^{-1}$. In some embodiments, the BET of the composition is greater than or equal to 100 $m^2/g$, greater than or equal to 150 $m^2/g$, greater than or equal to 200 $m^2/g$, greater than or equal to 300 $m^2/g$, greater than or equal to 400 $m^2/g$, greater than or equal to 500 $m^2/g$, greater than or equal to 600 $m^2/g$, greater than or equal to 700 $m^2/g$, greater than or equal to 800 $m^2/g$, greater than or equal to 900 $m^2/g$, greater than or equal to 1,000 $m^2/g$, greater than or equal to 1,100 $m^2/g$, greater than or equal to 1,200 $m^2/g$, or greater than or equal to 1,400 $m^2/g$. In some embodiments, the BET of the composition is less than or equal to 1,500 $m^2/g$, less than or equal to 1,400 $m^2/g$, less than or equal to 1,300 $m^2/g$, less than or equal to 1,200 $m^2/g$, less than or equal to 1,100 $m^2/g$, less than or equal to 1,000 $m^2/g$, less than or equal to 900 $m^2/g$, less than or equal to 800 $m^2/g$, less than or equal to 700 $m^2/g$, less than or equal to 600 $m^2/g$, less than or equal to 500 $m^2/g$, less than or equal to 400 $m^2/g$, less than or equal to 300 $m^2/g$, less than or equal to 200 $m^2/g$, or less than or equal to 150 $m^2/g$. Combinations of the above referenced ranges are also possible (e.g., greater than or equal to 100 $m^2/g$ and less than or equal to 1,50000 $m^2/g$). Other ranges are also possible. BET, as described herein, may be determined with $N_2$ sorption at 77 K.

In some embodiments, the bridged bicyclic-based compound has a particular number average molecular weight. In some embodiments, the number average molecular weight of the bridged bicyclic-based compound may be greater than or equal to 100 Da, greater than or equal to 200 Da, greater than or equal to 500 Da, greater than or equal to 1000 Da, greater than or equal to 1500 Da, greater than or equal to 2500 Da, greater than or equal to 5000 Da, greater than or equal to 7500 Da, greater than or equal to 10000 Da, greater than or equal to 25000 Da, greater than or equal to 50000 Da, greater than or equal to 100000 Da, or greater than or equal to 200000 Da, greater than or equal to 500000 Da, or greater than or equal to 1,000,000 Da. In certain embodiments, the number average molecular weight of the bridged bicyclic-based compound may be less than or equal to 75000 Da, less than or equal to 50000 Da, less than or equal to 25000 Da, less than or equal to 10000 Da, less than or equal to 7500 Da, less than or equal to 5000 Da, less than or equal to 2500 Da, less than or equal to 1500 Da, less than or equal to 1000 Da, less than or equal to 500 Da, or less than or equal to 200 Da. Combinations of the above-referenced ranges are also possible (e.g., greater than or equal to 100 Da and less than or equal to 2000 Da, greater than or equal to 1000 Da and less than or equal to 75000 Da). Other ranges are also possible.

In some embodiments, the pore size and/or free volume distribution may be tuned. For example, in some embodiments, functional groups (e.g., —OMe, —$CF_3$, etc.) may be selected such that the composition exhibits a particular pore size and/or free volume distribution. In some embodiments, the composition may be synthesized with one or more copolymers (e.g., such that pore size and/or free volume distribution may be tuned).

In some embodiments, an article or device comprising the compositions described herein may be used for separating gaseous compounds. For example, in some embodiments, the article or device may comprise a membrane comprising the composition (e.g., comprising the bridged bicyclic-based compound).

Some embodiments may provide the bridged bicyclic-based compound combined with, dispersed within, covalently bonded to, coated with, formed on, or otherwise associated with, one or more materials (e.g., small molecules, polymers, metals, metal complexes, etc.) to form a film or layer in solid state. For example, the bridged bicyclic compound may be combined with another material (e.g., a polymer) to form a film.

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc. "Fluoroalkyl" groups are alkyl groups wherein at least one hydrogen is replaced with a fluoro group. In some cases, all hydrogen groups of an alkyl group are replaced with fluoro groups to form a fluoroalkyl group (e.g., $CF_3$).

The term "alkoxy" refers to —O-alkyl. A "fluoroalkoxy" group refers to —O— fluoroalkyl.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Fluoroaryl" groups are aryl groups that are substituted with at least one fluoro group.

The terms "amine" and "amino" refer to both unsubstituted and substituted amines, e.g., a moiety that can be represented by the general formula: N(R')(R")(R"') wherein R', R", and R"' each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, aryl, or another carbon-containing substituent, the above formula represents a "ketone" group. Where W is hydrogen, the above formula represents an "aldehyde" group.

As used herein, the term "heterocycle" or "heterocyclyl" refers to a monocyclic or polycyclic heterocyclic ring that is either a saturated ring or an unsaturated non-aromatic ring. Typically, the heterocycle may include 3-membered to 14-membered rings. In some cases, 3-membered heterocycle can contain up to 3 heteroatoms, and a 4- to 14-membered heterocycle can contain from 1 to about 8 heteroatoms. Each heteroatom can be independently selected from nitrogen, which can be quaternized; oxygen; and sulfur, including sulfoxide and sulfone. The heterocycle may be attached via any heteroatom ring atom or carbon ring atom. Representative heterocycles include morpholinyl, thiomorpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyrindinyl, tetrahydropyrimidinyl, tetrahydrothiophenyl, tetrahydrothiopyranyl, and the like. A heteroatom may be substituted with a protecting group known to those of ordinary skill in the art, for example, the hydrogen on a nitrogen may be substituted with a tert-butoxycarbonyl group. Furthermore, the heterocyclyl may be optionally substituted with one or more substituents (including without limitation a halogen atom, an alkyl radical, or aryl radical). Only stable isomers of such substituted heterocyclic groups are contemplated in this definition.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquniolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

Suitable substituents for various groups described herein, e.g., alkyl, alkoxy, alkyl sulfanyl, alkylamino, dialkylamino, alkylene, alkenyl, alkynyl, cycloalkyl, cycloalkenyl, heterocyclyl, aryl, aralkyl, heteroaryl, and heteroarylalkyl groups, include any substituent that will form a stable compound. Examples of substituents include alkyl, alkoxy, alkyl sulfanyl, alkylamino, dialkylamino, alkenyl, alkynyl, cycloalkyl, an cycloalkenyl, an heterocyclyl, an aryl, an heteroaryl, an aralkyl, an heteroaralkyl, a haloalkyl, —C(O)NR$^a$R$^b$, —NR$^c$C(O)R$^d$, halo, —OR$^c$, cyano, nitro, haloalkoxy, —C(O)R$^c$, —NR$^a$R$^b$, —SR$^c$, —C(O)OR$^c$, —OC(O)R$^c$, —NR$^c$C(O)NR$^a$R$^b$, OC(O)NR$^a$R$^b$, NR$^c$C(O)OR$^d$, S(O)$_p$R$^c$, or —S(O)$_p$NR$^a$R$^b$, wherein R$^a$ and R$^b$, for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl; or R$^a$ and R$^b$ taken together with the nitrogen to which they are attached form optionally substituted heterocyclyl or optionally substituted heteroaryl; and R$^c$ and R$^d$ for each occurrence are, independently, H, an optionally substituted alkyl, an optionally substituted alkenyl, an optionally substituted alkynyl, an optionally substituted cycloalkyl, an optionally substituted cycloalkenyl, an optionally substituted heterocyclyl, an optionally substituted aryl, an optionally substituted heteroaryl, an optionally substituted aralkyl, or an optionally substituted heteroaralkyl. In addition, alkyl, cycloalkyl, alkylene, heterocyclyl, and any saturated portion of a alkenyl, cycloalkenyl, alkynyl, aralkyl, or heteroaralkyl group, may also be substituted with =O, =S, or =NR$^c$.

Compounds described herein may also be in salt form. Illustrative salts include, but are not limited, to sulfate, citrate, acetate, oxalate, chloride, bromide, iodide, nitrate, bisulfate, phosphate, acid phosphate, isonicotinate, lactate, salicylate, acid citrate, tartrate, oleate, tannate, pantothenate, bitartrate, ascorbate, succinate, maleate, gentisinate, fumarate, gluconate, glucaronate, saccharate, formate, benzoate, glutamate, methanesulfonate, ethanesulfonate, benzenesulfonate, p-toluenesulfonate, and pamoate (i.e., 1,1' methylene bis (2 hydroxy 3 naphthoate)) salts. In some cases, the salt may be formed from a compound described herein having an acidic functional group, such as a carboxylic acid functional group, and an inorganic or organic base. Suitable bases include, but are not limited to, hydroxides of alkali metals such as sodium, potassium, and lithium; hydroxides of alkaline earth metal such as calcium and magnesium; hydroxides of other metals, such as aluminum and zinc; ammonia, and organic amines, such as unsubstituted or hydroxy substituted mono, di, or trialkylamines; dicyclohexylamine; tributyl amine; pyridine; N methyl, N ethylamine; diethylamine; triethylamine; mono, bis, or tris (2 hydroxy lower alkyl amines), such as mono, bis, or tris (2 hydroxyethyl)-amine, 2 hydroxy tert-butylamine, or tris (hydroxymethyl)methylamine, N, N, di lower alkyl N (hydroxy lower alkyl) amines, such as N,N dimethyl N (2 hydroxyethyl)-amine, or tri (2 hydroxyethyl)amine; N methyl D glucamine; and amino acids such as arginine, lysine, and the like.

In some cases, the salt may be prepared from a compound described herein having a basic functional group, such as an amino functional group, and an inorganic or organic acid. Suitable acids include, but are not limited to, hydrogen sulfate, citric acid, acetic acid, oxalic acid, hydrochloric acid, hydrogen bromide, hydrogen iodide, nitric acid, phosphoric acid, isonicotinic acid, lactic acid, salicylic acid, tartaric acid, ascorbic acid, succinic acid, maleic acid, besylic acid, fumaric acid, gluconic acid, glucaronic acid, saccharic acid, formic acid, benzoic acid, glutamic acid, methanesulfonic acid, ethanesulfonic acid, benzenesulfonic acid, and p-toluenesulfonic acid.

Examples

The following examples are intended to illustrate certain embodiments of the present invention, but do not exemplify the full scope of the invention.

Despite the advances in backbone rigidity of polymer chains, a relatively unexplored design strategy of creating porous polymers is to attach rigid, free-volume-generating sidechains to a flexible backbone to form a type of "bottlebrush" polymer. Since rigid macromonomers containing polymerizable units are synthesized before polymerization (FIG. 1A), it is generally easier to incorporate a variety of unique and pre-designed functionalities into this class of polymer as compared to PIM-1, which mainly relies on post-polymerization functionalization. From a transport perspective, pre-designing side-chain structures can enhance the entropic ordering of ultramicropores, enabling easier access to controlled entropic selectivities that are not currently considered from the activated state theory approach used to define the current polymer upper bound.

Fluorinated polymers may, in some cases, introduce properties such as thermal stability and non-wettability, which have enabled commercial applications. In terms of gas separation, the introduction of fluorinated moieties in aromatic polyimides can, in some cases, dramatically increase gas permeability with little impact on permselectivity. In poly(organosiloxanes), $CO_2$ permeability and $CO_2/CH_4$ selectivity may increase simultaneously by incorporating fluorine-containing groups. In all these cases, bulky hexafluoroisopropylidene functionality is generally used to contort the polymer backbone and generate free volume, thereby enhancing separation performance. Considering the synthetic versatility of using pore-forming macromonomers, the approach presented herein enables a systematic comparison for studying the effect of fluorination on gas transport properties relative to that of hydrocarbon analogs in pre-designed ultramicropores. By doing so, a more direct deconvolution of the morphological and electronic contributions of fluorinated functionality on gas transport can be achieved.

This example describes the gas transport properties of two porous polymers obtained via Ring-Opening Metathesis Polymerization (ROMP), which both possess flexible poly (norbornene) backbones with rigid side chains. Films of $CF_3$-ROMP exhibited ultrahigh $CO_2$ permeability (>21000 Barrer) and exceptional plasticization resistance ($CO_2$ plasticization pressure>51 bar). The structures of two porous ROMP polymers are shown in FIG. 1B, where chains are made via iterative Diels-Alder reactions, which generate a mixture of oligomers with different chain lengths (typically with 2-9 repeating units) (FIGS. 5A-5B and FIGS. 6A-6B). The mixture of oligomers is directly used for ROMP polymerization. Schematic representations of $CF_3$-ROMP are shown in FIGS. 1C-1D. Both $CF_3$-ROMP and OMe-ROMP are generally readily soluble in common organic solvents, allowing characterization by NMR and GPC (FIGS. 7A-7D and FIGS. 8A-8D). The pre-casting $CF_3$-ROMP and OMe-ROMP powder showed significant microporosity via $N_2$ adsorption isotherms at 77 K, with a Brunauer-Emmett-Teller (BET) surface area of 700 $m^2$ $g^{-1}$ and 146 $m^2$ $g^{-1}$, respectively (FIGS. 10A-10F). Solution casting from chloroform led to optically clear films (FIGS. 13A-13B) suitable for gas permeation studies.

Figure 2A:
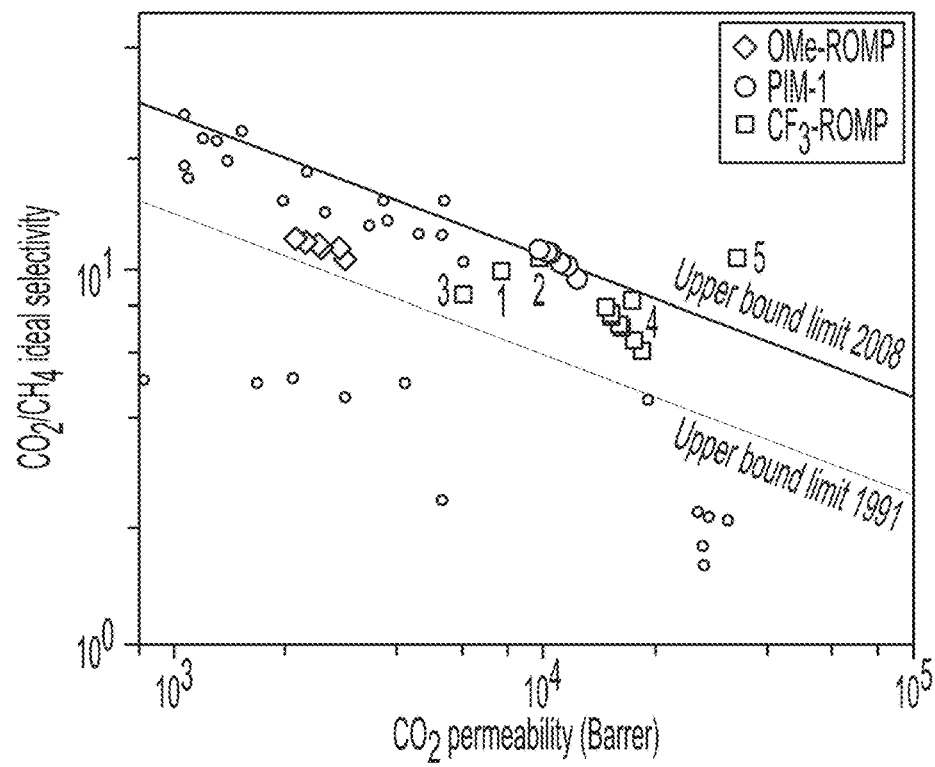
FIGS. 2A-2C are Robeson plots of $CF_3$-ROMP, OMe-ROMP, and PIM-1 for (FIG. 2A) $CO_2/CH_4$, (FIG. 2B) $H_2/CH_4$, and (FIG. 2C) $H_2/N_2$, gas pairs as a function of physical aging time, according to one set of embodiments; Black and gray lines represent 2008 and 1991 upper bounds, respectively; Filled purple squares represent other highly permeable PIMs reported: 1) PIM-EA-TB, 2) PIM-Trip-TB, 3) PIM-TMN-SBI, 4) PIM-TMN-Trip-TB 5) PIM-TMN-Trip.
Figure 2B:
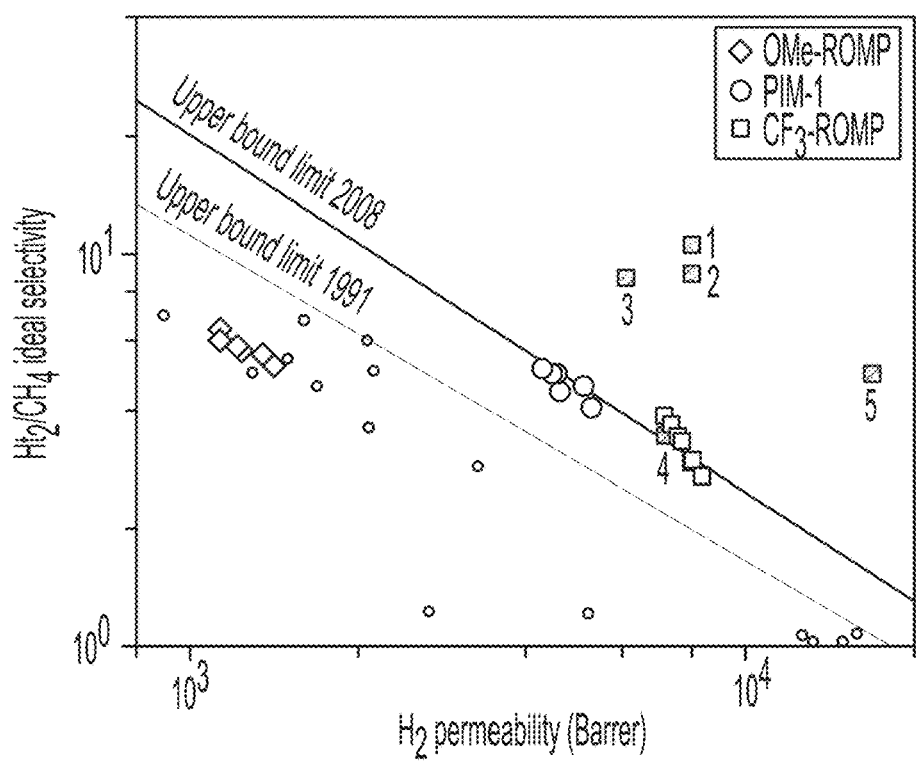
Figure 2C:
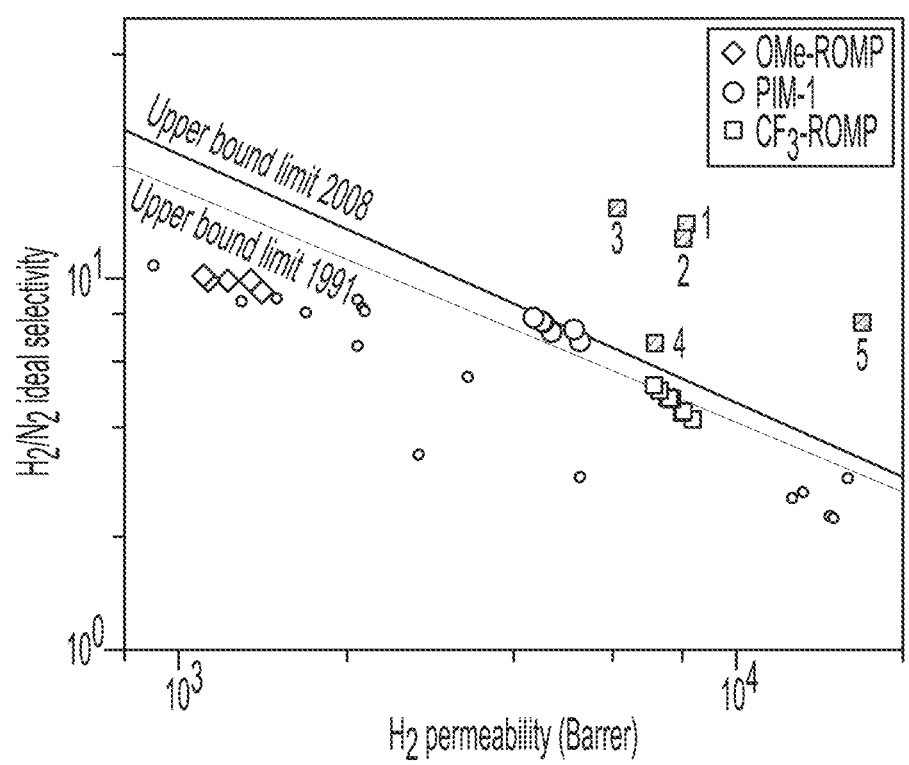
Figure 3A:
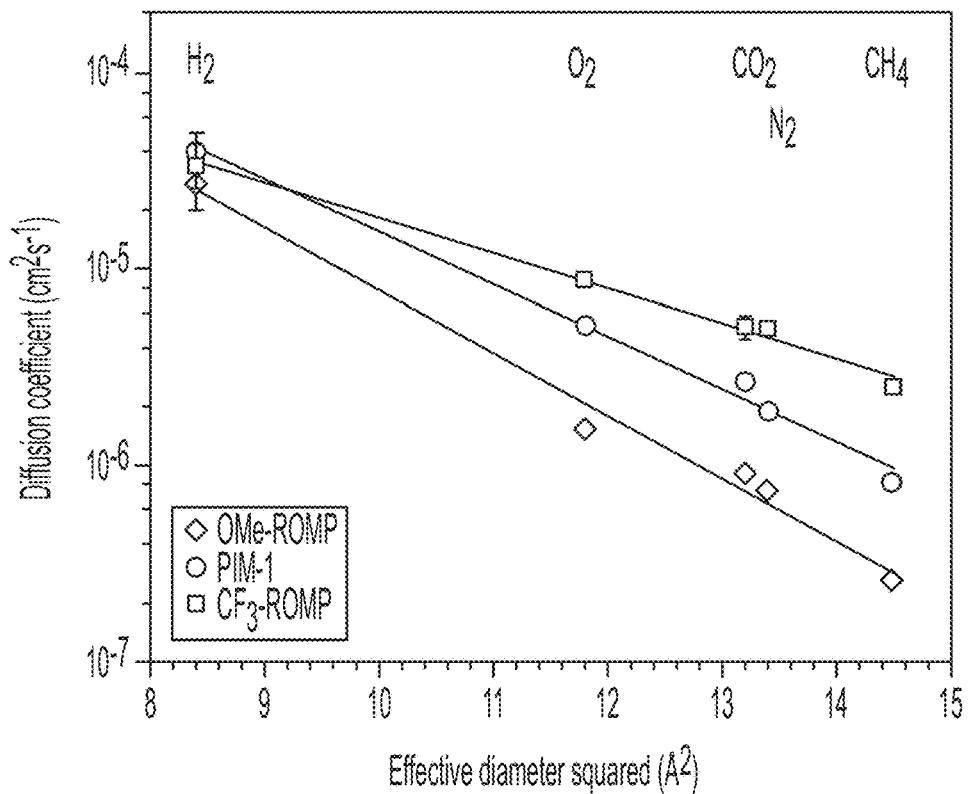
FIG. 3A shows a plot of diffusion coefficient plotted against effective diameter squared for $CF_3$-ROMP, OMe-ROMP, and PIM-1 at 1 h aging after liquid ethanol soaking for 48 h, air-drying for 24 h, and subjecting to full vacuum for 8 h at 35° C.; the steepness of the slope indicates molecular sieving capabilities, thus molecular sieving capabilities decrease in the following order: —OMe>PIM-1>—$CF_3$, according to one set of embodiments.
Figure 3B:
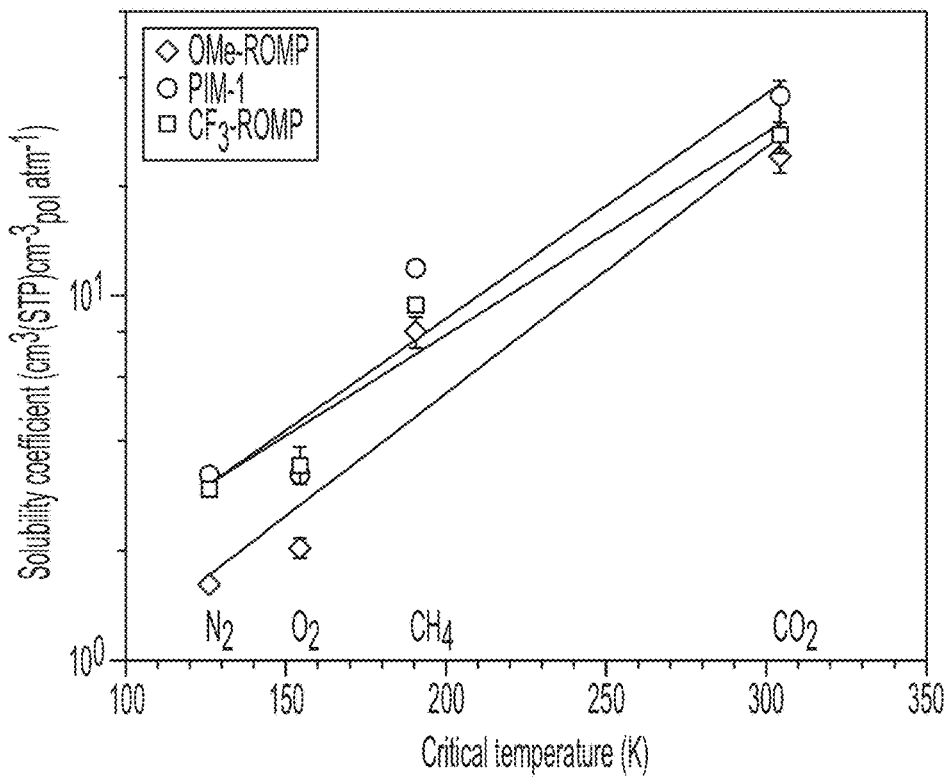
FIG. 3B shows a plot of solubility coefficient of $N_2$, $O_2$, $CH_4$, and $CO_2$ in polymers as a function of critical temperature, according to one set of embodiments.
Figure 14A:
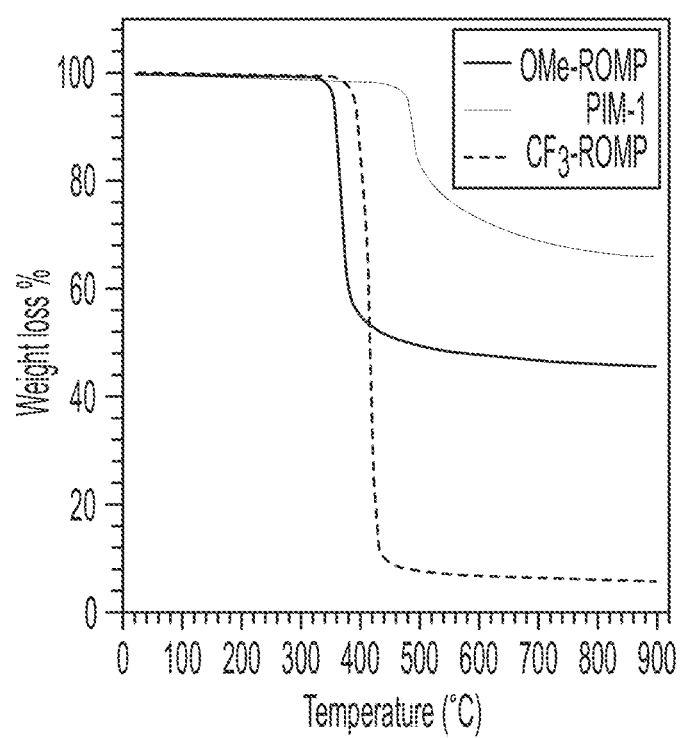
FIGS. 14A-14C show (FIG. 14A) TGA comparison between $CF_3$-ROMP, OMe-ROMP, and PIM-1 samples that underwent treatment (B)
Figure 14B:
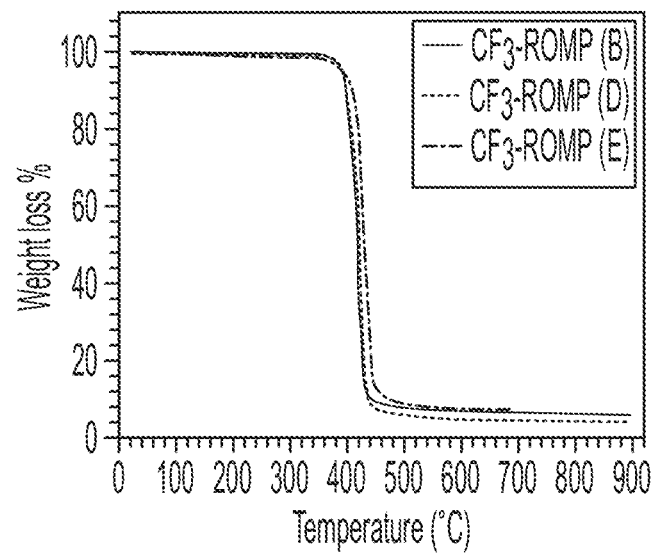
Figure 14C:
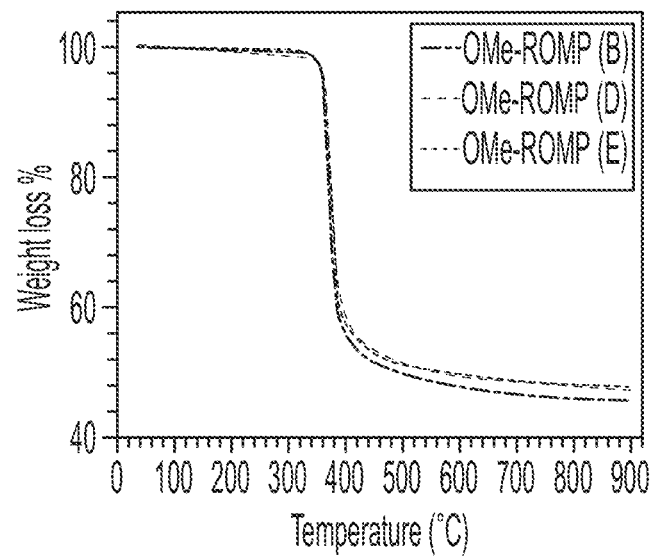
Figure 15A:
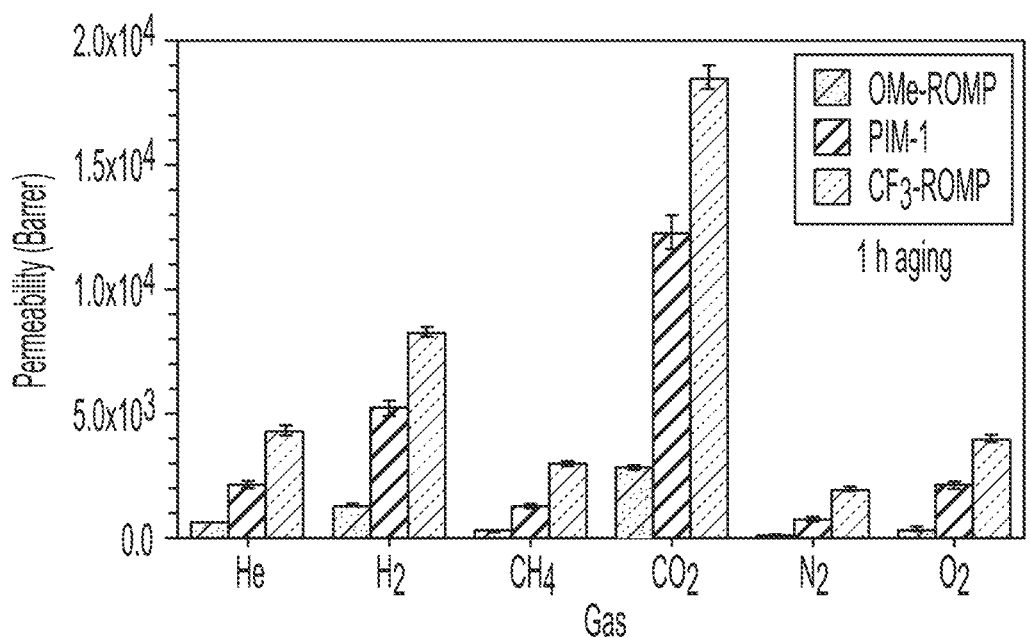
FIGS. 15A-15D show plots of transport properties of ROMP polymers and PIM-1 at 35° C. and 1 bar upstream pressure that underwent treatment (B) after 1 h aging.

The gas separation performance of $CF_3$-ROMP, OMe-ROMP, and PIM-1 are shown in FIGS. 2A-2C. Before permeation experiments, films were first soaked in ethanol for 48 h, dried at ambient conditions for 24 h, and then degassed in full vacuum for 8 h at 35° C. to remove residual solvent, as confirmed by TGA (FIGS. 14A-14C). The effect of different treatment conditions and film history were also investigated (Section 7, SI). The magnitude of gas permeability for $CF_3$-ROMP and OMe-ROMP followed the order of $CO_2>H_2>O_2>He>CH_4>N_2$, indicating a strong solubility contribution to permeation (FIG. 15A). $CF_3$-ROMP exhibited exceptionally high gas permeabilities across all gases tested, notably for $CO_2$ (21300 Barrer) and $H_2$ (~8300 Barrer) for the non-aged film. These gas permeabilities were about 60 to 200% higher than the non-aged PIM-1 film under the same ethanol treatment and testing conditions, which makes $CF_3$-ROMP the third most permeable linear ultramicroporous polymer reported to date, behind PTMSP and PIM-TMN-Trip reported by Rose et al. As a result, $CF_3$-ROMP surpassed the 2008 Robeson upper bound for $H_2/CH_4$ after physical aging, and was above the 1991 Robeson upper bound for all other gas pairs investigated (FIGS. 2A-2C and FIGS. 16A-16E).

In contrast, OMe-ROMP exhibited lower gas permeabilities compared to $CF_3$-ROMP and PIM-1 but higher permselectivities (FIGS. 2A-2C and FIG. 15D). These striking differences in transport properties are notable because $CF_3$-ROMP and OMe-ROMP are structurally very similar with the main exception being the —$CF_3$ versus —OMe functionality. Quantitatively, gas permeabilities are 7-10 fold higher, depending on the gas, for the $CF_3$-ROMP. Without wishing to be bound by theory, this difference in performance can be rationalized by the higher BET surface area of $CF_3$-ROMP arising from the random configuration of $CF_3$- and OMe-substituted side chains. The pendant —$CF_3$ group is generally bulkier and stiffer than —OMe, which may hinder interchain packing and reduces intrachain rotational freedom, thus leading to higher porosity. Fluorine-containing moieties are also generally known to have high solubilities for light gases, which could subsequently increase permeabilities in the framework of the solution-diffusion model. It may be the combination of these two effects that leads to the significant increase in gas permeabilities, similar to trends reported for certain polyimides and polycarbonates. Molecular mechanics simulations suggest side chain bending into "pocket-shapes" are a potentially pseudo-stable conformation (Section 4, SI). It is also hypothesized that the pendant —$CF_3$ groups may form localized fluorine-rich domains between side chain segments as a result of the curvature of the side chain in 3D (FIGS. 1C-1D). However, the stereochemistry of Diels-Alder reaction during side chain formation is disordered and hence there is a distribution of the shape and size of the pockets.

Compared to PIM-1, $CF_3$-ROMP exhibited moderately lower selectivities for the gas pairs $CO_2/CH_4$, $H_2/CH_4$, and $H_2/N_2$. Diffusivity-selectivity and solubility-selectivity is presented in FIGS. 23A-23C and FIGS. 25A-25C. According to FIGS. 3A-3B, FIGS. 17A-17B and FIGS. 18A-18B, the solubility-selectivity of $CF_3$-ROMP is close to that of PIM-1 whereas its diffusivity-selectivity is lower for the majority of gas pairs. Considering the difference in pore-size distribution between two polymers (FIGS. 10A-10F), it is hypothesized that the lower diffusivity-selectivity of $CF_3$-ROMP is most likely caused by polydispersity in length and stereochemistry of the side chains. Given this hypothesis, diffusivity-selectivity may be improved by homogenizing the length of side chains and devising systems that do not have structural variances as a result of the stereochemistry of the Diels-Alder reaction used in the side chain synthesis.

Figure 4A:
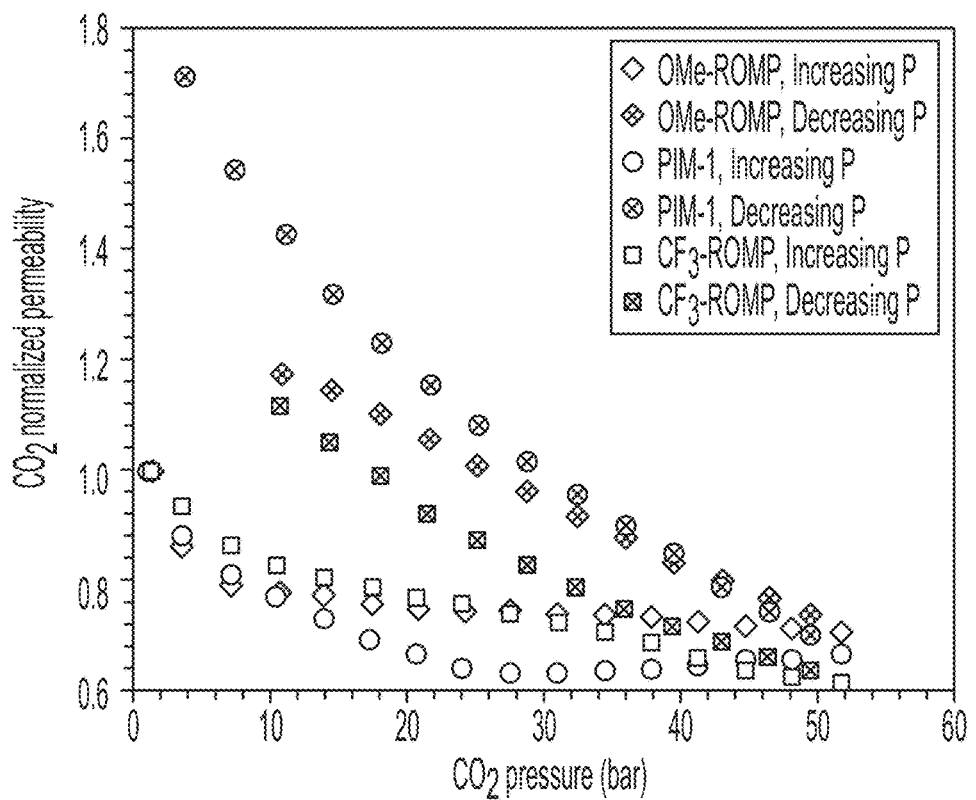
FIG. 4A is a plot of $CO_2$ plasticization study, according to one set of embodiments.
Figure 4B:
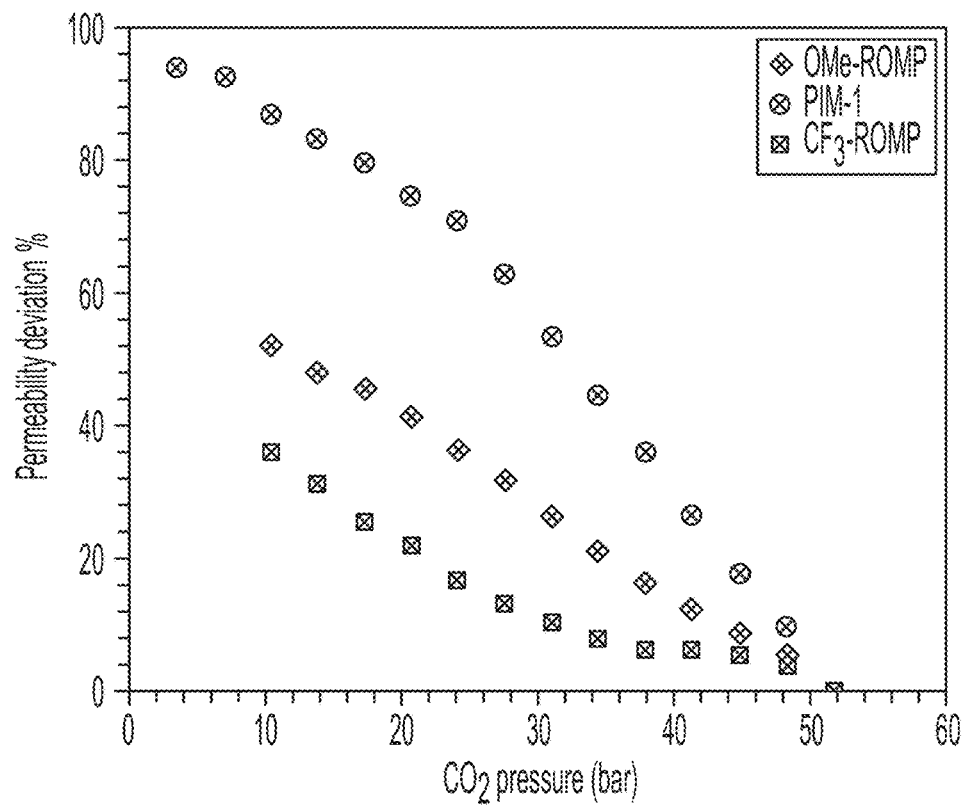
FIG. 4B is a plot of hysteresis induced by conditioning of the film at 51 bar of $CO_2$ for $CF_3$-ROMP, OMe-ROMP, and PIM-1, according to one set of embodiments.
Figure 29A:
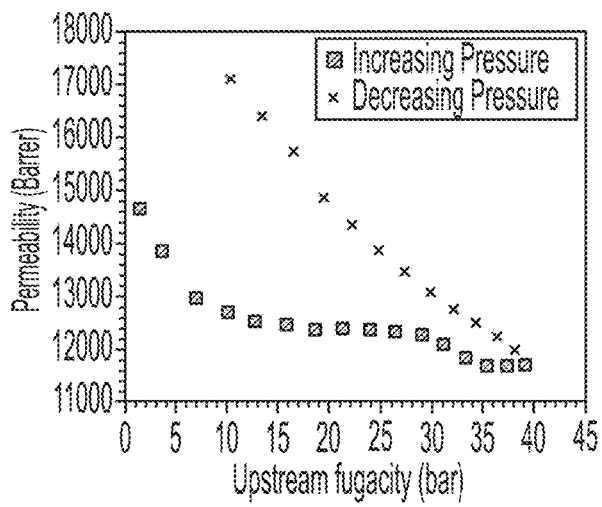
Figure 28B:
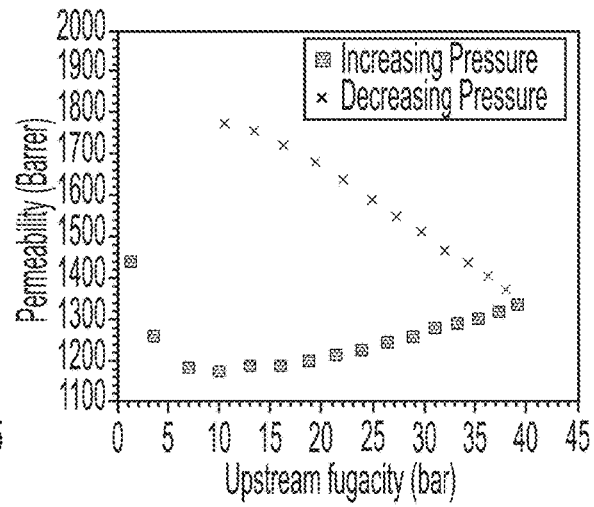
Figure 29C:
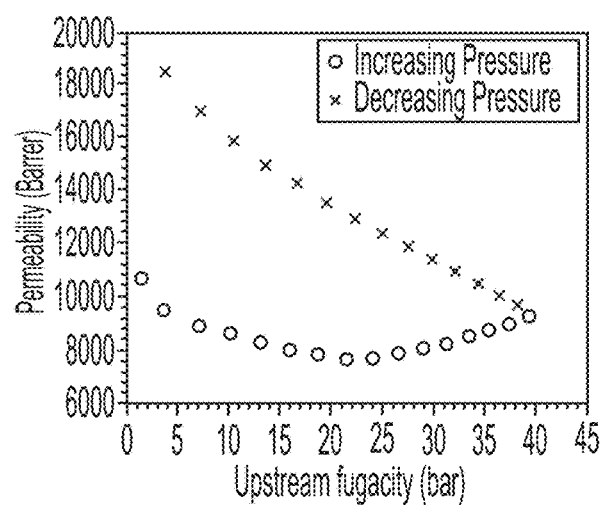

In addition to evaluating performance relative to the upper bounds, determining the effects of penetrant-induced plasticization is an important concern in membrane-based gas separations. Exposure of membranes to strongly interacting gases such as $CO_2$ at high pressures can reduce permselectivity as a result of sorption-induced swelling. Thus, membranes that maintain stable performance under high $CO_2$ feed pressures are desirable. In FIG. 4A, $CF_3$-ROMP, OMe-ROMP and PIM-1 were subjected to $CO_2$ feed pressure up to 51 bar. Of note, $CO_2$ permeabilities of $CF_3$-ROMP decreased monotonically up to 51 bar even when using fugacity to account for non-idealities (FIGS. 29A-29C). This result reveals that the plasticization pressure point, above which permeability starts to increase, was not reached under the conditions considered for these experiments. PIMs and many other non-crosslinked porous polymers exhibit plasticization pressure points at significantly lower pressures (Table 2), but the non-crosslinked $CF_3$-ROMP and OMe-ROMP have plasticization pressure points more characteristic to those of chemically-crosslinked polyimides. Moreover, when the $CO_2$ feed pressure was gradually decreased, the hysteresis induced by conditioning up to 51 bar was ~35% of the original $CO_2$ permeability. OMe-ROMP shows similar anti-plasticization behavior with plasticization pressure points>51 bar, but the hysteresis (~50%) is slightly higher than $CF_3$-ROMP. As a comparison, the plasticization pressure point for PIM-1 when tested under identical conditions was ~27 bar, and it shows a significantly larger hysteresis effect (up to 95% increased permeability) when $CO_2$ feed pressure is released. These results indicate that the interchain cohesive energy for ROMPs is larger than that of PIM-1. Without wishing to be bound by theory, this feature may originate from both a fluorophilic interaction between —$CF_3$ moieties and a greater rigidity-promoting "physical interlocking" between side chains typical of both ROMPs.

Figure 4C:
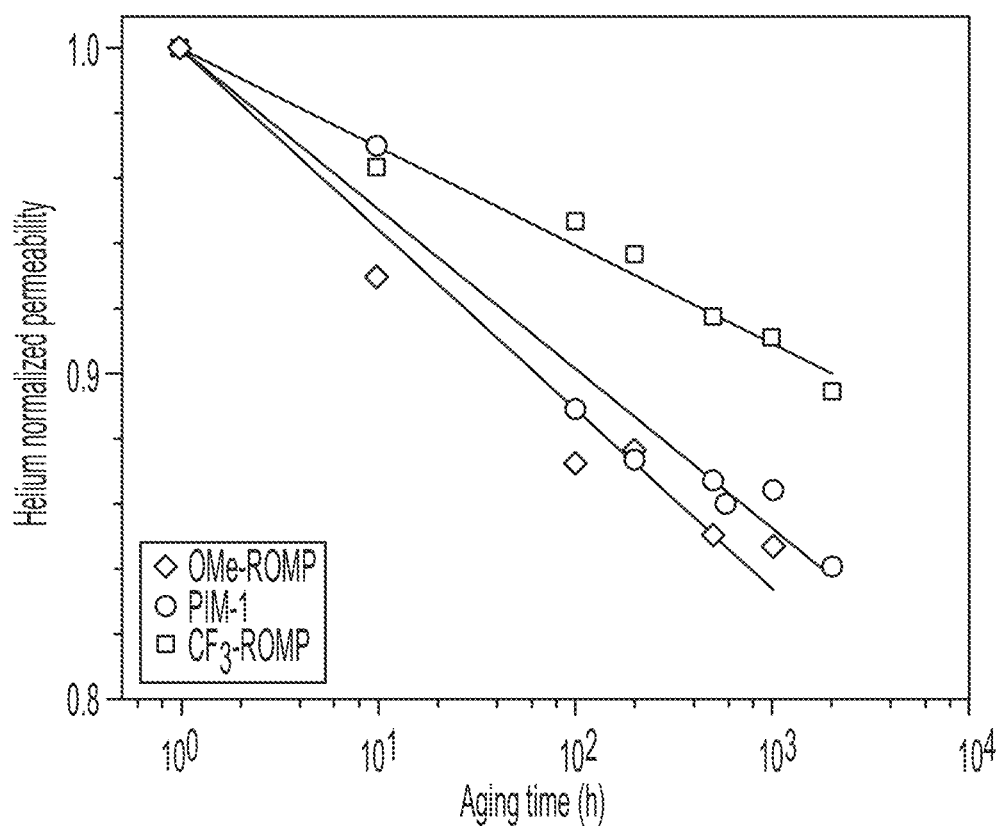
FIG. 4C is a plot of a physical aging study of helium by monitoring permeability over time for $CF_3$-ROMP, OMe-ROMP, and PIM-1 between 1 and 2000 h after liquid ethanol treatment, according to one set of embodiments.
Figure 5A:
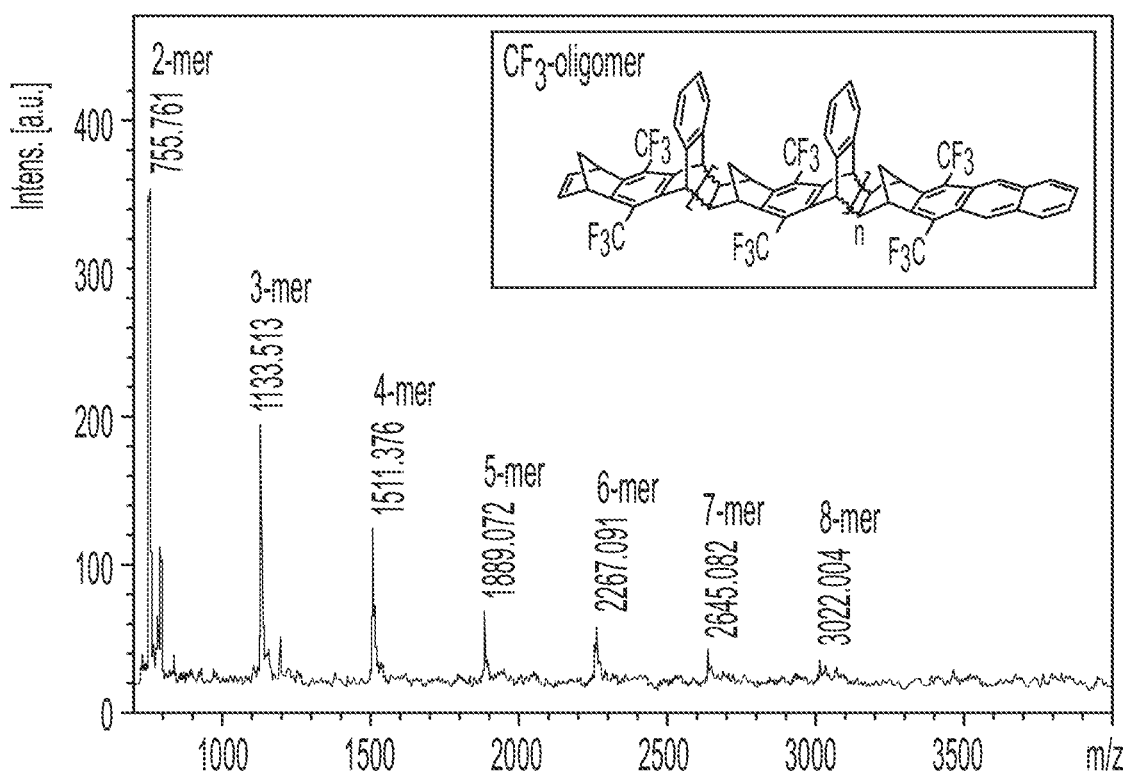
FIGS. 5A-5B show MALDI-TOF and GPC of $CF_3$-oligomer, respectively, according to one set of embodiments.
Figure 5B:
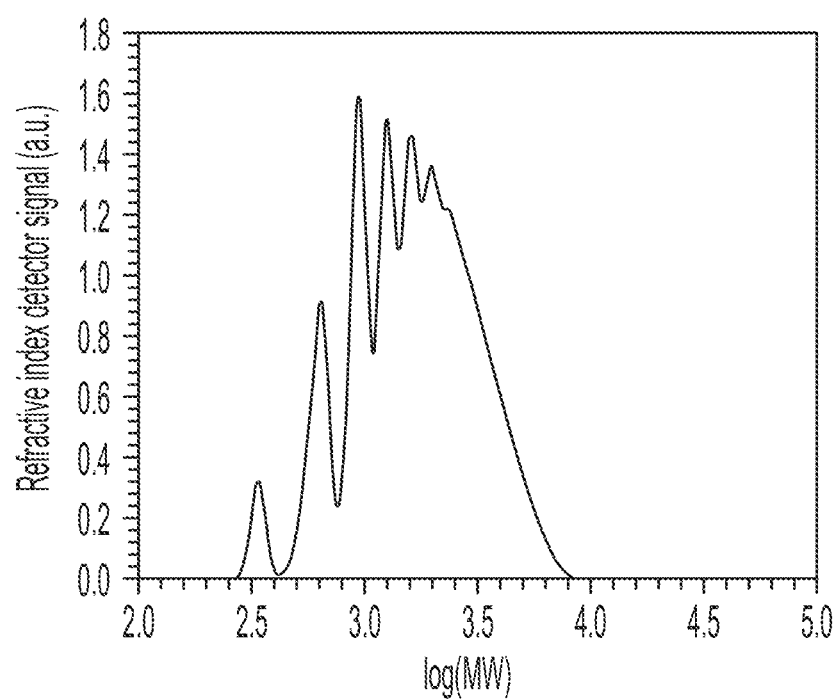
Figure 6A:
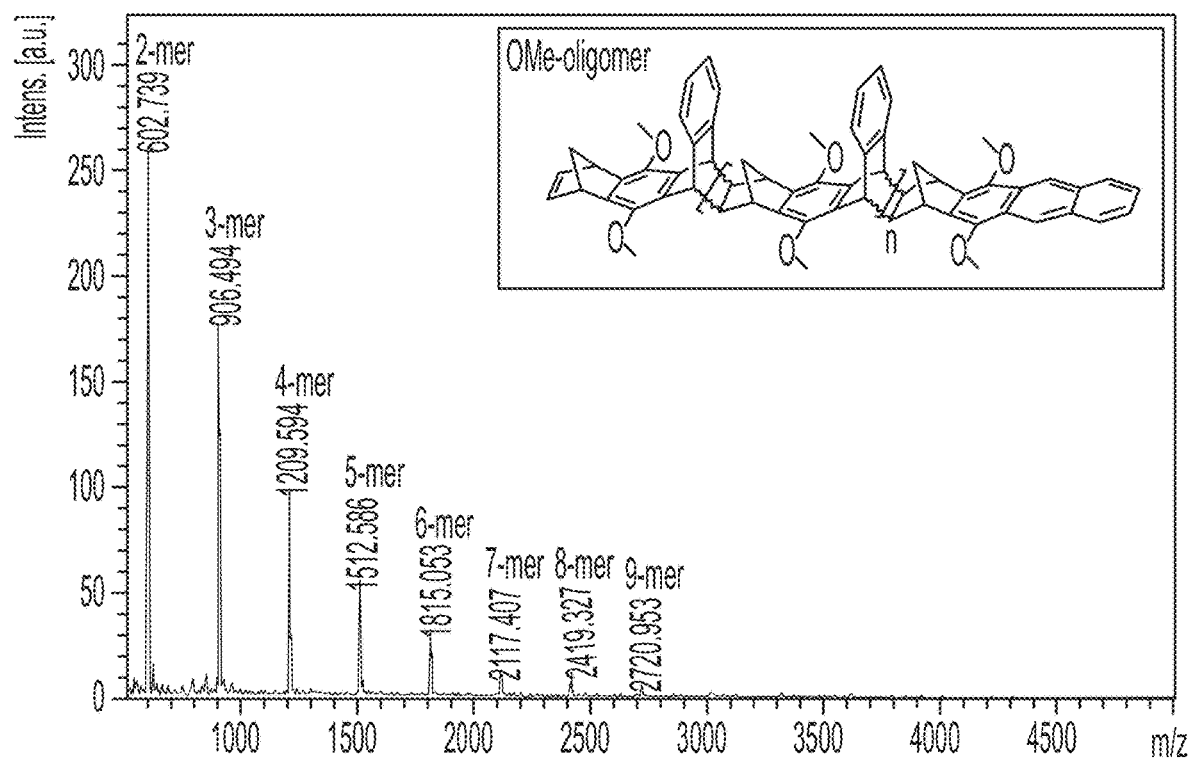
FIGS. 6A-6B show MALDI-TOF and GPC of OMe-oligomer, respectively, according to one set of embodiments.
Figure 6B:
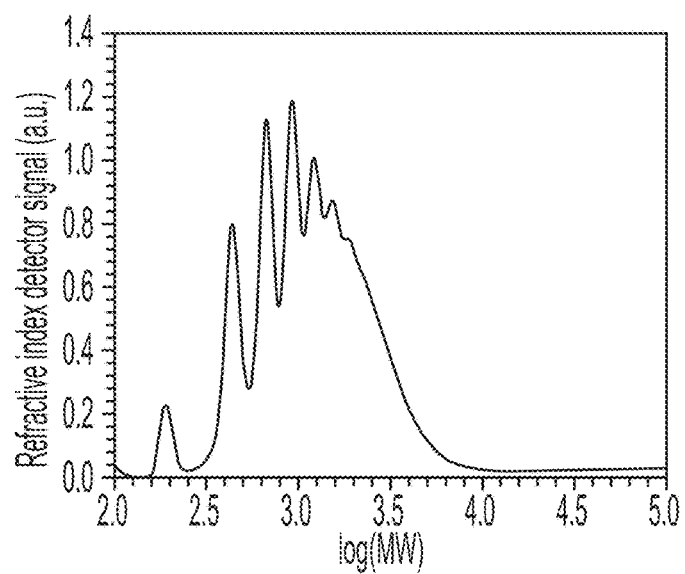
Figure 7A:
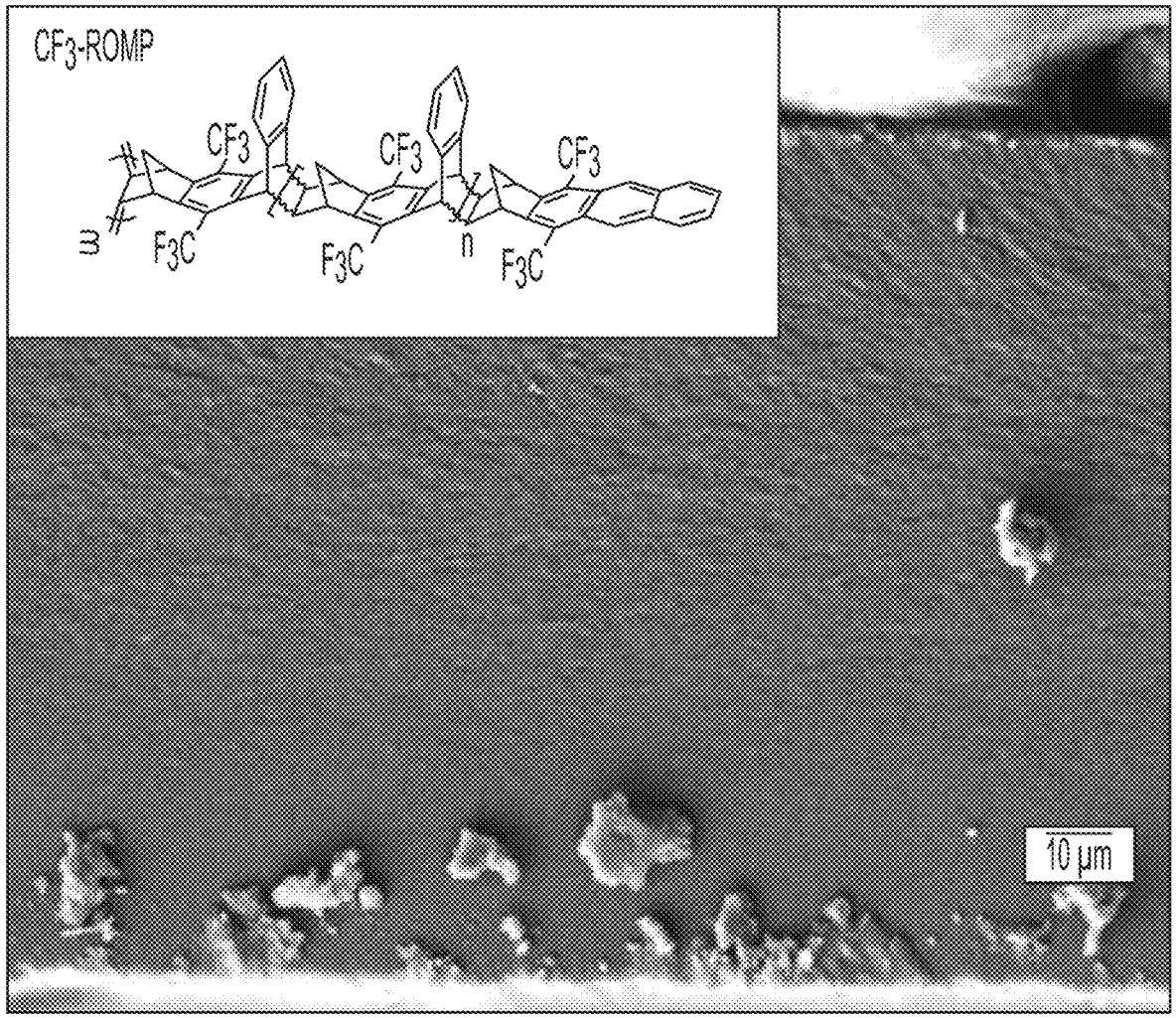
FIGS. 7A-7D show an SEM image, $^1$H-NMR, GPC, and DSC for $CF_3$-ROMP, respectively, according to one set of embodiments.
Figure 7B:
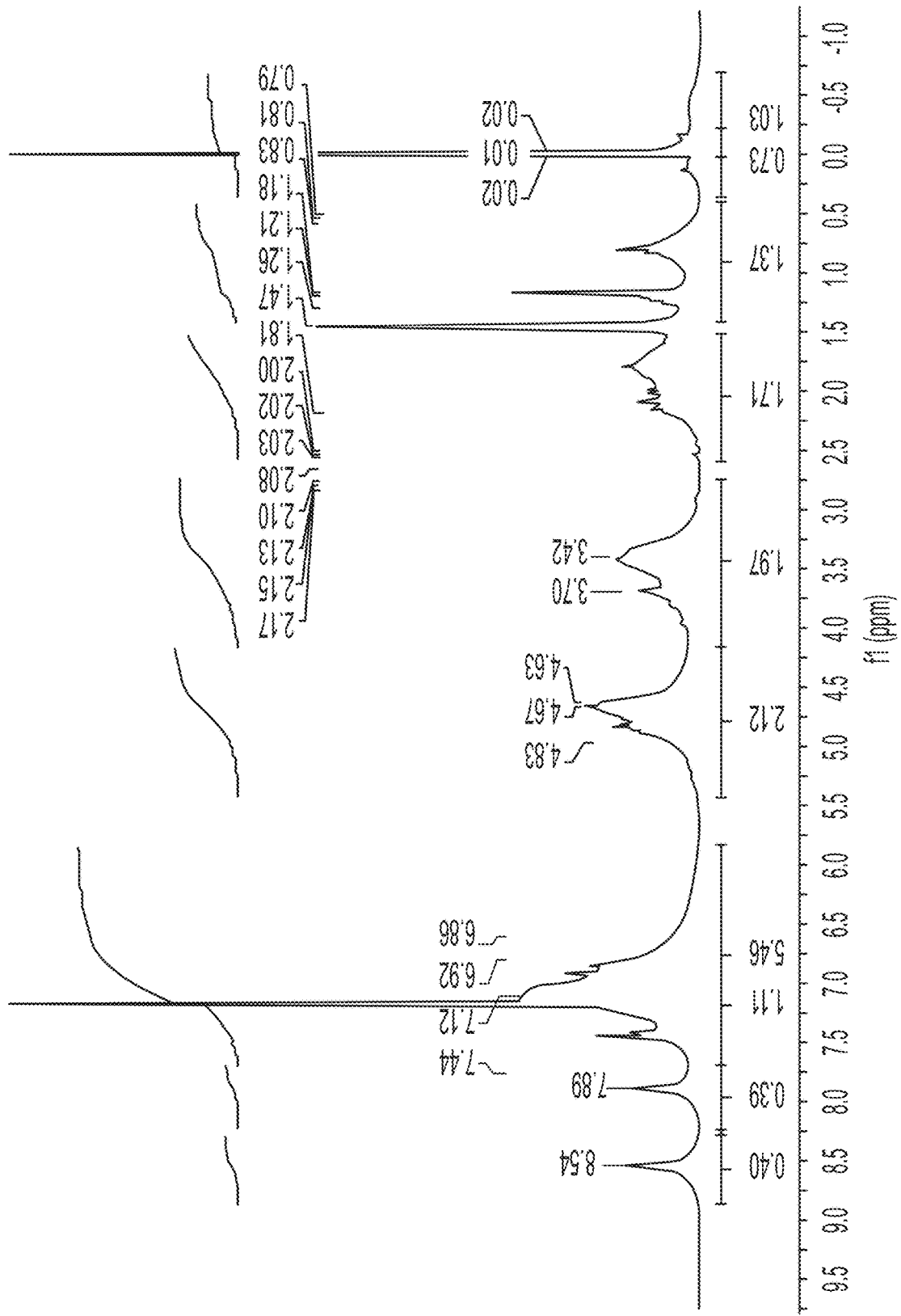
Figure 7C:
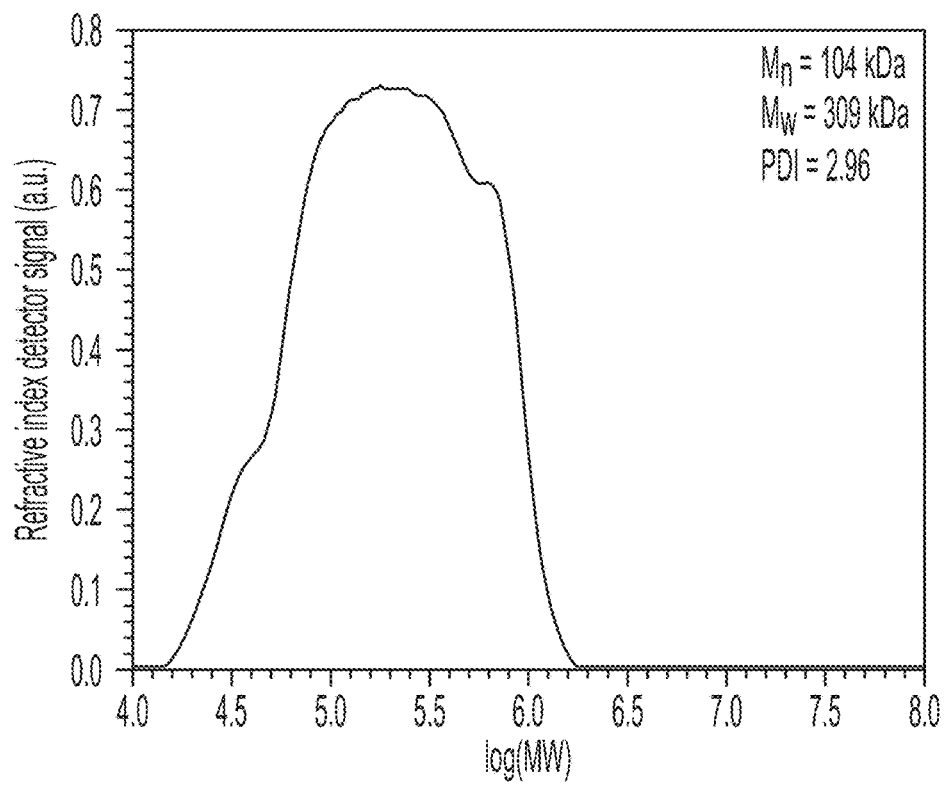
Figure 7D:
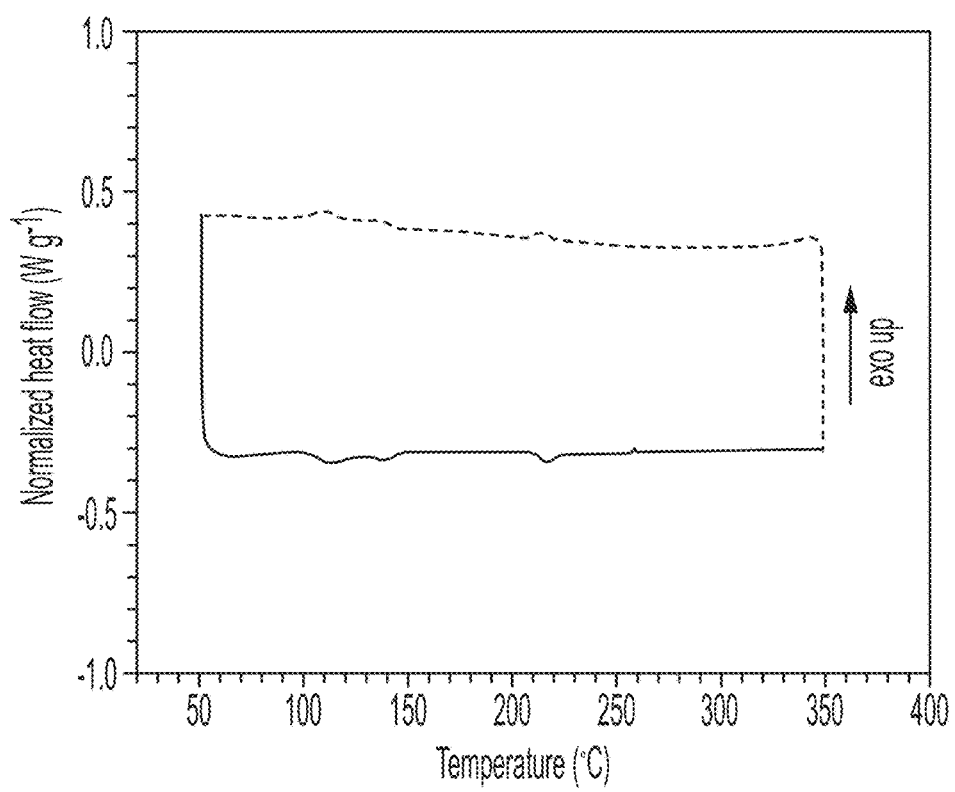
Figure 8A:
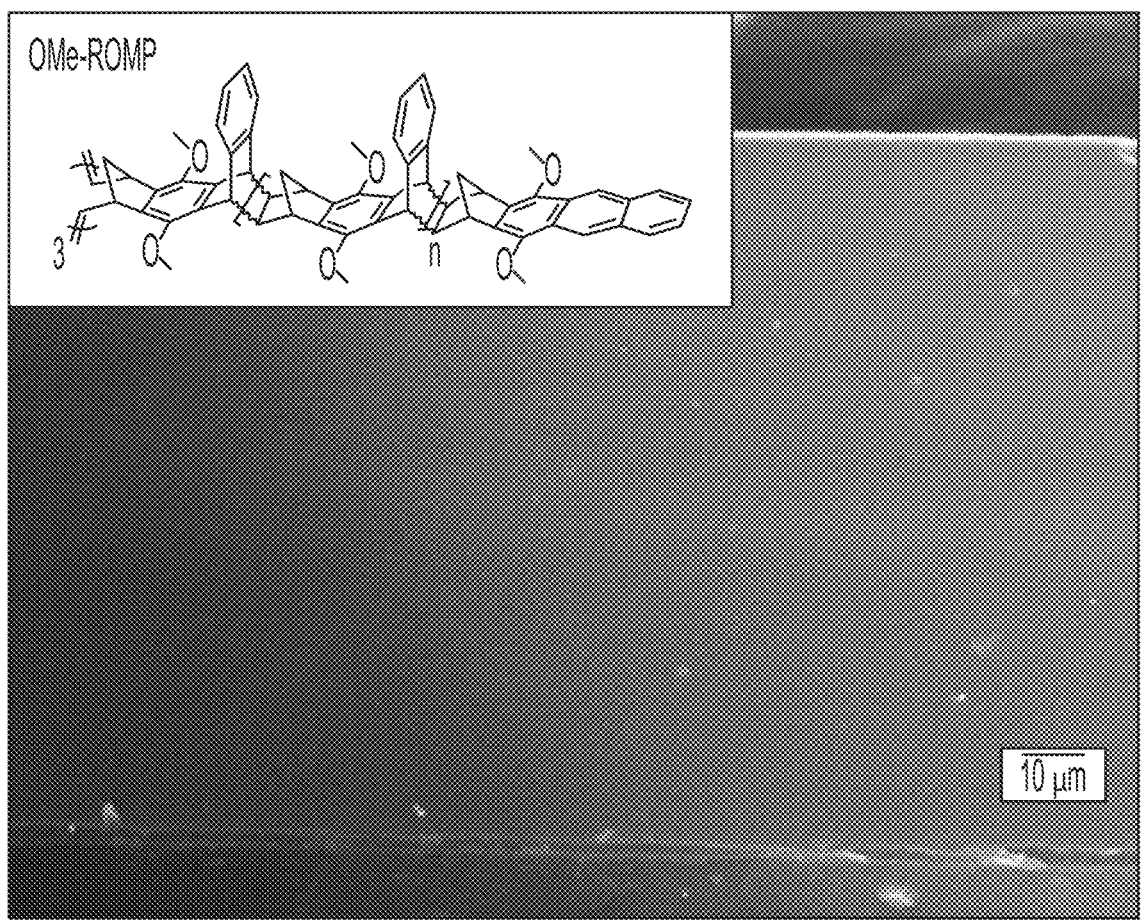
FIGS. 8A-8D show an SEM image, $^1$H-NMR, GPC, and DSC for OMe-ROMP, respectively, according to one set of embodiments.
Figure 8B:
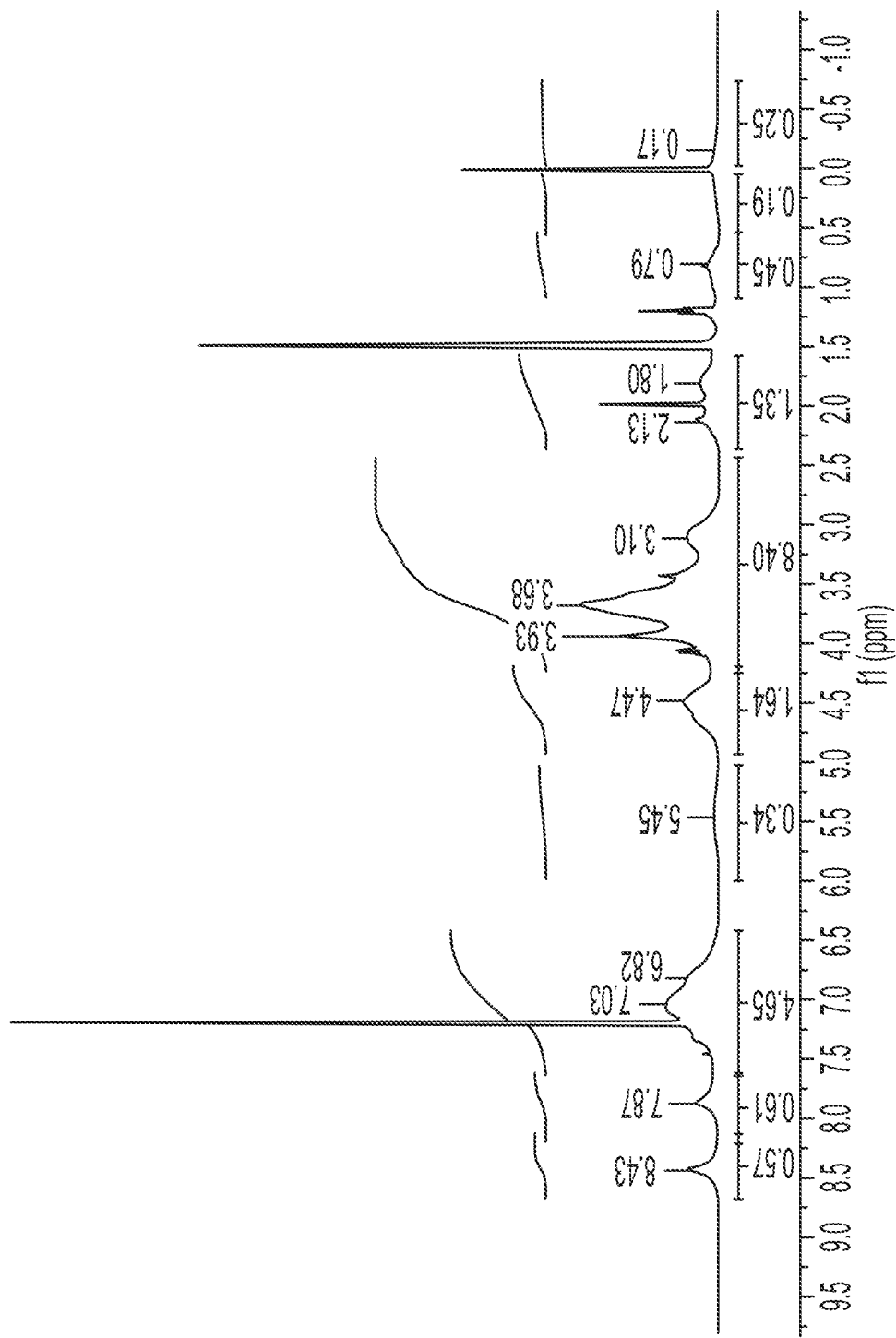
Figure 8C:
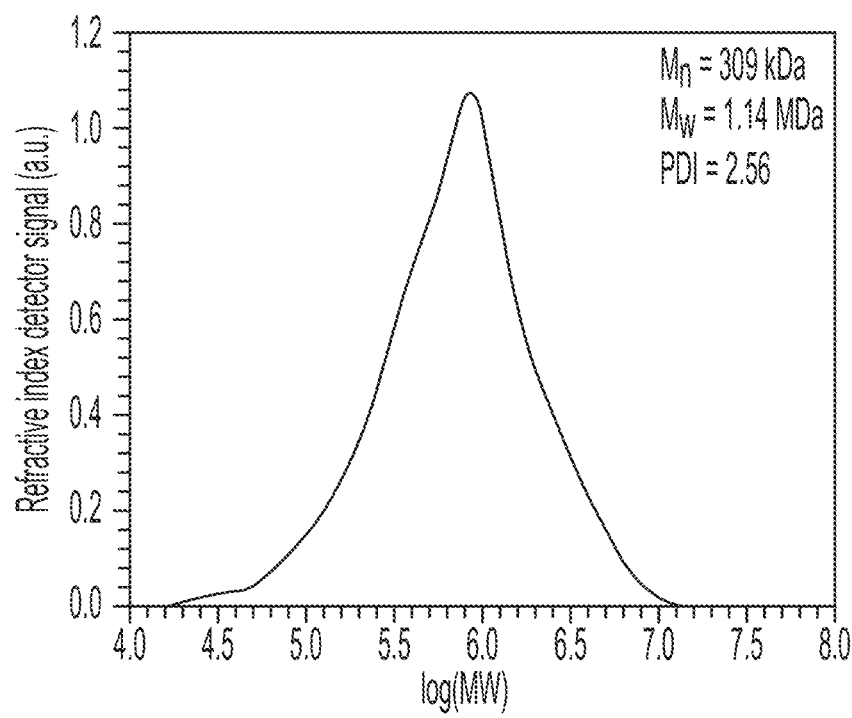
Figure 8D:
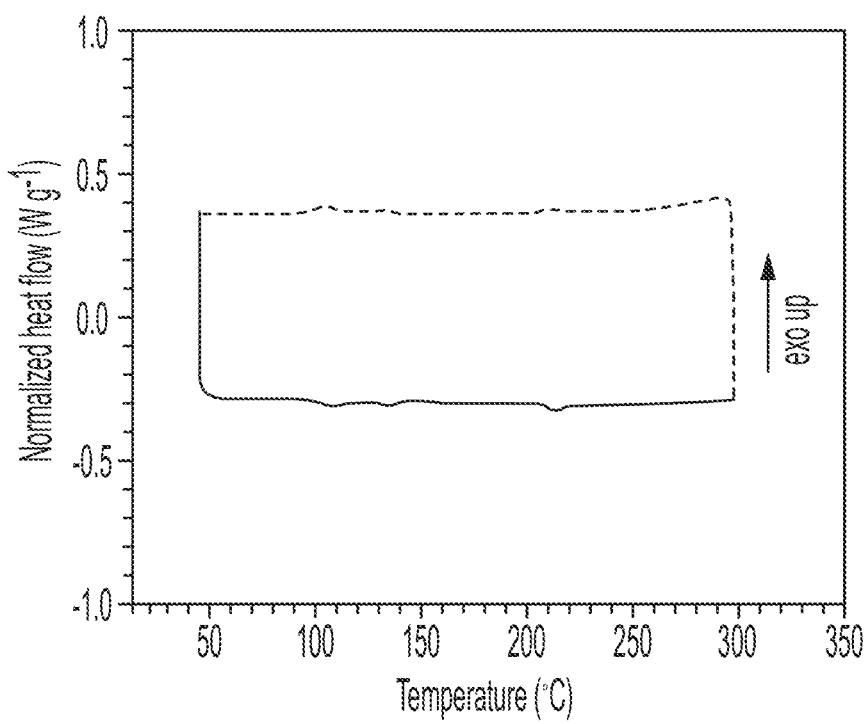
Figure 21A:
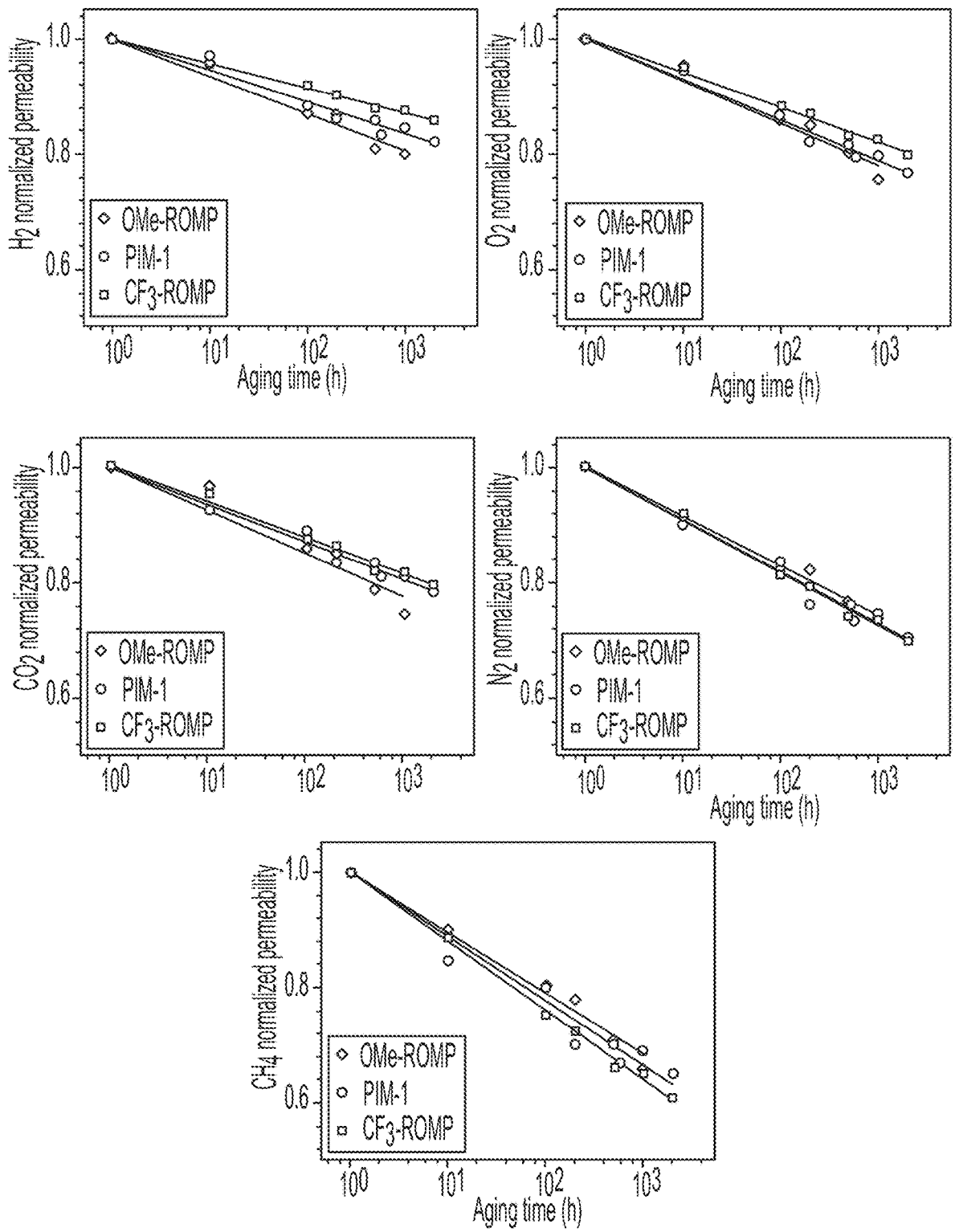
FIGS. 21A-21C show plots of physical aging data for (FIG. 21A) $CF_3$-ROMP, OMe-ROMP, and PIM-1 comparison of normalized permeability against aging time for $H_2$, $O_2$, $CO_2$, $N_2$, and $CH_4$, (FIG. 21B) $CF_3$-ROMP aging data and (FIG. 21C), according to one set of embodiments; data calculated evaluating the slope of permeability loss against effective diameter squared at each time (1, 10, 100, 200, 500, 1000, and 2000 h), and plotted against aging time.
Figure 21B:
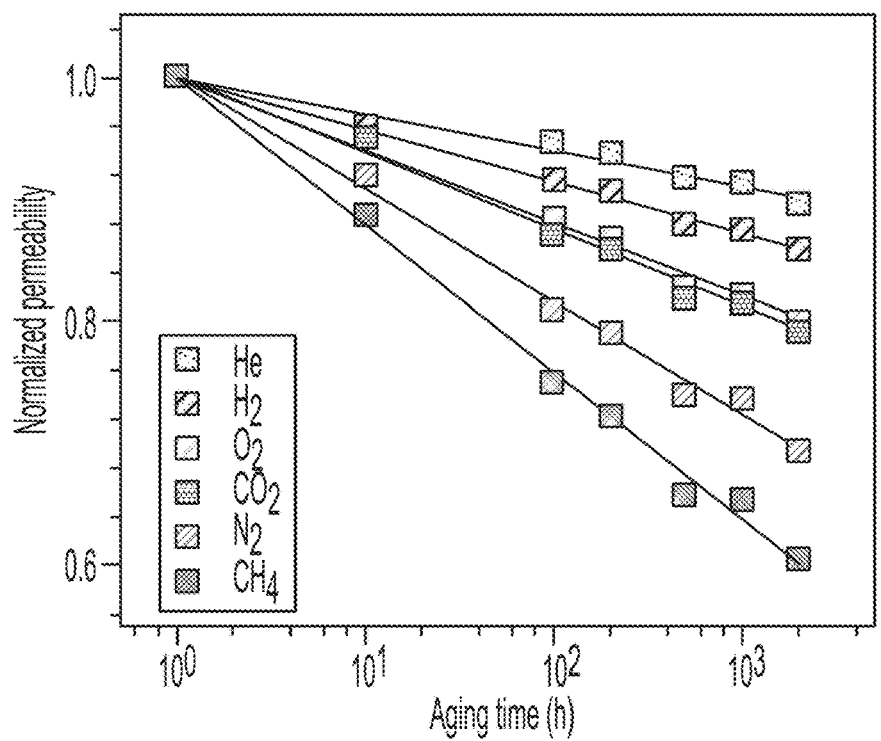
Figure 21C:
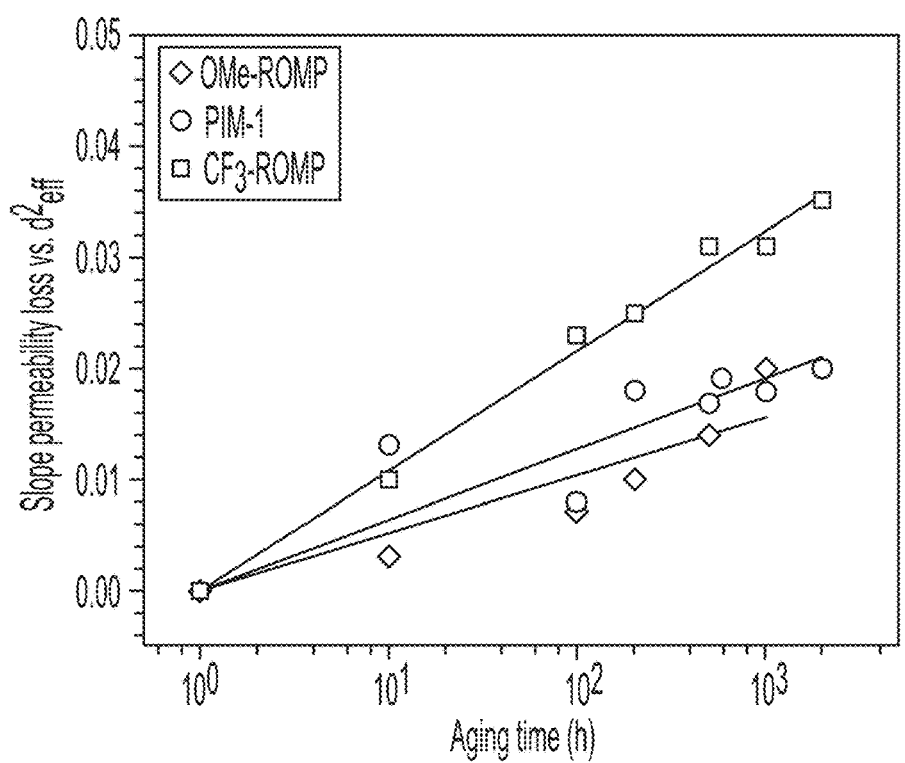

Physical aging of $CF_3$-ROMP, OMe-ROMP, and PIM-1 was monitored by gas permeation measurements and wide-angle X-ray scattering (WAXS) for 2000 h. FIG. 4C displays helium permeability as a function of the time, and it is clear that $CF_3$-ROMP, OMe-ROMP, and PIM-1 age at different rates. For smaller gases like He, $H_2$, and $O_2$, $CF_3$-ROMP aged the slowest among samples considered, while OMe-ROMP aged the fastest with PIM-1 displaying intermediate behavior (FIGS. 21A-21C). Notably, the aging rate of $CF_3$-ROMP is significantly lower than that of state-of-the-art PIMs, although the alcohol treatment was slight different (ethanol vs. methanol). For instance, helium permeability decreased by~45% after 1000 h aging for PIM-TMN-Trip, whereas $CF_3$-ROMP only decreased by~10%. Moreover, the $CF_3$-ROMP films considered here are thinner than PIM-TMN-Trip (119 µm vs. 192 µm), and physical aging is accelerated for thinner films. For larger molecules like $CO_2$, $N_2$, and $CH_4$, there was no significant difference in aging rates between the three polymers compared in this work (FIG. 21A). These findings suggest that using permeability as a proxy for assessing aging rates instead of diffusion is a limitation for more strongly sorbing components that also have significant solubility contributions to permeability.

Figure 26A:
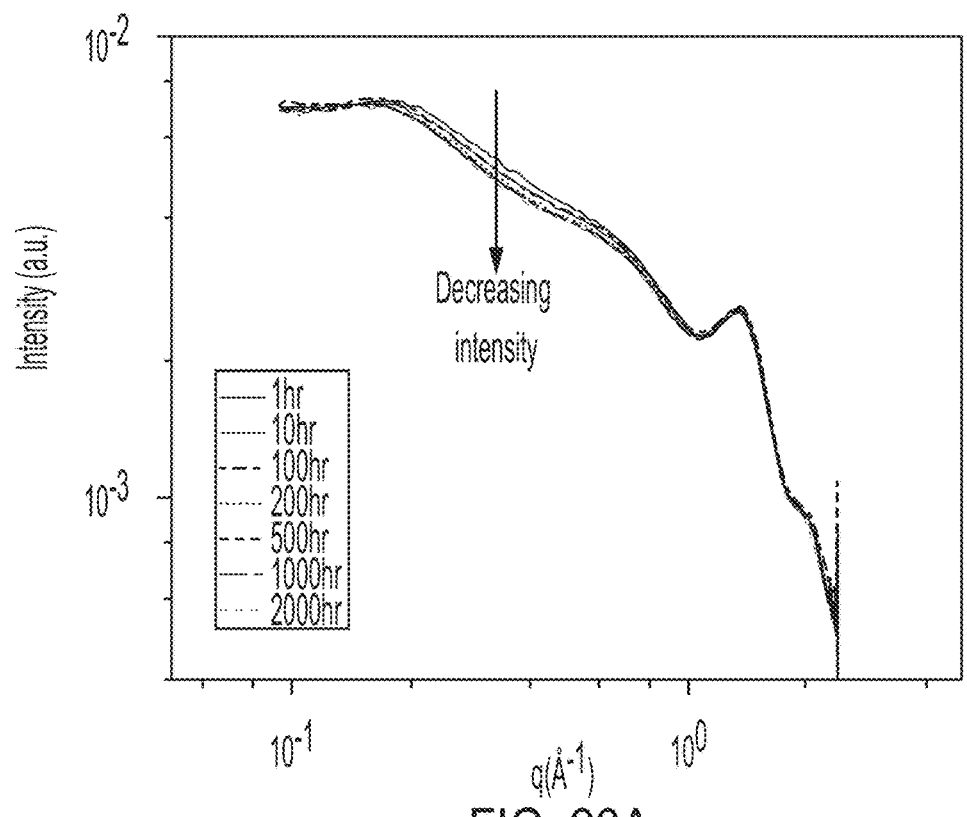
FIGS. 26A-26C show plots of WAXS patterns for (FIG. 26A) $CF_3$-ROMP, (FIG. 26B) OMe-ROMP, and (FIG. 26C) PIM-1 as a function of time up to 2000 h for films treated using method (B), according to one set of embodiments.
Figure 26B:
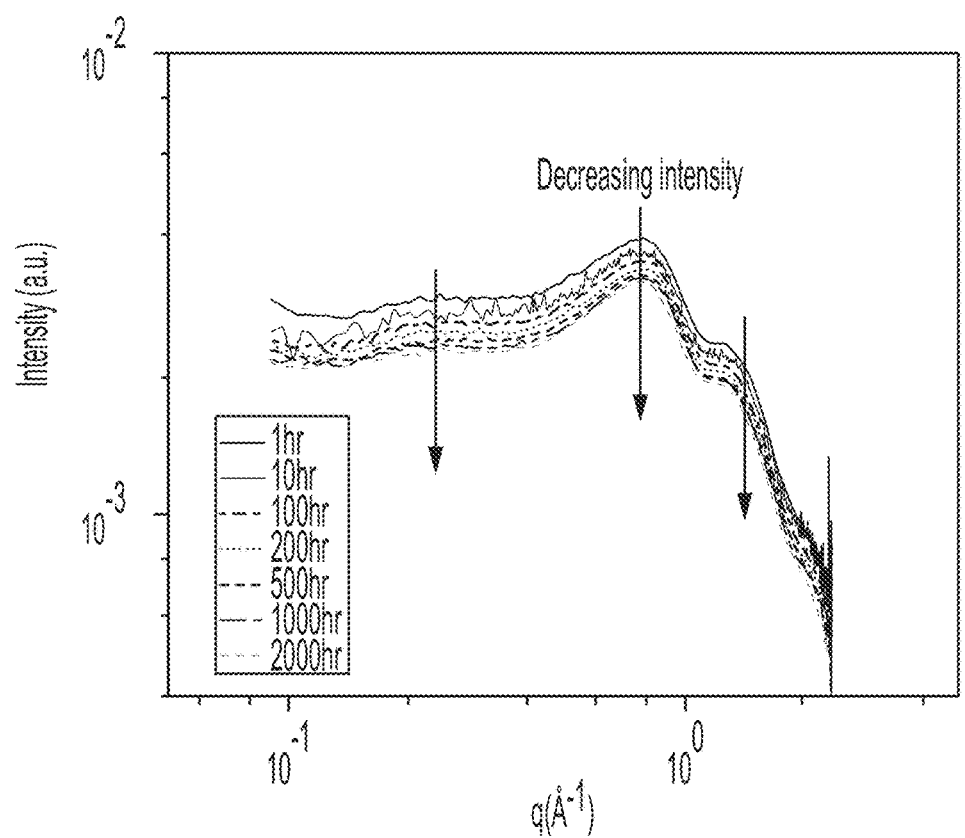
Figure 26C:
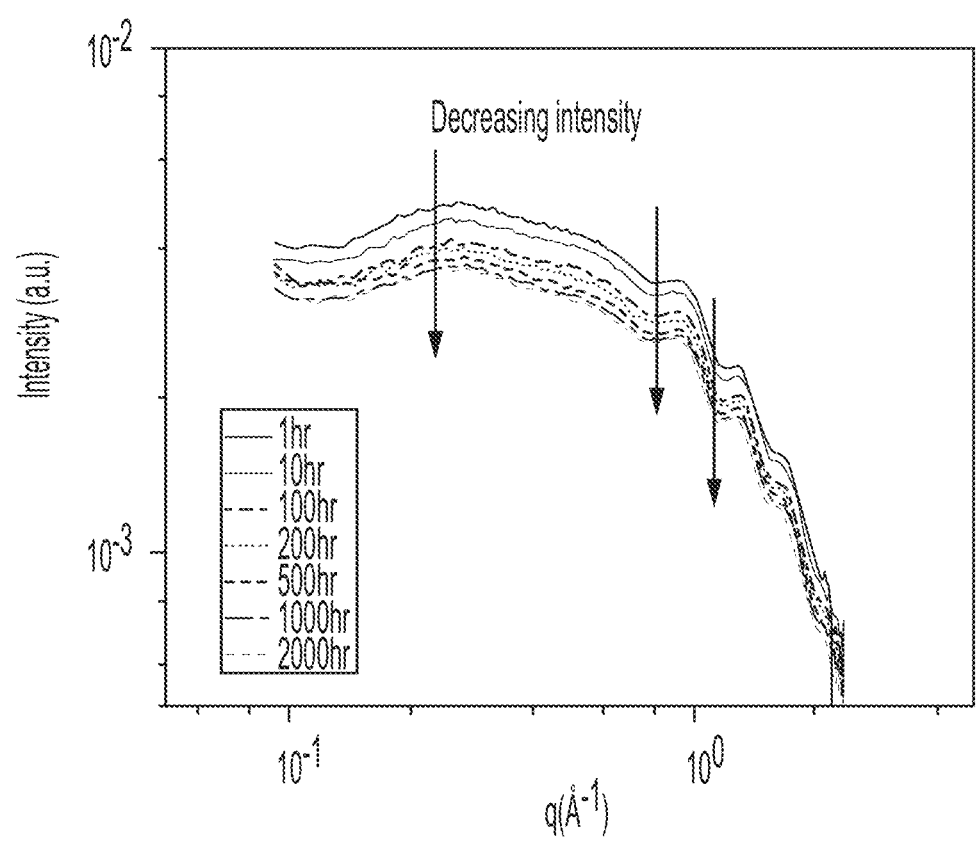

Previous studies have shown that the introduction of fluorinated moieties can suppress physical aging in aromatic polyimides. In the case at hand, despite its higher BET surface area, the aging rate of $CF_3$-ROMP was considerably lower than that of OMe-ROMP for gases with smaller effective diameters. The WAXS of $CF_3$-ROMP displays a decrease in scattering intensity only over the larger d-spacing regime during physical aging, whereas OMe-ROMP exhibited a decrease in scattering intensity across the entire d-spacing range (FIGS. 26A-26C). This trend suggests that subtle differences in polymer chemistry for a similar polymer design may result in multiple, complex aging pathways. The reduced aging rate for $CF_3$-ROMP compared to OMe-ROMP likely results from a stability of $CF_3$-ROMP to contraction of smaller free volume elements (FIGS. 19A-19C and FIGS. 20A-20C).

In summary, this example demonstrates a versatile approach to achieve ultrahigh $CO_2$ permeabilities and selective size-sieving behavior for gas-phase separations by using pore-forming side chains attached to flexible polymer backbones. Pendent —$CF_3$ groups enhance gas permeability and reduce physical aging compared to their —OMe counterparts. The different performance metrics as a function of pendent groups on the side chain reveal that these features can be used to tailor gas separation performance. Outstanding plasticization resistance is a common feature for both of the ROMP polymers presented, indicating that this new structural design may provide a material platform to systematically address challenges with plasticization. Moreover, $CF_3$-ROMP exhibited a reduction in physical aging rate compared to PIM-1 even though it is characterized by significantly higher intrinsic permeabilities. The formation of porous polymers based on flexible backbones and rigid free volume promoting side chains represents a promising new platform of materials for addressing fundamental limitations in current design strategies for membrane materials.

Experimental Section

Modelling and Gas Transport Properties:
The 3D structure of $CF_3$-ROMP is optimized using the MMFF 94 force field as implemented in Avogadro 1.2.0.

Gas Transport Properties:
Self-standing films of $CF_3$-ROMP, OMe-ROMP, and PIM-1 were prepared by slow evaporation of a 3 wt % polymer solution in chloroform using a flat aluminum Petri dish. The as-cast film was soaked in liquid ethanol before testing gas permeability and WAXS. TGA analysis was performed to ensure the complete removal of residual solvents from the films and to determine their thermal stability. The thicknesses of CF$_3$-ROMP, OMe-ROMP, and PIM-1 films, as measured with a digital micrometer, were 119 μm, 160 μm, and 119 μm, respectively. Permeability was measured at 35° C. with a fixed-volume variable-pressure Maxwell Robotics automated permeation system from the slope of the curve (p, t) in the steady-state region after 6 times the time lag (θ). Pressure was measured with a MKS transducer (Model 622C, 10 Torr limit). The diffusion coefficient, $\mathcal{D}$, was determined by applying the time-lag method: $\mathcal{D} = l^2/6\theta$ where l is the film thickness. The solubility coefficient, $\mathcal{S}$, was determined in the framework of the solution-diffusion model where $\mathcal{S} = \mathcal{P}/\mathcal{D}$. Aging experiments were systematically performed on samples subjected to the same treatment and storage conditions, experiencing the same history for up to 2000 h. CO$_2$-induced plasticization experiments were performed by pressurizing samples up to 51 bar and depressurizing down to 1 bar to evaluate the hysteresis.

1. General Materials and Methods

Materials:

All solvents, including methanol and ethanol, were of ACS reagent grade or better unless otherwise noted.

NMR Spectroscopy:

$^1$H and $^{13}$C NMR spectra for all compounds were acquired in CDCl$_3$ on a Bruker Avance Spectrometer operating at 400 and 100 MHz for $^1$H NMR and $^{13}$C NMR, respectively. Chemical shifts (δ) are reported in parts per million (ppm) and referenced with TMS for $^1$H NMR and CDCl$_3$ for $^{13}$C NMR.

Gel Permeation Chromatography (GPC):

Measurements were carried out in HPLC-grade tetrahydrofuran using an Agilent 1260 Infinity system with variable-wavelength diode array (254, 450 and 530 nm) and refractive index detectors, guard column (Agilent PLgel; 5 μm; 50×7.5 mm), and three analytical columns (Agilent PLgel; 5 μm; 300×7.5 mm; 105, 104, and 103 Å pore sizes). The instrument was calibrated with narrow-dispersity polystyrene standards between 1.7 and 3150 kg mol$^{-1}$. All runs were performed at 1.0 mL min$^{-1}$ flow rate and 35° C. Molecular weight values were calculated using Chemstation GPC Data Analysis Software (Rev. B.01.01) based on the refractive index signal.

Thermogravimetric Analysis (TGA):

TGA measurements were carried out under nitrogen atmosphere (Airgas, ultra-high purity grade) using a TGA 550 from TA Instruments. The ramp speed was 10° C. min$^{-1}$, and isotherms were performed from room temperature to 900° C.

Brunauer-Emmett-Teller (BET):

BET surface area of polymers was measured with N$_2$ sorption at 77 K using a Micromeritics ASAP 2020. Powder samples (CF$_3$-ROMP, OMe-ROMP, and PIM-1) were degassed under high vacuum at 120° C. for 5 hours prior to analysis. Analysis of pore-size distributions was performed using Non-Local Density Functional Theory (NLDFT) model for carbon slit pore geometry provided by ASAP 2020.

Pure-Gas Permeabilities:

Pure-gas permeabilities of polymer films were determined using a fixed-volume variable-pressure Maxwell Robotics automated permeation system. Polymer films were inserted into a stainless-steel permeation cell, which was then vacuum sealed and immersed in a water bath that was temperature-controlled at 35° C. using an immersion circulator (ThermoFisher SC 150L). All gases used for testing (He, H$_2$, CH$_4$, N$_2$, O$_2$, and CO$_2$) were ultra-high purity gases from Airgas.

Nanoindentation:

Nanoindentation was done on a Hysitron TriboIndenter 950 with the Berkovich tip. The load control was 300 μN for all samples tested with a loading time of 10 s, holding time of 5 s, and unloading time of 10 s.

2. Synthesis and Characterization of CF$_3$-ROMP, OMe-ROMP, and PIM-1

PIM-1 was synthesized according to previously published procedures. A representative procedure for the oligomerization of OMe- and CF$_3$-monomer, as well as for the ring opening metathesis polymerization of OMe- and CF$_3$-ROMP, are reported as follows.

For OMe-oligomers and OMe-ROMP: OMe-monomer was heated at 220° C. for 18 h under Ar. A small amount of OMe-monomer was sublimed during the reaction and condensed on the sidewall of the flask. The sublimed OMe-monomer was removed with cotton soaked with DCM. The OMe-oligomer was used directly for ROMP without further purification. To a 25 mL Schelenk flask were added OMe-oligomer (300 mg, 0.285 mmol, 1.0 equiv.) and 2 mL of dry DCM. Subsequently, Grubbs 2nd generation catalyst (1.21 mg, 0.00143 mmol, 0.005 equiv.) in 1 mL of dry DCM was injected all at once. The reaction was left stirring for 12 hrs at room temperature and quenched with ethyl vinyl ether. Upon completion, corresponding polymer was precipitated in methanol, filtered, and washed with methanol for 3 times. The white solid OMe-ROMP was dried in vacuum oven at 80° C. for overnight before characterization.

For CF$_3$-oligomers and CF$_3$-ROMP: CF$_3$-monomer was heated at 220° C. for 18 h under Ar. A small amount of CF$_3$-monomer was sublimed during the reaction and condensed on the sidewall of the flask. The sublimed CF$_3$-monomer was removed with cotton soaked with DCM. The CF$_3$-oligomer was used directly for ROMP without further purification. To a 25 mL Schelenk flask were added CF$_3$-oligomer (500 mg, 0.389 mmol, 1.0 equiv.) and 2 mL of dry DCM. Subsequently, Grubbs 2nd generation catalyst (3.3 mg, 0.00389 mmol, 0.01 equiv.) in 1 mL of dry DCM was injected all at once. The reaction was left stirring for 12 hrs at room temperature and quenched with ethyl vinyl ether. Upon completion, corresponding polymer was precipitated in methanol, filtered, and washed with methanol for 3 times. The light yellow solid CF$_3$-ROMP was dried in vacuum oven at 80° C. for overnight before characterization.

Figure 9A:
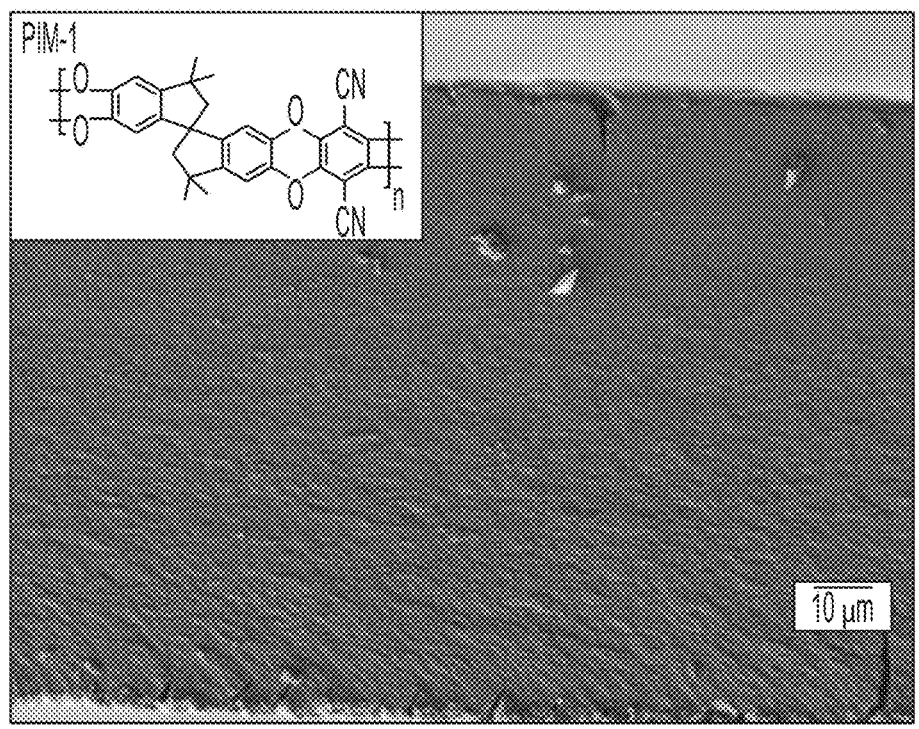
FIGS. 9A-9C show an SEM image, $^1$H-NMR, and GPC for PIM-1, respectively, according to one set of embodiments.
Figure 9B:
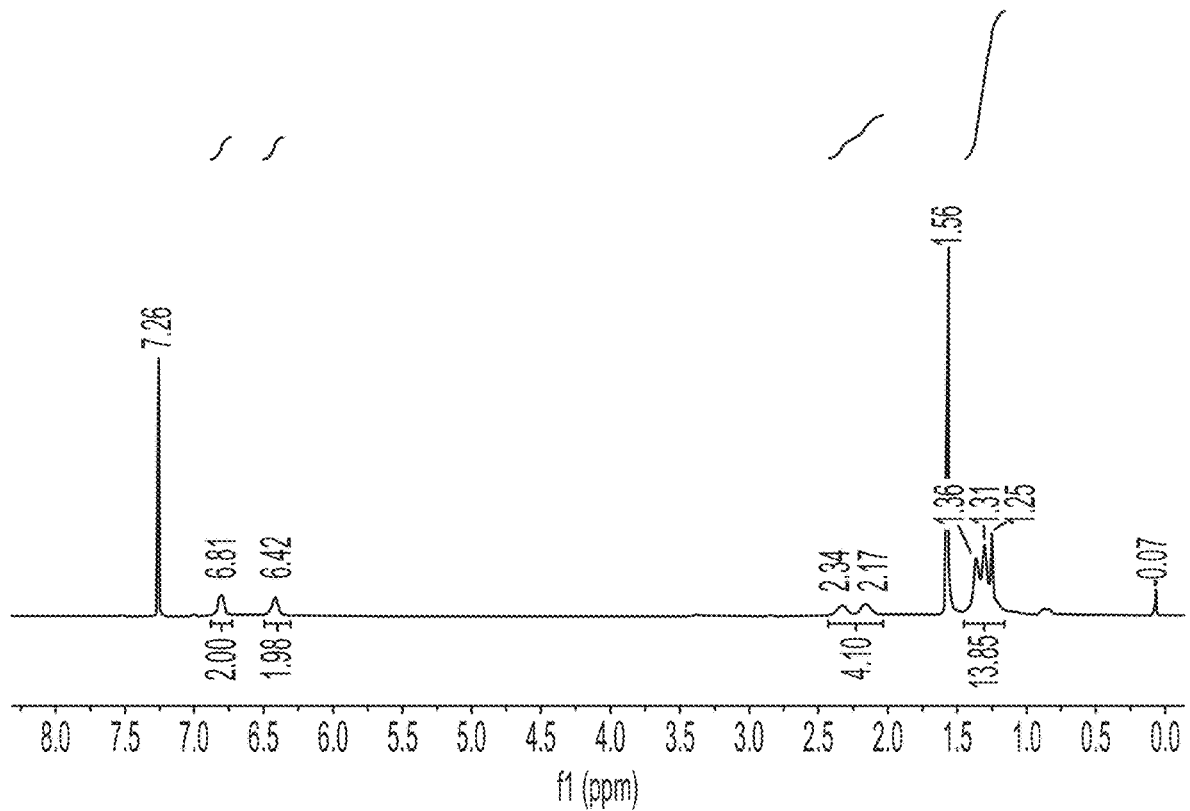
Figure 9C:
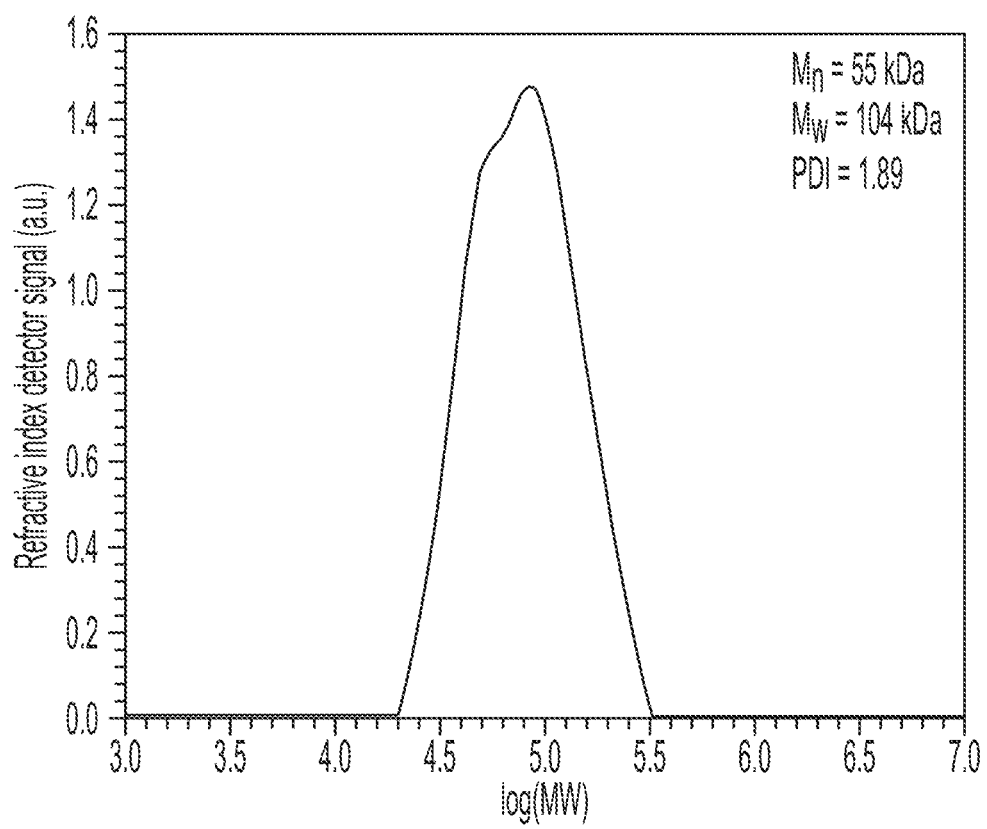
Figure 10A:
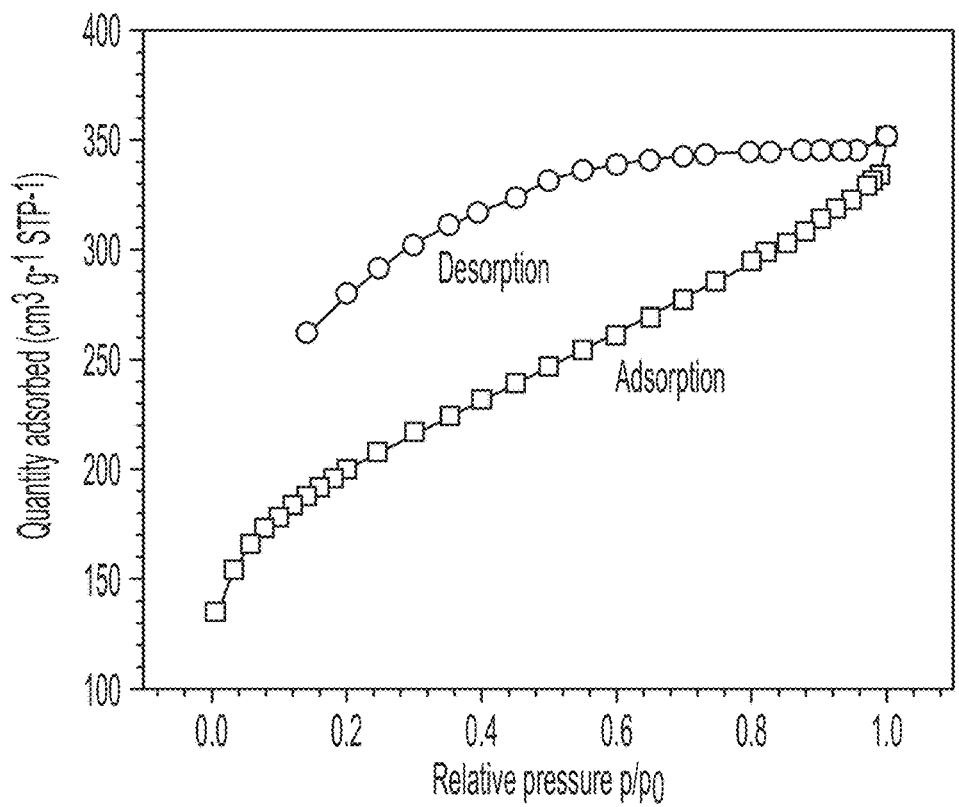
FIGS. 10A-10F show BET and pore size distribution analysis of $CF_3$-ROMP (FIGS. 10A-10B, respectively), OMe-ROMP (FIGS. 10C-10D, respectively) and PIM-1 (FIGS. 10E-10F, respectively), according to one set of embodiments.
Figure 10B:
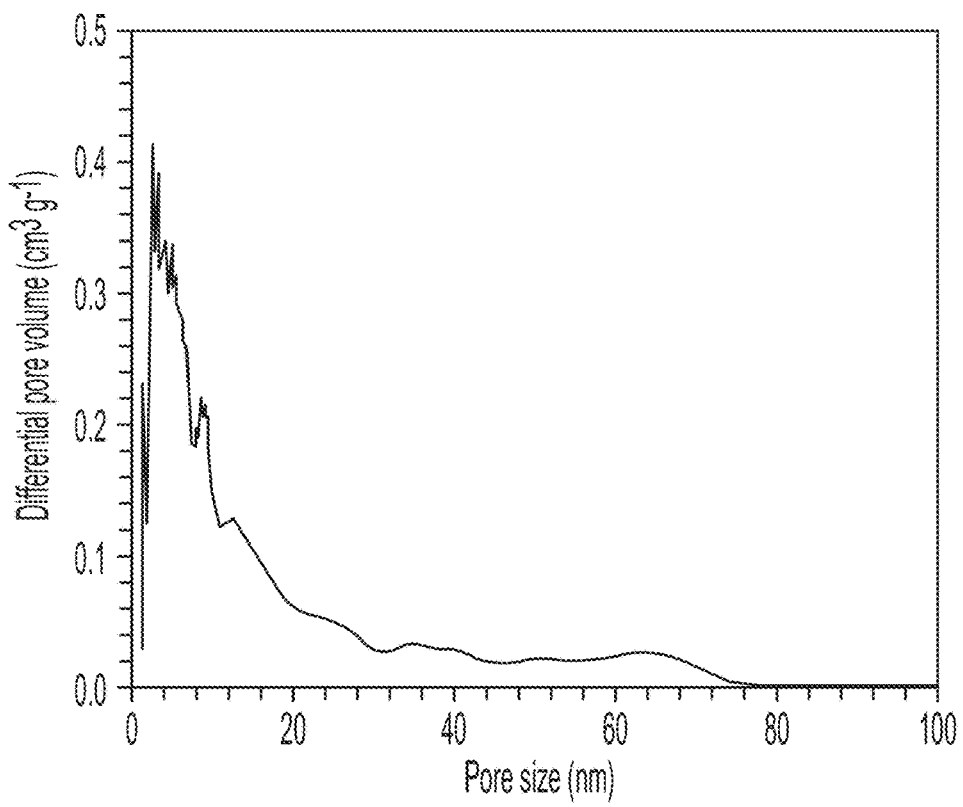
Figure 10C:
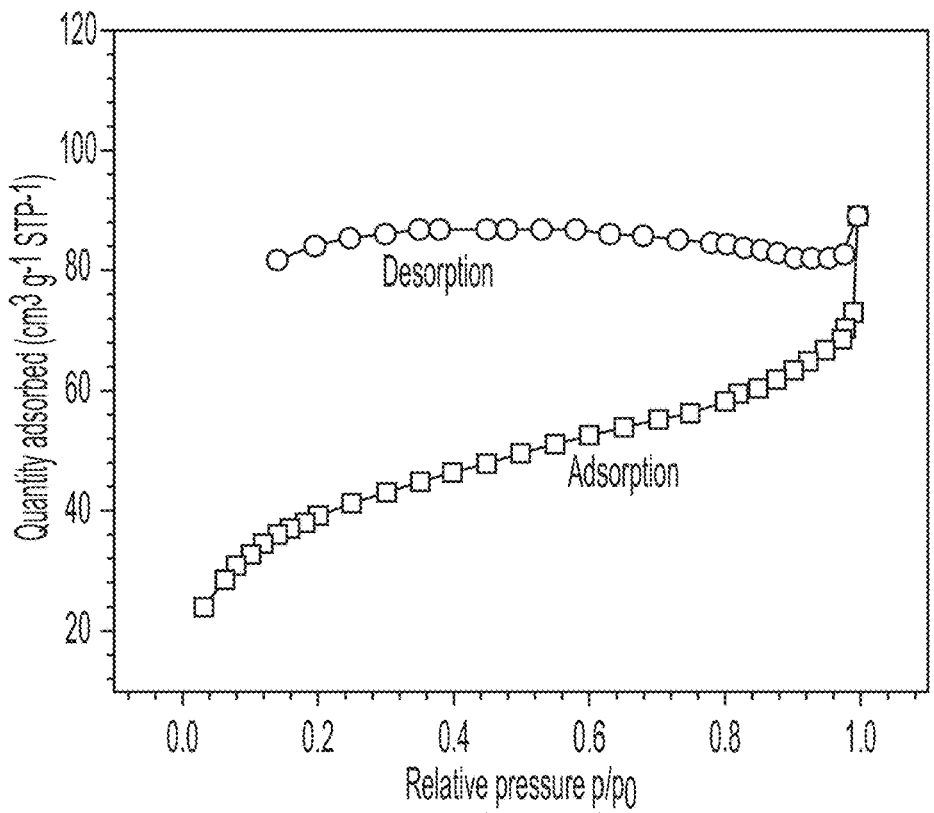
Figure 10D:
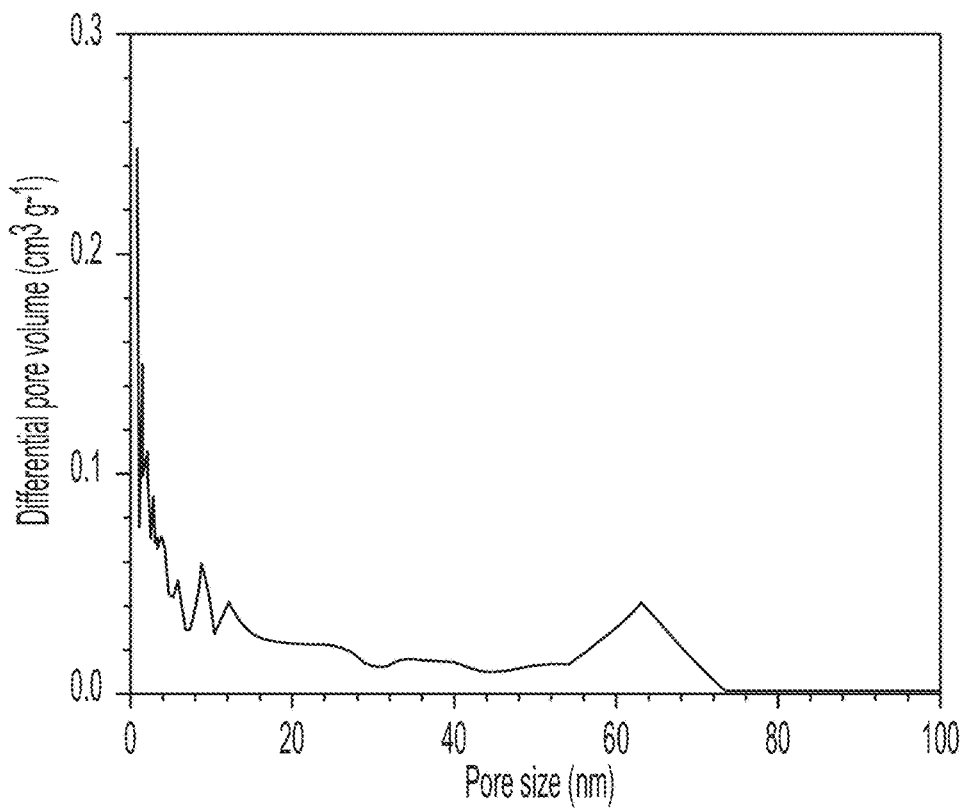
Figure 10E:
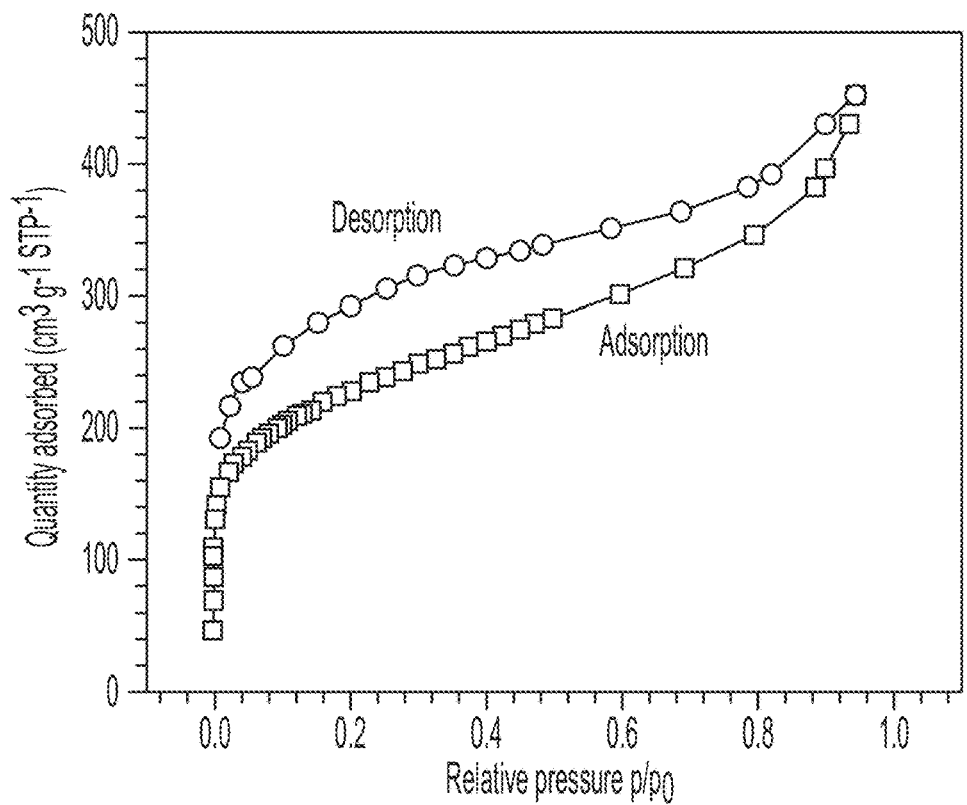
Figure 10F:
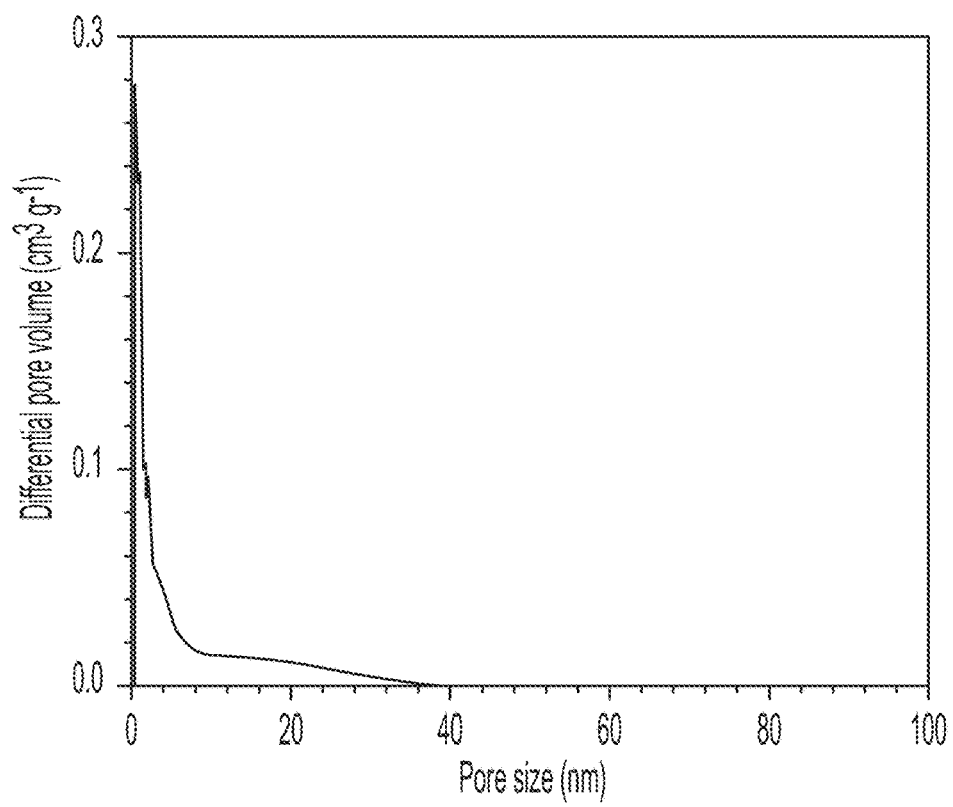

GPC and MALDI-TOF for CF$_3$- and OMe-substituted side chains are shown in FIGS. 5A-5B and FIGS. 6A-6B, respectively. $^1$H NMR, GPC, and DSC of corresponding polymers, CF$_3$-ROMP and OMe-ROMP, as well as field-emission SEM images of fabricated membranes used in gas permeation tests, are shown are shown below in FIGS. 7A-7D and FIGS. 8A-8D. FIGS. 9A-9C instead reports information on PIM-1.

3. BET and Pore-Size Distribution for CF$_3$-ROMP, OMe-ROMP, and PIM-1

The porosity of CF$_3$-ROMP, OMe-ROMP, and PIM-1 powder was measured using nitrogen adsorption isotherm at 77 K with a saturation pressure of P$_0$=1 bar. BET surface area is calculated based on P/Po range from 0.06 to 0.20. CF$_3$-ROMP, OMe-ROMP, and PIM-1 have a Brunauer-Emmett-Teller (BET) internal surface area of 700 m$^2$ g$^{-1}$, 146 m$^2$ g$^{-1}$, and 800 m$^2$ g$^{-1}$, respectively. Pore-size distributions were analyzed using NLDFT based on the adsorption part of isotherm and carbon slit pore geometry. Results are reported in FIGS. 10A-10F.

4. Representative Conformations of Side Chains

Due to the complexity of the Diels-Alder (D-A) reaction, the side chains exhibit versatile stereochemistry depending on the orientation of the phenyl and methylene groups. Here, three representative conformations were selected and molecular mechanics simulation was used to investigate their stable structures. All conformations were geometrically optimized using the MMFF94 force field implemented in Avogadro. For complex organic compounds, the stable structures found in this way could be biased by the initially guessed structures. To avoid this bias, for each conformer, the geometry optimization was started from many different configurations.

Figure 11:
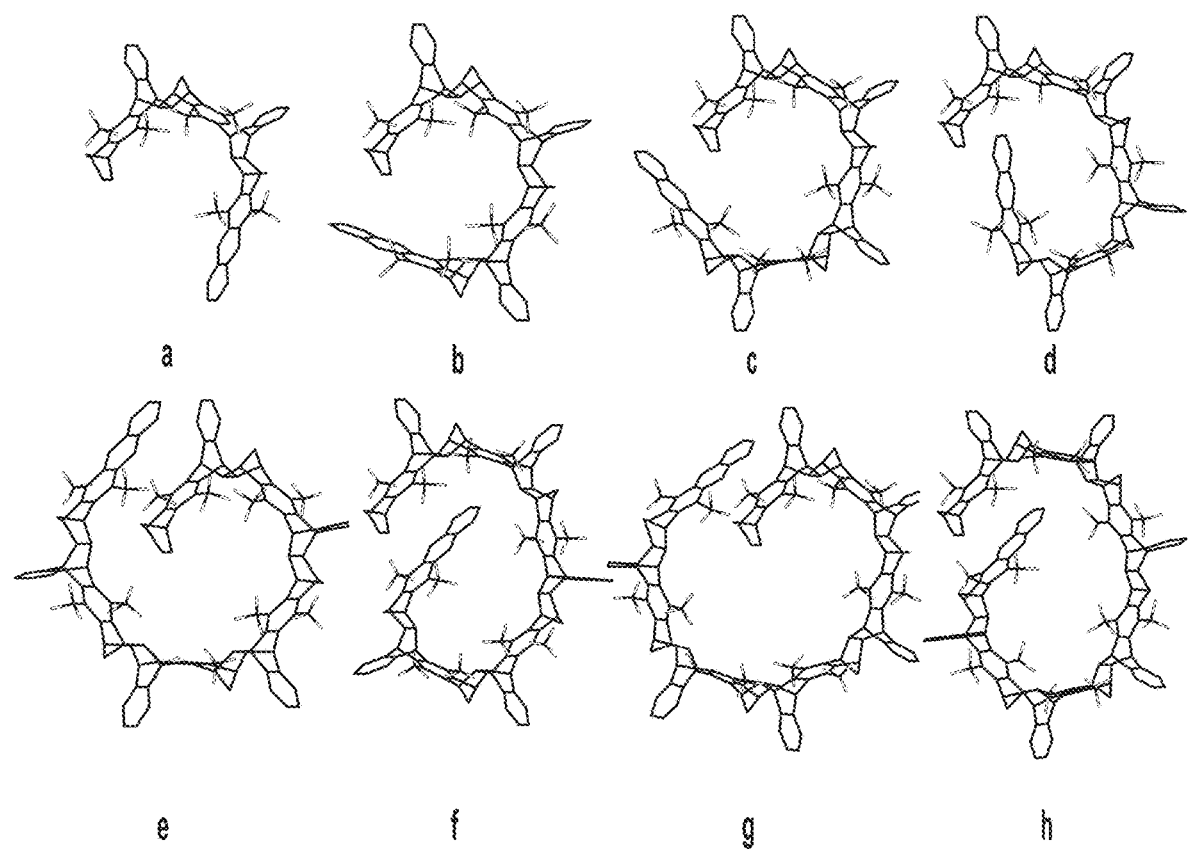
FIG. 11 shows molecular mechanics optimized structures for one of the conformations of the side chain for n=1 (a), 2 (b), 3 (c, d), 4 (e, f), and 5 (g, h), according to one set of embodiments.

A conformation where all phenyl and methylene groups point towards the same side was first considered. Shown in FIG. 11 are the optimized structures for n=1-5. Circular structures are obtained for all n's even starting with chain-shaped initial guesses. For n=1 and 2, the stable structures are unique, while there are two isomers for n≥3, depending on the end phenyl group curving inwards or outwards. It was also noted that n=3 is the minimal length of forming a circle-shaped structure.

Figure 12:
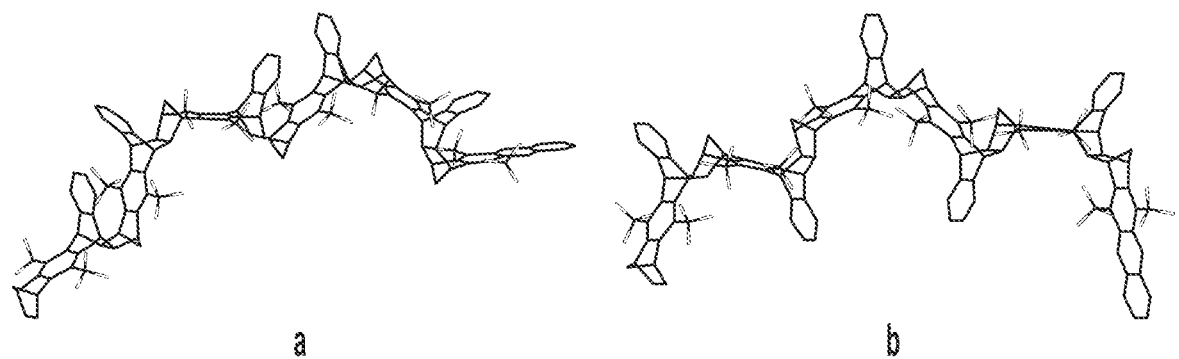
FIG. 12 shows molecular mechanics optimized structures for two other conformations for n=4, according to one set of embodiments.

It was then considered two other conformers for n=4, where the orientation of the phenyl groups and methylene groups alternates, respectively. One stable structure is found for each of them, and the results are shown in FIG. 12. It can be seen that the stereochemistry of both the methylene and phenyl groups has a large effect on the topology of the side chain: alternating these functional groups changes the structure from being circular to wiggling chains.

5. Membrane Fabrication and Treatments

Figure 13A:
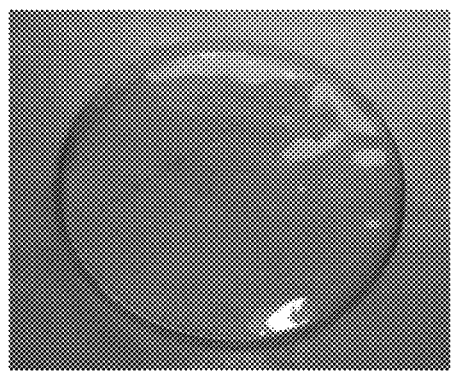
FIGS. 13A-13B shows photographs of $CF_3$-ROMP (FIG. 13A) and OMe-ROMP (FIG. 13B) films as cast from chloroform solutions, according to one set of embodiments.
Figure 13B:
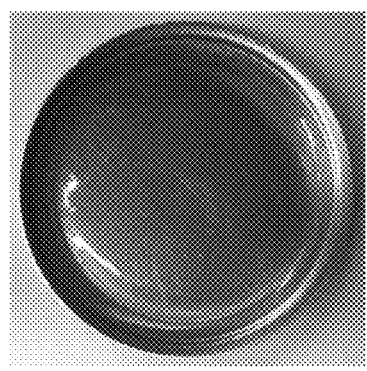

Self-standing films of ROMP polymers and PIM-1 were obtained following the method in the experimental section of this communication. FIGS. 13A-13B show a $CF_3$-ROMP and an OMe-ROMP membrane obtained by solution casting~3 wt % polymer solution in chloroform onto aluminum Petri dishes. Films are approximately 5 cm in diameter. A slow evaporation of the solvent allowed for the formation of stable and defect-free films in the thickness range of 74 to 180 μm.

After 4 days, films were ready for post-casting treatment. Different treatments, which are described below, were performed on the films to investigate their effects on the transport properties:

(A) Soaking in liquid ethanol for 48 h, air-drying for 24 h, and applying dynamic vacuum at 35° C. for 4 h;
(B) Soaking in liquid ethanol for 48 h, air-drying for 24 h, and applying dynamic vacuum at 35° C. for 8 h;
(C) Thermal treatment at 120° C. for 24 h under dynamic vacuum, vapor methanol treatment at 180 mbar (partial pressure of methanol) for 12 h, and applying dynamic vacuum at 100° C. for 16 h;
(D) Thermal treatment at 120° C. for 24 h under dynamic vacuum, vapor methanol treatment at 160 mbar to 200 mbar (partial pressure of methanol) for 12 h, and applying dynamic vacuum at 70° C. overnight;
(E) Thermal treatment at 120° C. for 24 h and applying dynamic vacuum;

The dynamic vacuum provided by Welch DuoSeal 1405 vacuum pumps was <0.01 torr. Table 1 in section 7 summarizes key results obtained for $CF_3$-ROMP, OMe-ROMP, and PIM-1 after following the protocols described above. Measurements were performed immediately after the end of the treatment methods.

6. TGA Experiments

Thermogravimetric analysis (TGA) was used to assess the thermal stability of ROMP polymers and PIM-1 and to verify that all the casting solvent (chloroform) and the non-solvent used in the post-casting treatment (ethanol or methanol), were completely removed from the films before performing gas permeation experiments. FIG. 14A shows three heating profiles for $CF_3$-ROMP, OMe-ROMP, and PIM-1 after all samples were subjected to an identical treatment method, (B). These samples were used to perform aging experiments. There was no detectable mass loss up to 350° C. for each polymer, which indicated that neither chloroform nor non-solvent were present in the films at the end of post-casting treatment (FIG. 14A). Furthermore, both ROMP polymers showed excellent thermal stability. $CF_3$-ROMP degradation started at ~380° C., while OMe-ROMP degradation started at ~350° C. This result suggests that these polymers may possess thermal stability needed for industrial applications that operate at high temperatures.

Different treatments, described in Section 5 above, were applied to films made from new ROMP polymers to investigate how transport properties changed as a function of the post-casting treatment as reported in Table 1. Among those treatments, TGA was performed on samples that underwent treatment (B), (D), and (E) and additional heating profiles are shown in FIGS. 14B-14C. Within experimental error, all the curves essentially overlapped, indicating that all the treatments led to membranes free of casting solvent and swelling agents.

7. Gas Transport Properties and Effect of the Post-Casting Treatments

To characterize samples for gas transport performance, permeabilities were determined by direct permeation experiments and diffusivities were estimated from time-lag measurements. Six light gases (He, $H_2$, $CH_4$, $N_2$, $O_2$, and $CO_2$) were considered at 35° C. and ~1 bar. Glassy polymers, including PIMs, transport properties are dependent on film history and time, which can lead to a wide distribution of values for permeability and diffusivity. For this reason, the change in permeability for different post-casting treatment methods were carefully tracked over time. Results obtained are summarized in Table 1.

Since the initial downstream pressure, $\mathcal{P}_d$, was assumed to be full vacuum, permeability can be evaluated at pseudo-steady state from the linear portion of the pressure versus time curve, when $$\frac{dp_d}{dt}$$

is constant, by using the following equation:

$$\mathcal{P} = \frac{V}{RT}\frac{l}{A}\frac{1}{(p_u - \bar{p}_d)}\left(\frac{dp_d}{dt}\right) \quad \text{Equation (S1)}$$

in which R is the gas constant, T is the operative absolute temperature, l is the film thickness, $\mathcal{P}_u$ is the upstream pressure, and $\bar{\mathcal{P}}_d$ is the average downstream pressure of the considered gas.

The ideal permselectivity between gas A and B, $\alpha_{A/B}$ is generally given by Equation (S3) and can be split in two contributions: $\alpha_{A/B}^D$, which is the diffusivity selectivity, and $\alpha_{A/B}^S$, which is the solubility selectivity in the framework of the solution-diffusion model, which is represented by Equation (S2):

$$\mathcal{P} = \mathcal{DS} \quad \text{Equation (S2)}$$

$$\alpha_{A/B} = \frac{y_{A,d}/y_{B,d}}{y_{A,u}/y_{B,u}} \cong \frac{\mathcal{P}_A}{\mathcal{P}_B} = \frac{\mathcal{D}_A}{\mathcal{D}_B}\frac{\mathcal{S}_A}{\mathcal{S}_B} = \alpha^{\mathcal{D}}_{A/B}\alpha^{\mathcal{S}}_{A/B} \quad \text{Equation (S3)}$$

The parameters $y_{A,d}$ and $y_{B,d}$ are the molar fractions at the downstream side of the film for gases A and B, respectively, while $y_{A,u}$ and $y_{B,u}$ are those at the upstream side of the film. $\mathcal{P}_A$ is the permeability of the more permeable gas and $\mathcal{P}_E$ is that of the less permeable one.

Time-lag, $\theta$, was evaluated for all gases by extrapolating the linear portion of the pressure-versus-time curve to the time axis. Since experiments were performed starting from an initial concentration of gas across the membrane equal to zero, $\theta$ can be related to the diffusivity, $\mathcal{D}$, through the following equation:

$$\mathcal{D} = \frac{l^2}{6\theta} \quad \text{Equation (S4)}$$

Since the permeabilities of the ROMP polymers and PIM-1 were remarkably high, in some cases, time-lag values obtained were often less than 2 seconds, which is close to the resolution of the acquisition time of the permeation system. For this reason, diffusion coefficients are not reported in Table 1 when $\theta$ was too small to be determined within the resolution of these experiments, typically for He, $H_2$, and sometimes $O_2$ and $CO_2$.

The highest values of permeability were obtained from films freshly soaked in liquid ethanol. In particular, $CF_3$-ROMP and OMe-ROMP achieved $CO_2$ permeability of >21000 Barrer and 2900 Barrer, respectively. However, when considering membranes at different aging stages or films not soaked in ethanol, $CO_2$ permeability measured was in the range of $6-21\times10^3$ Barrer for $CF_3$—ROMP and in the range of $10-29\times10^2$ Barrer for OMe-ROMP. Vapor methanol treatment was designed to provide an alternative, less invasive way to erase history from films. Partial pressures of 160 mbar to 200 mbar of methanol were reached after thermally treating the films at 120° C. for 24 h under vacuum. This approach led to considerably different results with respect to the traditional treatment procedure involving liquid alcohols. The permeability of ROMP polymers that underwent vapor methanol treatment was approximately halved, while selectivity was generally higher. For example, $CO_2/N_2$ selectivity increased from 18.9 to 23.4 for OMe-ROMP. PIM-1, which was used as a benchmark to compare ROMP polymers with the current state-of-the-art, gave a similar response to the change of treatment.

TABLE 1

Gas permeability and diffusivity values for $CF_3$-ROMP, OMe-ROMP, and PIM-1 measured from films with different history: (A) Soaking in liquid ethanol for 48 h, air-drying for 24 h, and applying dynamic vacuum at 35° C. for 4 h, (B) Soaking in liquid ethanol for 48 h, air-drying for 24 h, and applying dynamic vacuum at 35° C. for 8 h, (C) Thermal treatment at 120° C. for 24 h under dynamic vacuum, vapor methanol treatment at 180 mbar (partial pressure of methanol) for 12 h, and applying dynamic vacuum at 100° C. for 16 h, (D) Thermal treatment at 120° C. for 24 h under dynamic vacuum, vapor methanol treatment at 160 mbar to 200 mbar (partial pressure of methanol) for 12 h, and applying dynamic vacuum at 70° C. overnight, (E) Thermal treatment at 120° C. for 24 h and applying dynamic vacuum. Permeability ($\mathcal{P}_H$) in Barrer ($10^{-10}$ cm$^3$(STP) cm cm$^{-2}$ s$^{-1}$ cmHg$^{-1}$), Diffusion Coefficient ($\mathcal{D}_F$) in $10^{-8}$ cm$^2$ s$^{-1}$. All data were calculated at 35° C. and upstream pressure ~1 bar.

| Polymer | Treatment | Aging (h) | Thickness (μm) | $\mathcal{P}_{He}$ ($\mathcal{D}_{He}$) | $\mathcal{P}_{H_2}$ ($\mathcal{D}_{H_2}$) | $\mathcal{P}_{CH_4}$ ($\mathcal{D}_{CH_4}$) | $\mathcal{P}_{N_2}$ ($\mathcal{D}_{N_2}$) | $\mathcal{P}_{O_2}$ ($\mathcal{D}_{O_2}$) | $\mathcal{P}_{CO_2}$ ($\mathcal{D}_{CO_2}$) |
|---|---|---|---|---|---|---|---|---|---|
| $CF_3$-ROMP | (A) | 1 | 148 | 4296 (/) | 8303 (/) | 3970 (319) | 2367 (570) | 4354 (995) | 21266 (633) |
| " | " | 830 | " | / (/) | 6816 (/) | 2942 (263) | 1825 (493) | / (/) | 16148 (/) |
| " | (B) | 1 | 119 | 4372 (/) | 8327 (3376) | 3053 (245) | 1993 (509) | 4035 (888) | 18490 (513) |
| " | " | 1000 | " | 3993 (/) | 7285 (/) | 1995 (154) | 1464 (366) | 3326 (632) | 15104 (418) |
| " | (C) | 1 | 80 | / (/) | 4535 (/) | / (/) | 980 (287) | 2072 (/) | / (/) |
| " | " | 500 | " | 2685 (/) | 4736 (/) | / (/) | 935 (209) | 2088 (/) | 9919 (/) |
| " | (D) | 80 | 109 | / (/) | 4864 (/) | 1778 (188) | 1195 (460) | 2346 (/) | 11144 (461) |
| " | " | 100 | " | / (/) | 4844 (/) | 1718 (173) | / (/) | / (/) | 10910 (514) |
| " | " | 300 | 110 | / (/) | 4719 (/) | 1648 (225) | 1098 (/) | 2285 (/) | 10815 (429) |
| " | " | 310 | " | / (/) | 4708 (/) | 1598 (214) | / (/) | / (/) | / (/) |
| " | " | 600 | " | / (/) | 4679 (/) | 1501 (202) | 1039 (/) | 2220 (/) | 10490 (436) |
| " | " | 610 | " | / (/) | 4677 (/) | / (/) | / (/) | 2258 (640) | / (/) |
| " | " | 1100 | " | / (/) | 4661 (/) | 1419 (134) | 1008 (410) | 2187 (/) | 10324 (443) |
| " | (E) | 120 | 141 | / (/) | 3048 (2820) | 703 (81.9) | 523 (211) | 1244 (429) | 6361 (257) |

TABLE 1-continued

Gas permeability and diffusivity values for $CF_3$-ROMP, OMe-ROMP, and PIM-1 measured from films with different history: (A) Soaking in liquid ethanol for 48 h, air-drying for 24 h, and applying dynamic vacuum at 35° C. for 4 h, (B) Soaking in liquid ethanol for 48 h, air-drying for 24 h, and applying dynamic vacuum at 35° C. for 8 h, (C) Thermal treatment at 120° C. for 24 h under dynamic vacuum, vapor methanol treatment at 180 mbar (partial pressure of methanol) for 12 h, and applying dynamic vacuum at 100° C. for 16 h, (D) Thermal treatment at 120° C. for 24 h under dynamic vacuum, vapor methanol treatment at 160 mbar to 200 mbar (partial pressure of methanol) for 12 h, and applying dynamic vacuum at 70° C. overnight, (E) Thermal treatment at 120° C. for 24 h and applying dynamic vacuum. Permeability ($\mathcal{P}_H$) in Barrer ($10^{-10}$ cm$^3$(STP) cm cm$^{-2}$ s$^{-1}$ cmHg$^{-1}$), Diffusion Coefficient ($\mathcal{D}_E$) in $10^{-8}$ cm$^2$ s$^{-1}$. All data were calculated at 35° C. and upstream pressure ~1 bar.

| Polymer | Treatment | Aging (h) | Thickness (μm) | $\mathcal{P}_{He}$ ($\mathcal{D}_{He}$) | $\mathcal{P}_{H_2}$ ($\mathcal{D}_{H_2}$) | $\mathcal{P}_{CH_4}$ ($\mathcal{D}_{CH_4}$) | $\mathcal{P}_{N_2}$ ($\mathcal{D}_{N_2}$) | $\mathcal{P}_{O_2}$ ($\mathcal{D}_{O_2}$) | $\mathcal{P}_{CO_2}$ ($\mathcal{D}_{CO_2}$) |
|---|---|---|---|---|---|---|---|---|---|
| OMe-ROMP | (B) | 1 | 160 | 664 (/) | 1409 (2679) | 270 (25.8) | 153 (73.6) | 414 (153) | 2900 (91.4) |
| " | " | 1000 | " | 563 (/) | 1127 (1955) | 178 (18.0) | 112 (60.6) | 313 (134) | 2154 (74.3) |
| | (C) | 1 | 74 | / (/) | 535 (/) | / (/) | 46 (21.1) | 141 (78.4) | / (/) |
| | " | 500 | " | / (/) | 535 (/) | / (/) | 42 (19.4) | 131 (63.8) | / (/) |
| | (D) | 100 | 157 | / (/) | 698 (2038) | 101 (15.6) | 58 (45.4) | 181 (120) | 1357 (97.4) |
| | " | 110 | " | / (/) | 697 (1844) | / (/) | / (/) | / (/) | 1319 (94.8) |
| | " | 150 | 144 | / (/) | 696 (1697) | 119 (16.4) | 69 (41.3) | 182 (95.2) | 1343 (61.7) |
| | (E) | 48 | 180 | / (/) | 587 (1501) | 85 (7.81) | 52 (25.7) | 150 (54.5) | 1072 (36.0) |
| | " | 60 | " | / (/) | 578 (924) | 83 (7.45) | 51 (30.5) | / (/) | 1053 (38.5) |
| PIM-1 | (B) | 1 | 119 | 2176 (/) | 5251 (3971) | 1297 (81.9) | 777 (189) | 2177 (517) | 12318 (268) |
| | " | 1000 | " | 1882 (/) | 4437 (/) | 896 (58.7) | 576 (155) | 1736 (450) | 10005 (293) |
| | (C) | 1 | 126 | / (/) | 3293 (/) | / (/) | 444 (191) | 1258 (/) | / (/) |
| | " | 500 | " | 1481 (/) | 3325 (/) | / (/) | 417 (153) | 1213 (/) | / (/) |

Figure 15B:
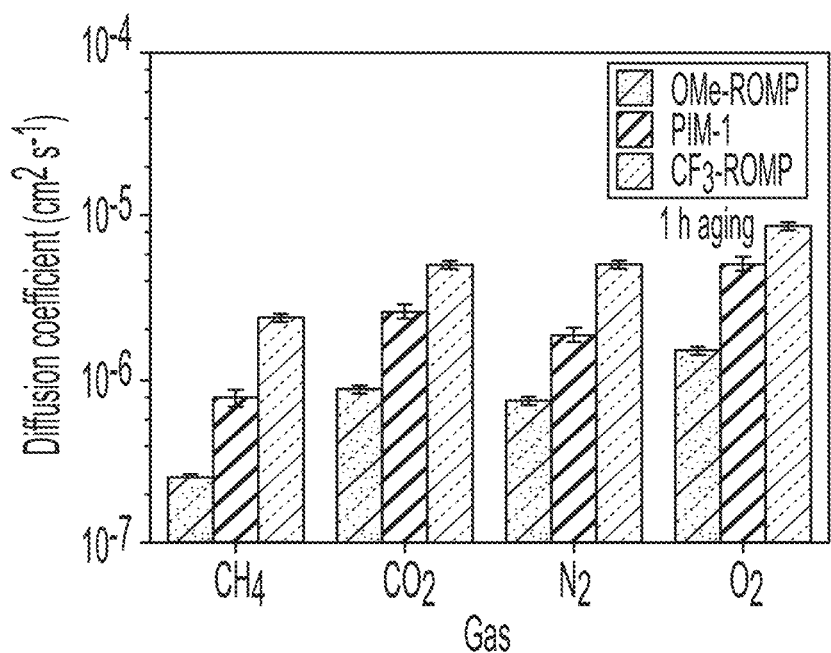
Figure 15C:
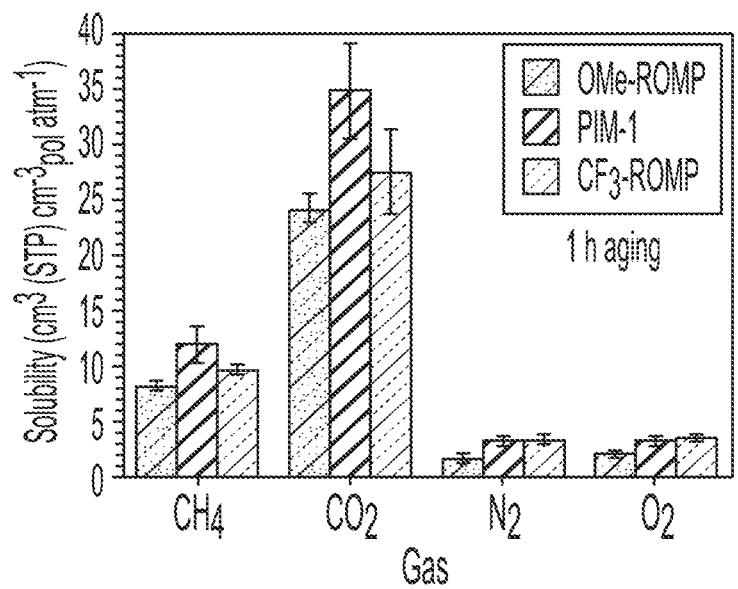
Figure 15D:
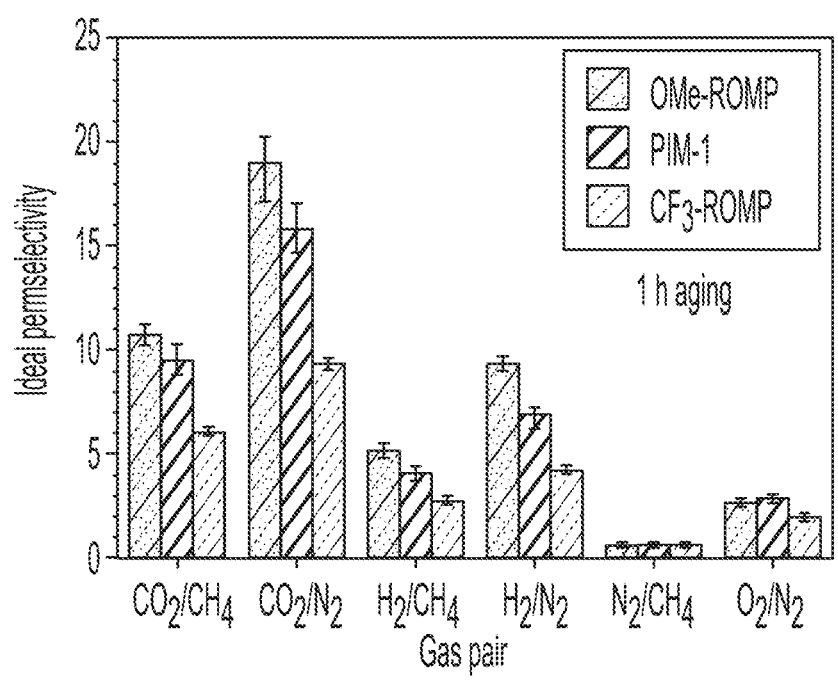
Figure 16A:
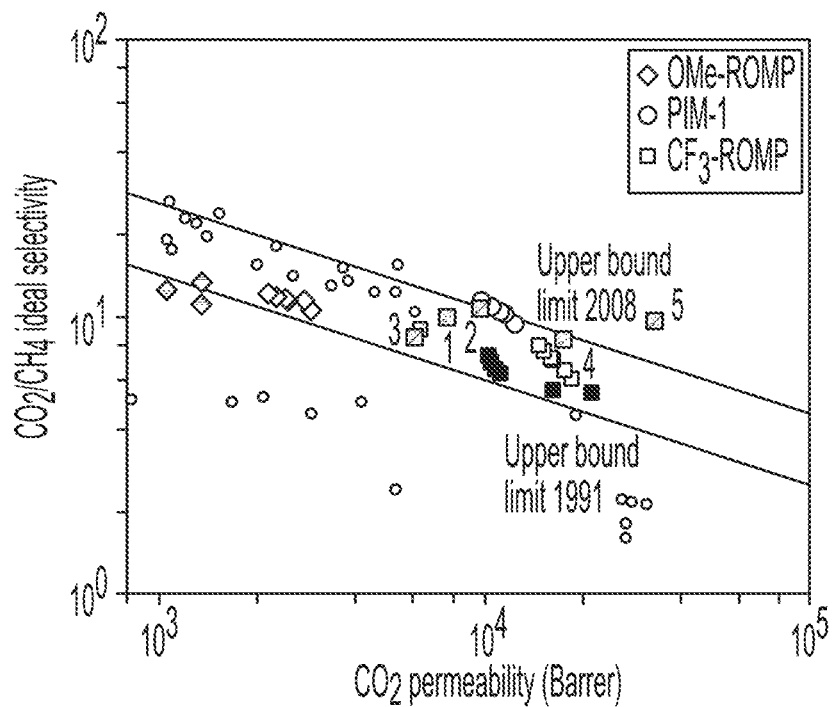
FIGS. 16A-16E show plots of permeability trade-off in Robeson plots (FIG. 16A) $CO_2/CH_4$ (FIG. 16B) $CO_2/N_2$, ((FIG. 16C) $H_2/CH_4$, (FIG. 16D) $H_2/N_2$, and (FIG. 16E) $H_2/CO_2$. Different treatments: Filled marks (A), Outline with white fill (B), Dot in center (C), Top half filled (D), and Bottom half filled (E). 1) PIM-EA-TB, 2) PIM-Trip-TB, 3)PIM-TMN-SBI, 4) PIM-TMN-Trip-TB, and 5)PIM-TMN-Trip, according to one set of embodiments.
Figure 16B:
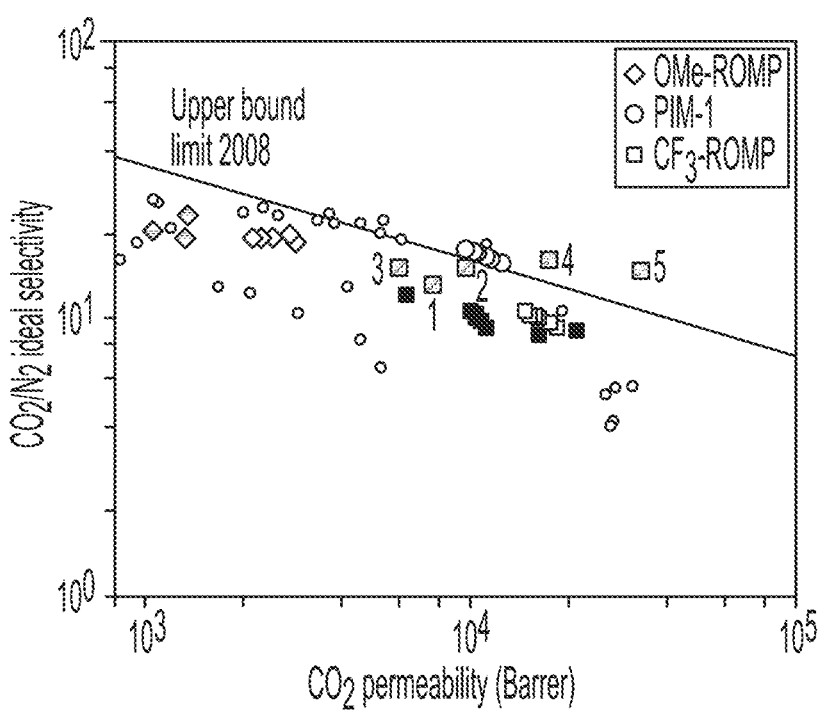
Figure 16C:
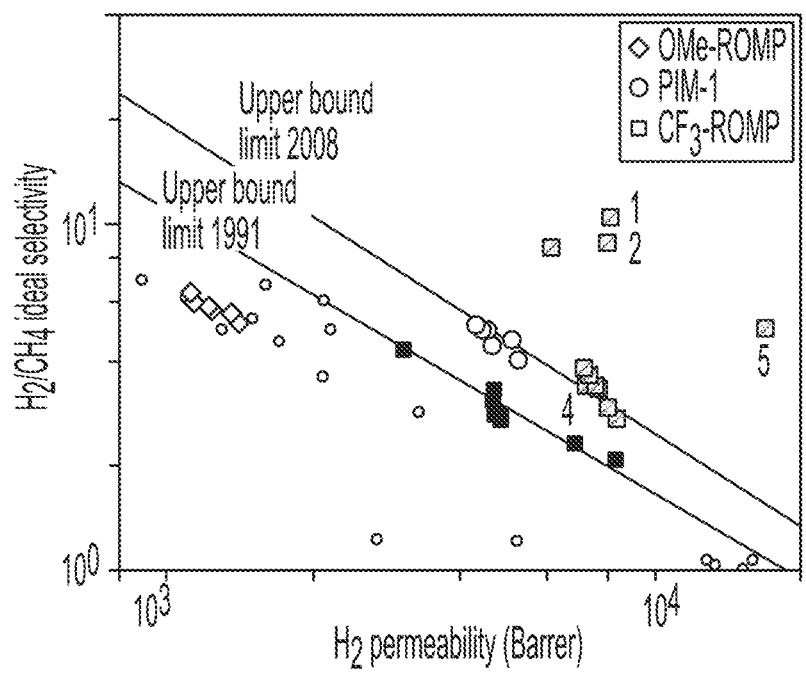
Figure 16D:
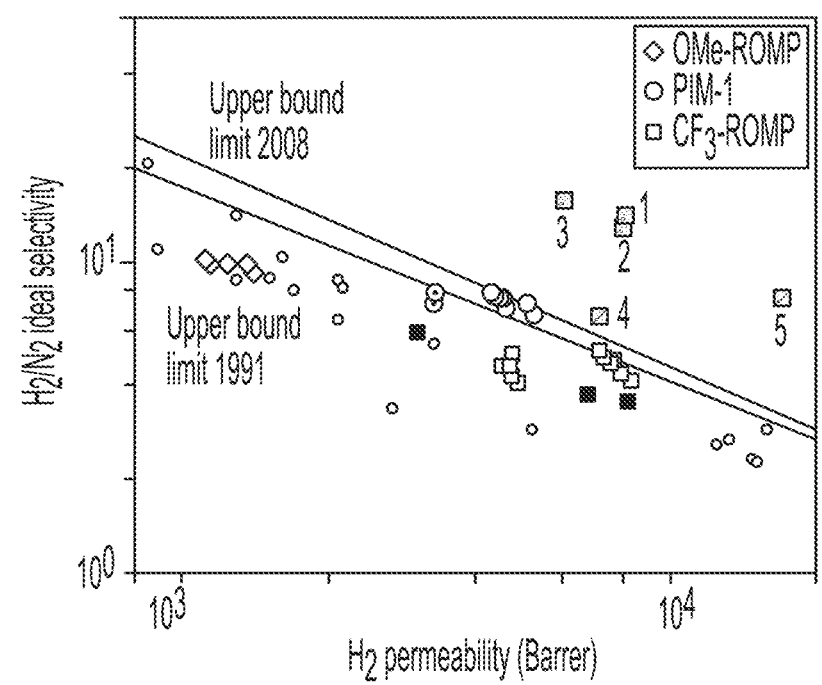
Figure 16E:
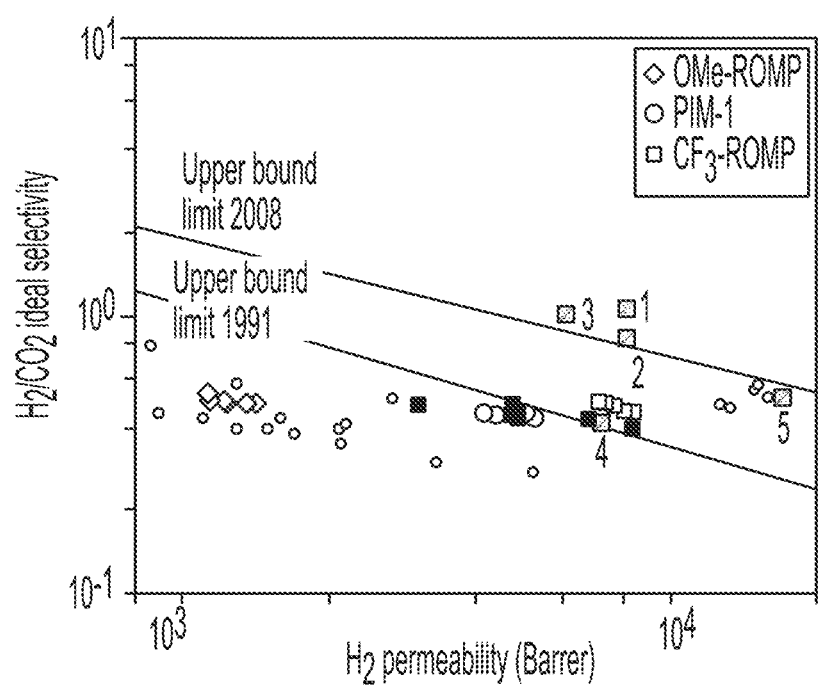

FIGS. 15A-15E visually reveals the performance differences among the polymers investigated. Data reported refers to samples that underwent treatment (B) with identical aging history. Standard deviations were calculated using the error propagation approach. It is clear that a small variation on the ladder-type side chain functionality in ROMP polymers (i.e., —CF$_3$ versus —OMe), led to sensitive variations in gas transport properties. CF$_3$-ROMP permeability was one order of magnitude higher than that of OMe-ROMP and almost double that of PIM-1. By looking at the diffusivity and solubility contributions to permeability, FIG. 15B shows that high diffusion coefficient values for each gas for CF$_3$-ROMP were the primary reason behind the high permeability values for this sample. FIG. 15C illustrates that while PIM-1 solubility coefficients exceeded those of both ROMPs for CO$_2$ and CH$_4$, PIM-1 and CF$_3$-ROMP had similar solubility for N$_2$ and O$_2$. As expected from the trade-off usually observed in glassy polymers, selectivity follows the opposite trend with respect to permeability among samples. FIG. 15D shows that OMe-ROMP is the most selective polymer for almost all gas pairs. Further explanation to this finding is found in the main part of this communication.

About 30 years ago, Robeson popularized a way to represent polymer performance for a large database of property sets and compare them to one another. Permeability-based graphs are shown above (FIG. 2). Herein, more detailed versions are shown in which performance obtained from treatments are included (A), (C), (D), and (E) (FIGS. 16A-16E).

Figure 17A:
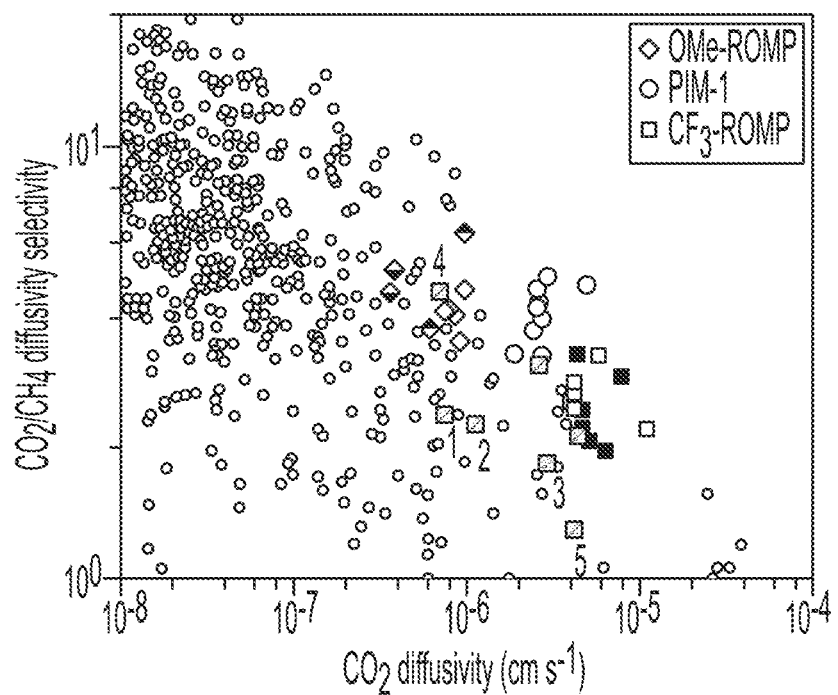
FIGS. 17A-17B show plots of diffusivity trade-off in Robeson-like plots for (FIG. 17A) $CO_2/CH_4$ and (FIG. 17B) $CO_2/N_2$. Different treatments: Filled marks (A), Outline with white fill (B), Dot in center (C), Top half filled (D), and Bottom half filled (E). 1) PIM-EA-TB, 2) PIM-Trip-TB, 3)PIM-TMN-SBI, 4) PIM-TMN-Trip-TB, and 5)PIM-TMN-Trip, according to one set of embodiments.
Figure 17B:
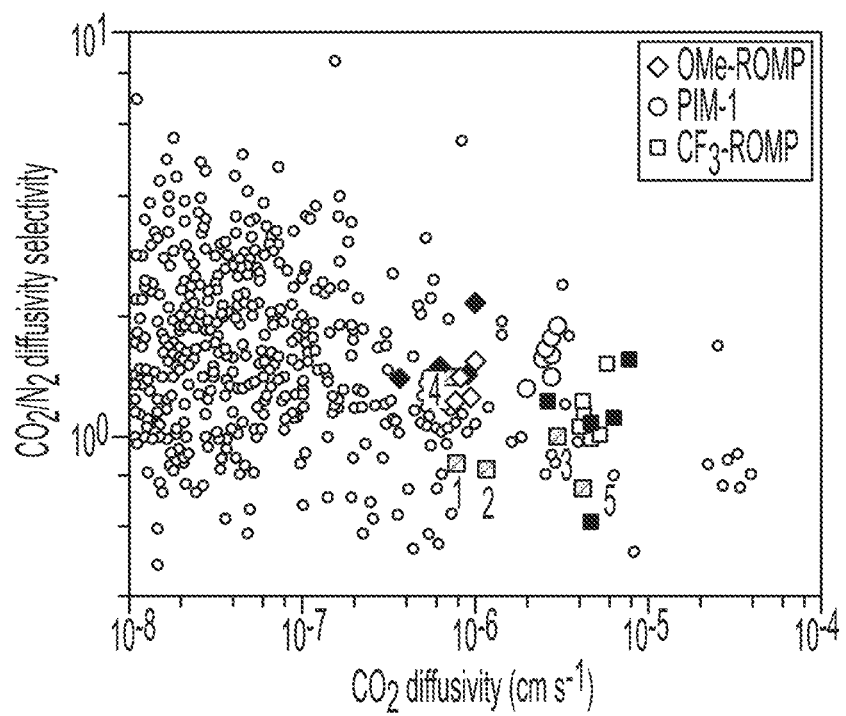
Figure 18A:
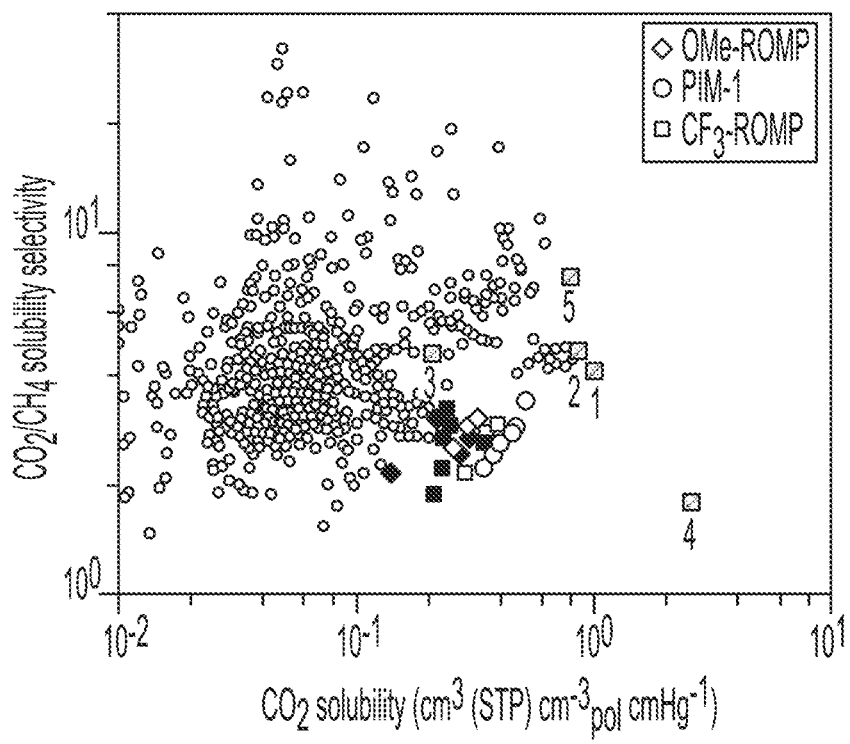
FIGS. 18A-18B show plots of solubility trade-off in Robeson-like plots (FIG. 18A) $CO_2/CH_4$ and (FIG. 18B) $CO_2/N_2$. Different treatments: Filled marks (A), Outline with white fill (B), Dot in center (C), Top half filled (D), and Bottom half filled (E). 1) PIM-EA-TB, 2) PIM-Trip-TB, 3)PIM-TMN-SBI, 4) PIM-TMN-Trip-TB, and 5)PIM-TMN-Trip, according to one set of embodiments.
Figure 18B:
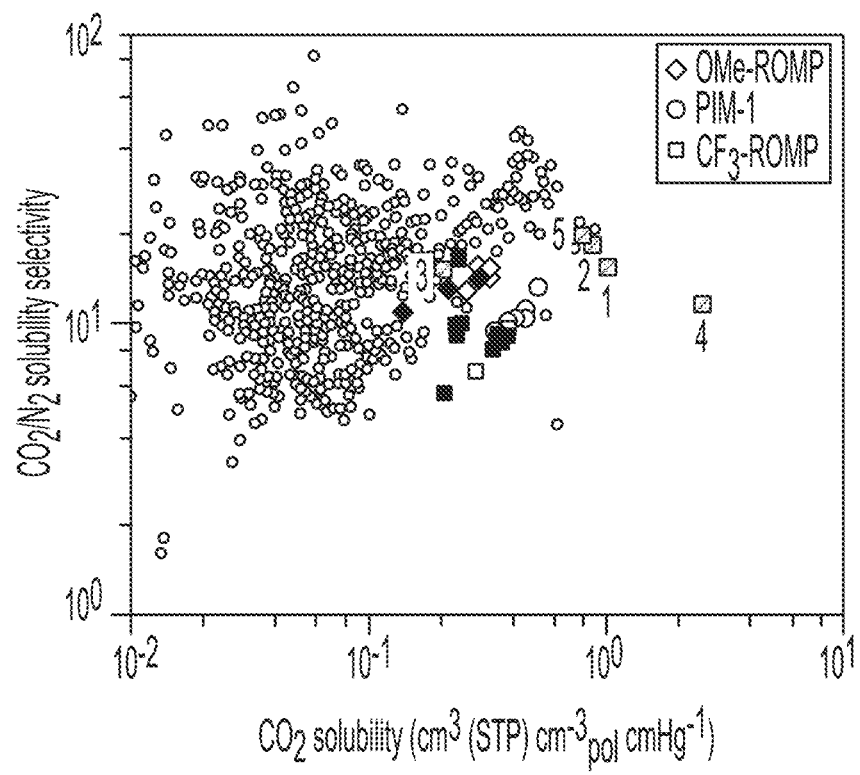

Similar plots can be developed for diffusion (FIGS. 17A-17B) and solubility (FIGS. 18A-18B). Diffusivity and solubility results were compared for ROMPs and PIM-1 on Robeson-like plots with a large database from the literature for a series of gas pairs. As with Robeson upper bound plots for permeability, ideal materials should generally be located in the upper right corner of the graph.

Molecular diffusivity can change by orders of magnitude among different polymers for light gases, while solubility generally experiences a narrower variation. Additionally, permeability upper bound selectivity values are mostly determined by diffusivity selectivity over solubility selectivity. As anticipated in FIG. 15B, CF$_3$-ROMP has exceptionally high diffusivity. In fact, blue markers representing CF$_3$-ROMP are on the extreme upper-right front of the populated data points on the following graphs, while most of the other polymers from this work and from literature are distributed to the lower-left of the front. For gas pairs like CO$_2$/CH$_4$, CO$_2$/N$_2$, N$_2$/CH$_4$, O$_2$/N$_2$, O$_2$/CH$_4$, and O$_2$/CO$_2$, high values of diffusivity were accompanied by modest diffusivity selectivity, placing CF$_3$-ROMP on the upper limit with respect to other polymers with some of the highest combinations of diffusivity and diffusivity selectivity (FIGS. 17A-17B).

Exceptional results can be obtained if high diffusivity selectivity is coupled with very high gas solubility. Robeson-like solubility plots in FIGS. 18A-18B reveal how the solubility of CO$_2$ is relatively low in ROMP polymers. The improvement of solubility would lead this new class of polymers to be even more competitive in terms of separation performance. This outcome would be particularly beneficial towards compounds like $CO_2$ as can be observed in FIGS. 18A-18B.

8. Physical Aging Study

Figure 19A:
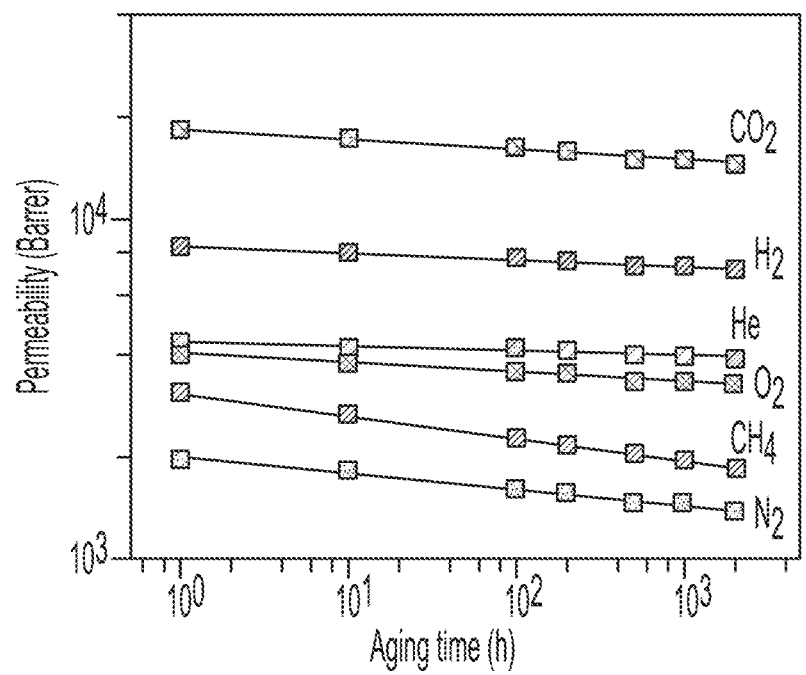
FIGS. 19A-19C show plots of permeability as a function of time, Data were collected at 35° C. and 1 bar upstream pressure for (FIG. 19A) $CF_3$-ROMP, (FIG. 19B) OMe-ROMP, and (FIG. 19C) PIM-1, according to one set of embodiments.
Figure 19B:
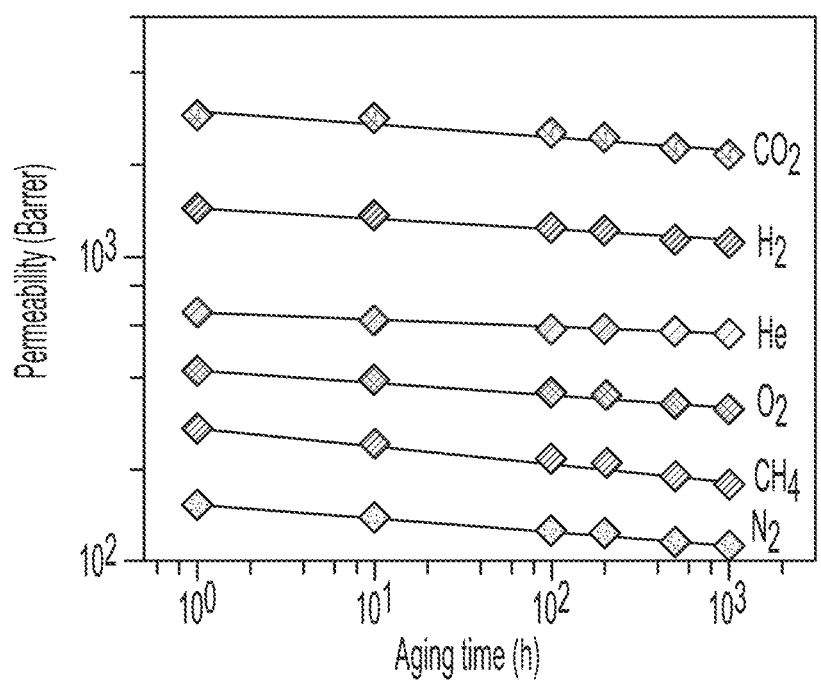
Figure 19C:
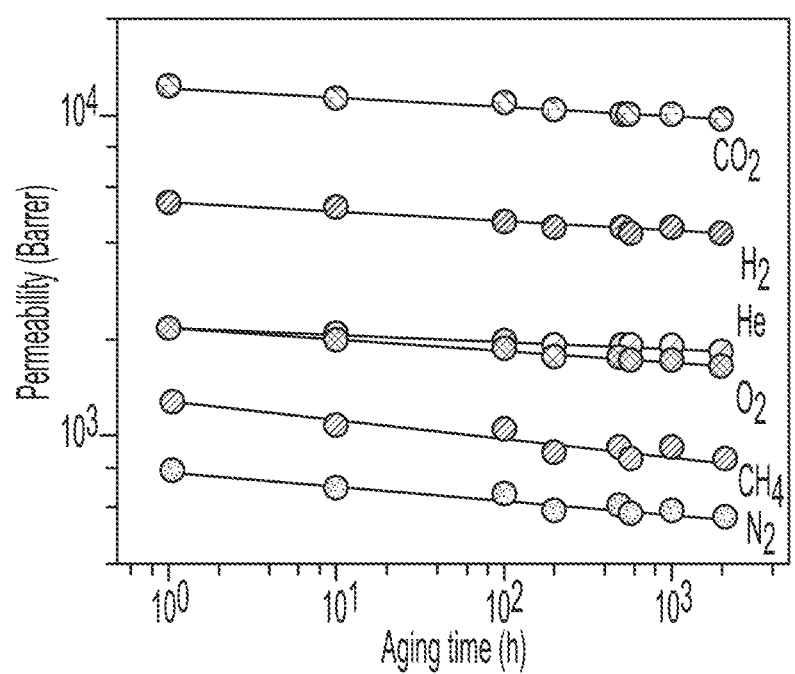
Figure 20A:
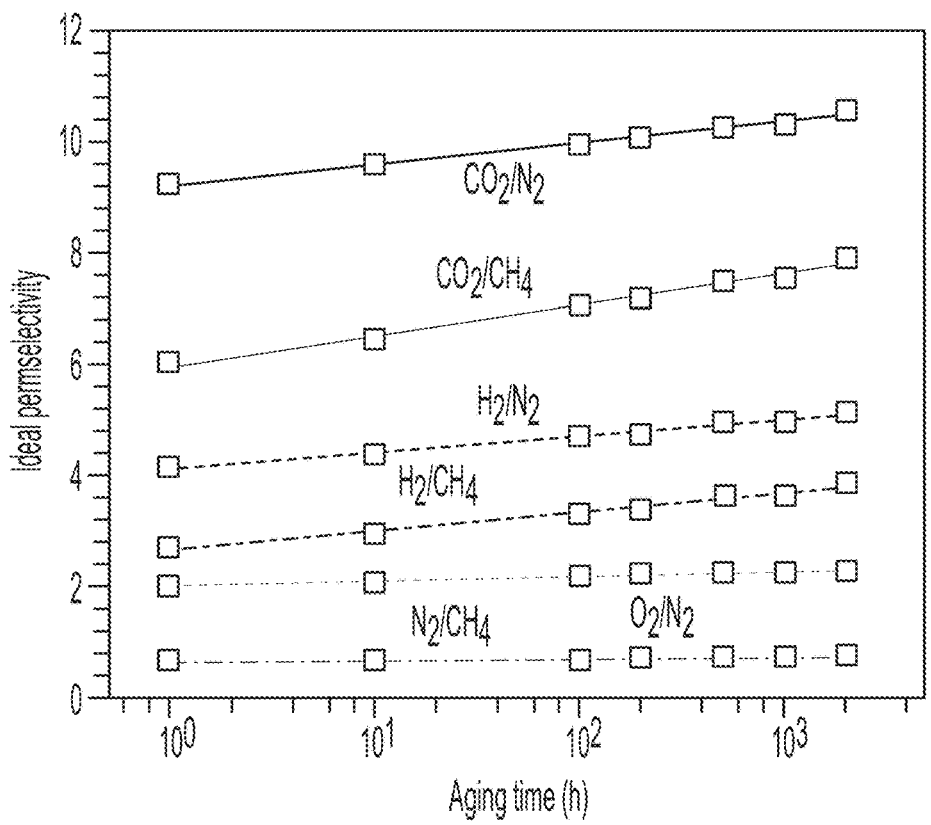
FIGS. 20A-20C show plots of permeability ideal selectivity as a function of time, Data were collected at 35° C. and 1 bar upstream pressure for (FIG. 20A) $CF_3$-ROMP, (FIG. 20B) OMe-ROMP, and (FIG. 20C) PIM-1, according to one set of embodiments.
Figure 20B:
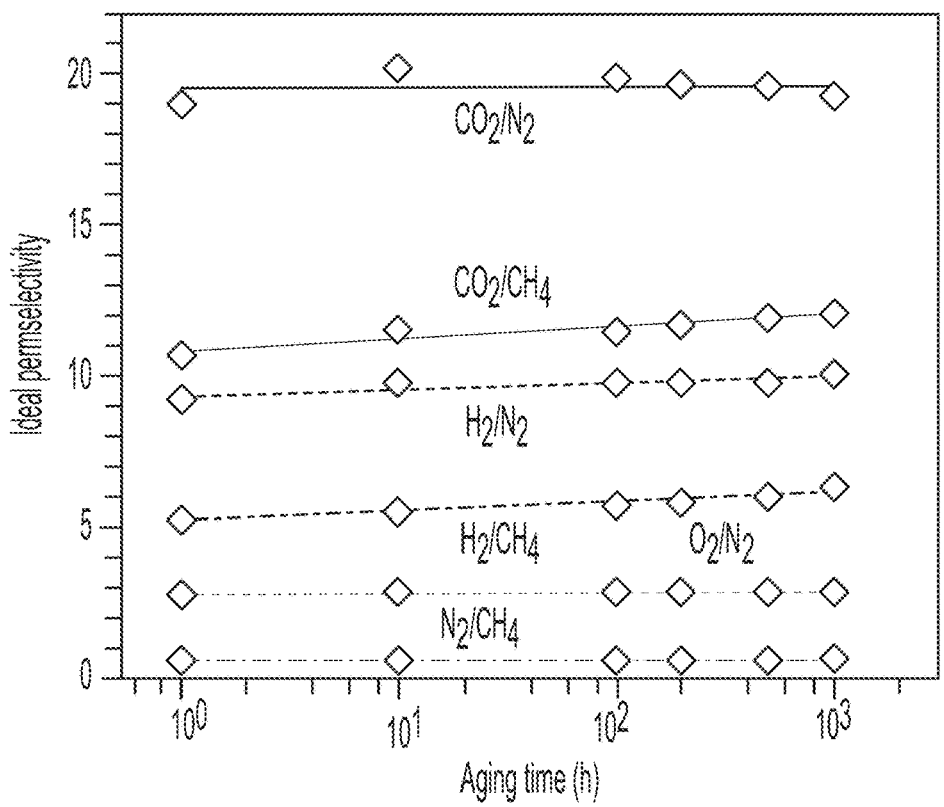
Figure 20C:
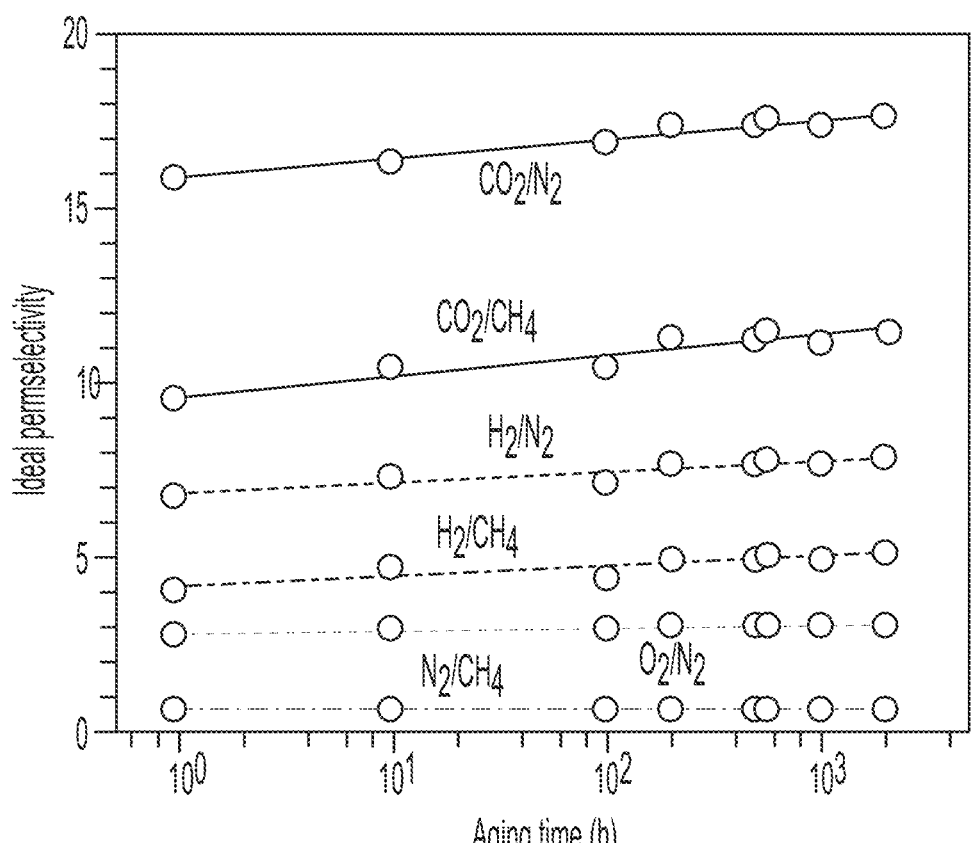

Physical aging is a phenomenon that typically occurs in glassy polymers such as ROMPs and PIMs since they are not in their equilibrium packing configuration at temperatures below their glass transition. As a consequence, the specific volume of the material decreases over time, leading to many property changes. In this study, changes in permeability over time were the primary metric used to glean information on the effects of physical aging of films previously soaked in liquid ethanol. Of note, exposure to ethanol, such as that described below, may further increase excess specific volume in glassy polymers, thereby leading to a more pronounced physical aging rate. For this study, the effects of physical aging were considered on polymers that underwent treatment method (B). A decrease in permeability was experienced over time for each gas tested for both ROMP samples and PIM-1. As shown in FIGS. 19A-19C, an approximately linear trend was observed in double logarithmic charts in which permeability was plotted as a function of the aging time. Similar linear behaviors have been observed by other authors. The decrease in permeability was accompanied by an increase in permselectivity for some of the most relevant gas couples, i.e., $CO_2/N_2$, $CO_2/CH_4$, $H_2/N_2$, $H_2/CH_4$, $O_2/N_2$, and $N_2/CH_4$ (FIGS. 20A-20C). This finding relates to the trade-off between permeability and selectivity described by Robeson. Notably, $CF_3$-ROMP reached the highest permeability for each gas, while OMe-ROMP was the most selective for all gas pairs. As indicated in Table 1, the $CF_3$-ROMP sample used for the physical aging study featured an initial $CO_2$ permeability of 18490 Barrer, a value lower than that of the sample subjected to treatment (A): 21266 Barrer. This is due to the variability among different samples and the longer dynamic vacuum which the less permeable film was exposed to before testing.

The graphs in FIG. 21A reveal that the permeabilities of larger gases decreased more than those of smaller gases as the materials aged. Furthermore, aging rates for each gas followed the same order of the effective diameter ($He<H_2<O_2<CO_2<N_2<CH_4$), as shown in FIG. 21B for $CF_3$-ROMP. The permeability loss that each gas experienced over time was plotted as a function of effective diameter squared, and the slope of this line can be calculated for each set of experiments at each time. FIG. 21C shows that this slope increased over time. Interestingly, the rate by which it evolved was very different among the three materials, and this result is related to the way polymer chains pack over time. In other words, it gave us information about the evolution of the fractional free volume as the polymer transitioned towards its equilibrium density that minimizes the Gibbs free energy of the system. $CF_3$-ROMP showed the highest values of these slopes because small gases (i.e., He, $H_2$, $O_2$) experienced a smaller permeability drop over time compared to OMe-ROMP and PIM-1, while for larger gases (i.e., $CO_2$, $N_2$, $CH_4$) the drop in permeability is comparable (FIG. 21A). This finding reflects on the fact that $H_2/X$ and He/X permselectivity (X=generic other gas), increased remarkably over time without compromising $H_2$ and He permeability, often surpassing the Robeson Upper Bounds (FIGS. 2A-2C). This result was further supported by evidence from WAXS experiments. More details about WAXS is described below.

Figure 22A:
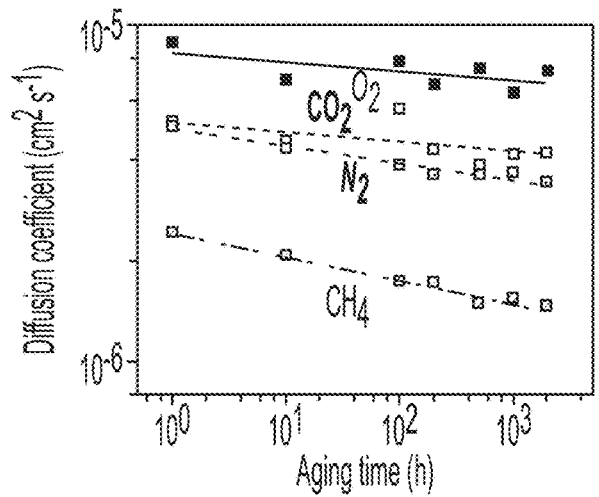
FIGS. 22A-22C show plots of diffusion coefficient as a function of time according to one set of embodiments; Data were collected at 35° C. and 1 bar upstream pressure for a) $CF_3$-ROMP, b) OMe-ROMP, and c) PIM-1.
Figure 22B:
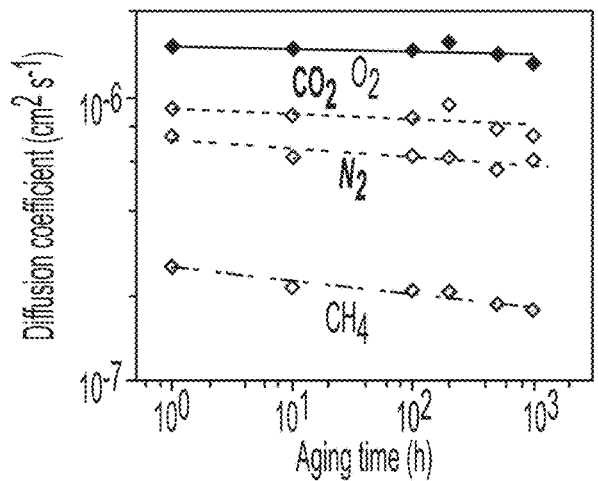
Figure 22C:
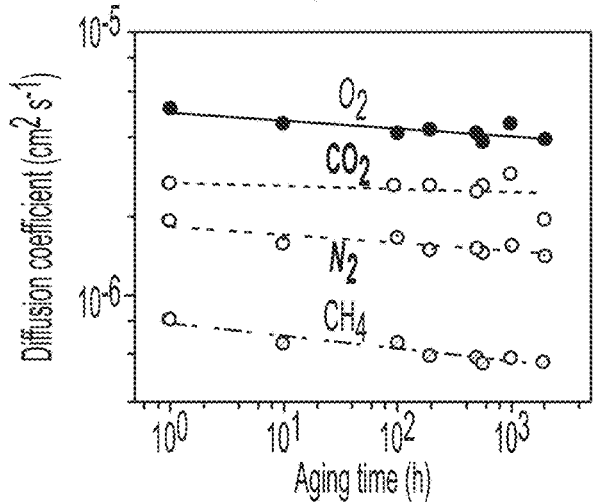
Figure 23A:
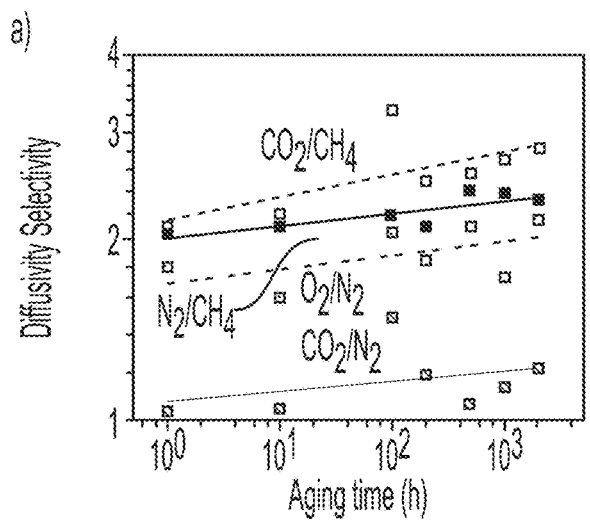
FIGS. 23A-23C show plots of diffusivity selectivity as a function of time, according to one set of embodiments; Data were collected at 35° C. and 1 bar upstream pressure for (FIG. 23A) $CF_3$-ROMP, (FIG. 23B) OMe-ROMP, and (FIG. 23C) PIM-1.
Figure 23B:
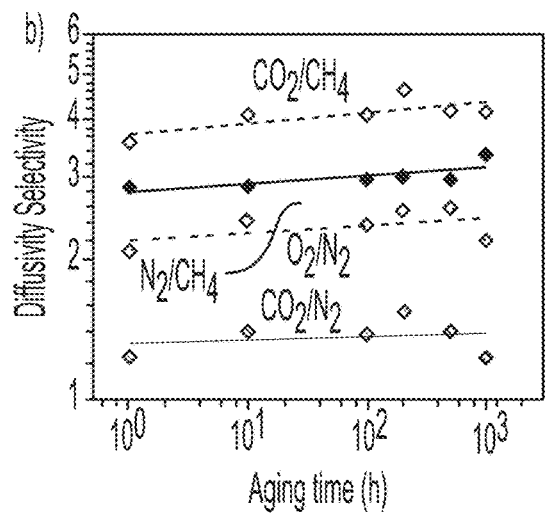
Figure 23C:
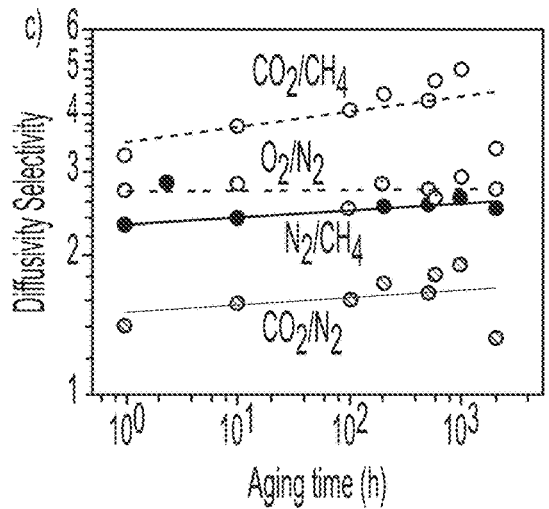
Figure 24A:
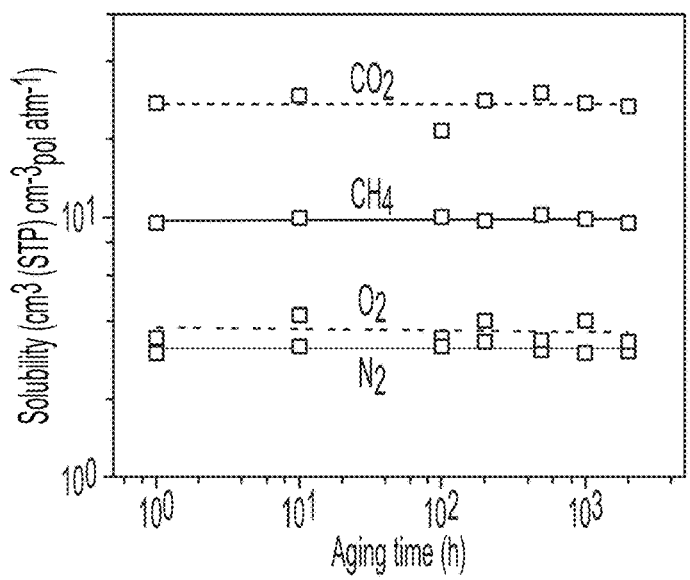
FIGS. 24A-24C show plots of solubility as a function of time, according to one set of embodiments; Data were collected at 35° C. and 1 bar upstream pressure for (FIG. 24A) $CF_3$-ROMP, (FIG. 24B) OMe-ROMP, and (FIG. 24C) PIM-1.
Figure 24B:
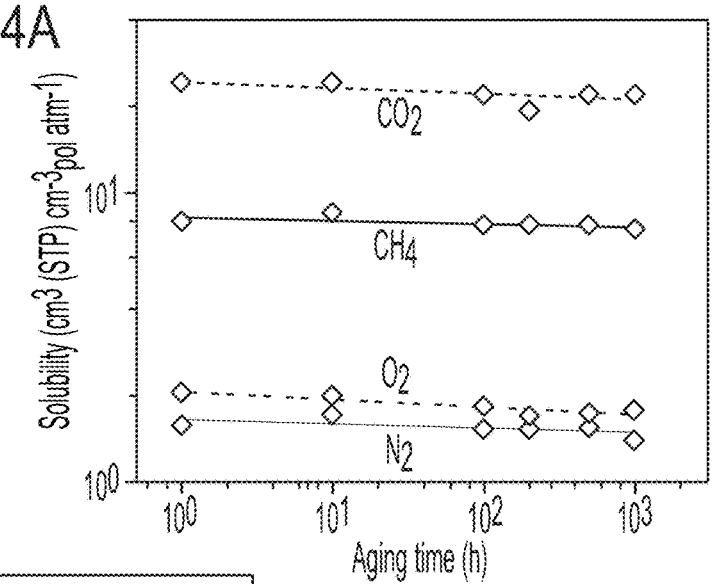
Figure 24C:
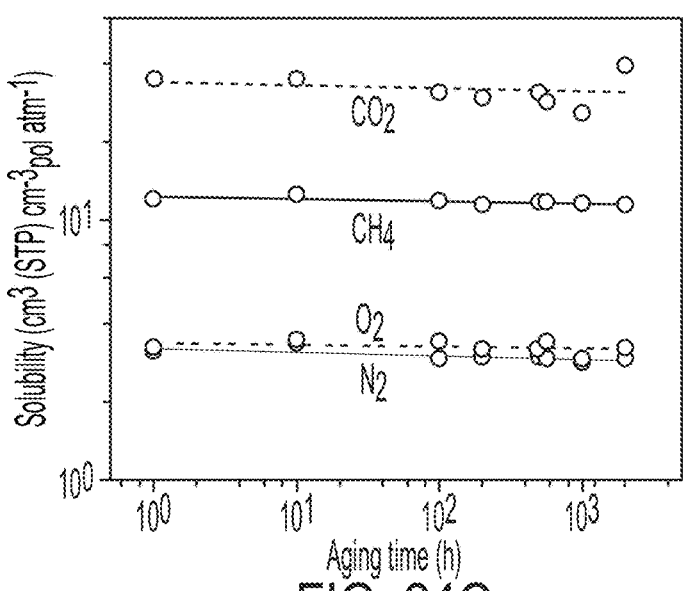
Figure 25A:
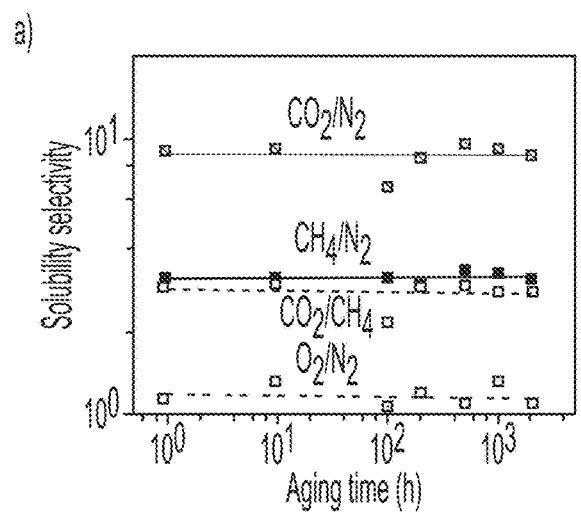
FIGS. 25A-25C show plots of solubility selectivity as a function of time, according to one set of embodiments; Data were collected at 35° C. and 1 bar upstream pressure for (FIG. 25A) $CF_3$-ROMP, (FIG. 25B) OMe-ROMP, and (FIG. 25C) PIM-1.
Figure 25B:
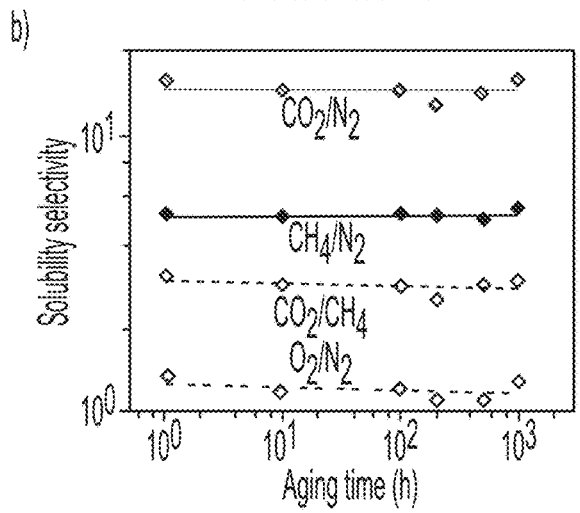
Figure 25C:
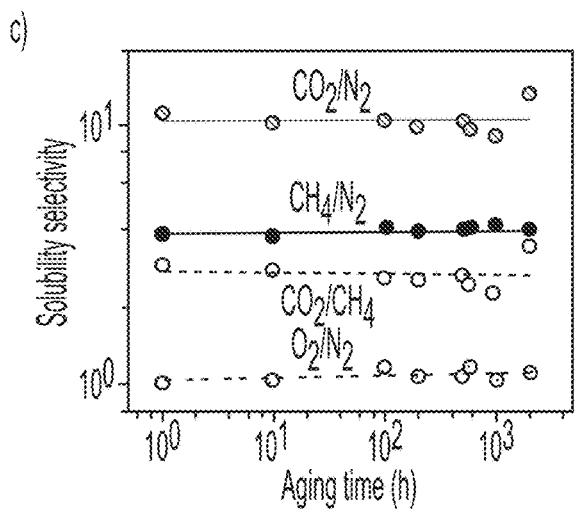

Diffusivity coefficients were monitored while films aged over time, and results are shown in FIGS. 22A-22C. He and $H_2$ values are not represented in the figures because the time-lag was too short for accurate calculations. Diffusion coefficients decreased according to what was expected from aging experiments. These changes contribute to the overall decrease in permeability. For ROMP polymers, the magnitude of diffusivity values, follows the inverse order of the effective diameter: (3.44 Å) $O_2$<(3.63 Å) $CO_2$<(3.66 Å) $N_2$<(3.81 Å) $CH_4$. Diffusivity selectivity increased over time, as shown in FIGS. 23A-23C, and this change is the biggest contribution to the increase in permselectivity that allows these ROMPs to overcome the upper bound for some gas pairs. OMe-ROMP showed diffusivity selectivity higher than PIM-1 for $CO_2/CH_4$ and $N_2/CH_4$ separation.

Solubility coefficients and solubility selectivity were also calculated to evaluate their trend over time using a reverse formula of Equation (S2):

$$S = \frac{P}{D} \qquad \text{Equation (S5)}$$

Solubility and solubility selectivity values appear to oscillate around an approximate average value over time, as seen in FIGS. 24A-24C and FIGS. 25A-25C, respectively. $CF_3$-ROMP and PIM-1 showed similar results for solubility selectivity, while OMe-ROMP recorded higher values of $CO_2/N_2$ and $CH_4/N_2$.

9. Wide-Angle X-Ray Scattering (WAXS) Study

Physical aging was also monitored by Wide-angle X-ray scattering. X-ray scattering methods are suitable for studying internal structural changes of $CF_3$-ROMP, OMe-ROMP, and PIM-1 because of their high fractional free volume and relevant pore-size distribution. For WAXS, d (Bragg spacing) and q (scattering vector) are correlated as follows:

$$d = \frac{2\pi}{q} \qquad \text{Equation (S6)}$$

It is important to note that these WAXS experiments were performed in conjunction with gas permeation experiments during the course of 2000 h on samples from the same film, so the aging history was identical and results could be directly correlated. The same sample was used for WAXS throughout the entire 2000 h so the scattering intensity can be compared on a relative-basis. FIGS. 26A-26C show that $CF_3$-ROMP (a) is the polymer that experienced less aging in internal free volume, especially in the range where q is larger than 1 Å$^{-1}$ (d-spacing<3.14 Å), which means smaller pores were preserved over time after soaking in liquid ethanol. This result is consistent with the fact that smaller gases (e.g., He and $H_2$) showed slower physical aging rates (FIG. 21A) and correlates with the different rates in permeability drop (FIGS. 21B-21C).

Conversely, OMe-ROMP (b) and PIM-1 (c) showed a larger decrease in the absolute scattering intensity across all ranges of pore size (0.1 Å$^{-1}$<q<2 Å$^{-1}$), which supports our findings that these polymers possess faster aging rates for small gases (e.g., He and $H_2$) and similar aging rates for larger gases (e.g., $N_2$ and $CH_4$) compared to $CF_3$-ROMP. The contraction of larger pores has a much larger impact on the transport of larger gas molecules compared to smaller ones.

10. $CO_2$-Induced Plasticization Study

Figure 27:
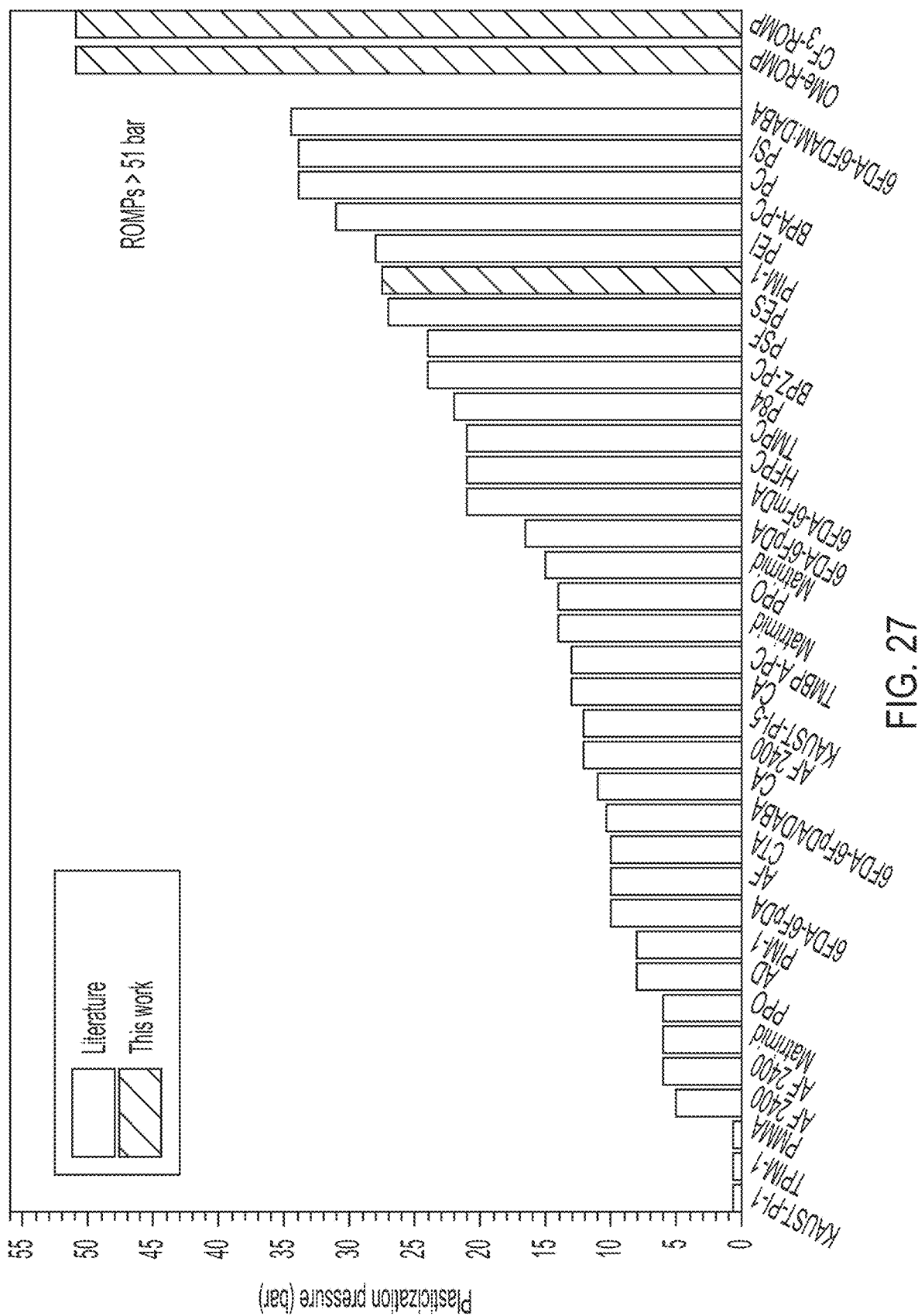
FIG. 27 is a plot showing a Collection of $CO_2$-induced plasticization pressure results obtained for uncrosslinked polymers in pure-gas conditions from the literature (gray bars), and comparison with polymers investigated in this study (red bars), according to one set of embodiments.

Plasticization is a frequently investigated phenomenon in the field of membrane science. It is typically recognized through a decrease in glass transition temperature and an increase in gas permeability as the upstream pressure increases. Plasticization is especially relevant when operating with high pressure feed streams (e.g., natural gas processing). Among the gases investigated in this study, $CO_2$ is the only quadrupolar gas and it has the highest critical temperature. For these reasons, separate permeation experiments were performed with $CO_2$ pressures up to 17, 20.5, 25, and 51 bar. One of the most undesirable consequences of plasticization is a significant reduction in membrane mixed-gas selectivity. It is important to determine the extent to which materials can resist plasticization to ensure steady and reliable performance even when plasticizing agents are present in high concentrations. The ROMP samples and PIM-1 plasticization performance can be compared with results previously obtained in the literature at different conditions. Since plasticization pressure usually decreases with increasing thickness, a direct comparison can be made just among thick films. Table 2 contains a broad collection of $CO_2$-induced plasticization data. $CO_2$ permeability from the first point of the plasticization curve, which usually was taken at an upstream pressure between 1 and 2 bar, is reported to give a sense of the performance of different polymers, which ranges over 4 orders of magnitude. The so-called plasticization pressure is a parameter that is commonly considered to compare the plasticization resistance of polymers. Polymers that showed a plasticization point are compared in FIG. 27. Excluded from this figure, but included in Table 2, is data for a crosslinked Matrimid® film (treated at 350° C. for 30 minutes), which shows no plasticization pressure point up to 44 bar and a steady high-pressure plateau in permeability of 3.5 Barrer. For non-crosslinked polymers, polysulfone (PSf) and polycarbonate (PC) had the highest plasticization pressures. For a PSf thick film, the plasticization pressure point was ~34 bar, and for a PSf thin film, the plasticization pressure point was ~24 bar, while for a PC thick film it was ~34 bar. However, $CF_3$-ROMP and OMe-ROMP are the only polymers whose permeabilities exhibit continuously decreasing values after reaching 51 bar of $CO_2$. $CF_3$-ROMP and OMe-ROMP results described in the main paper show unprecedented results.

TABLE 2

$CO_2$ plasticization pressure in glassy polymers from this work (bold) and from the literature.

| Polymer | $CO_2$ Permeability @ 1-2 bar (Barrer) | Peculiarities (treatment, thickness) | Plasticization pressure |
|---|---|---|---|
| $CF_3$-ROMP | 14477 | 119 μm, ethanol treatment, 2100 h aged | >51 bar |
| OMe-ROMP | 1425 | 153 μm, ethanol treatment, 300 h aged | >51 bar |
| PIM-1 | 10558 | 119 μm, ethanol treatment, 2000 h aged | ~27.5 bar |
| 6FDA-6FmDA | 5.5 | | ~21 atm |
| 6FDA-6FpDA | 75.5 | | ~10 atm |
| 6FDA-6FpDA | 78 | | ~16.5 bar |
| 6FDA-6FpDA/DABA 2:1 | 47 | Uncrosslinked | ~10.3 bar |
| 6FDA-DAM:DABA 2:1 | | Rapid quench from Tg + 15° C. | ~34.5 bar |
| AD 60 | 400 | Annealed above Tg, 335 nm | ~8 bar |
| AF 2400 | 2400 | As-cast, 258 nm | ~12 bar |
| AF 2400 | 3800 | Annealed above Tg, 17 μm | ~10 bar |
| BPA-PC | 7.5 | | ~31 bar |
| BPZ-PC | 2.5 | | ~24 bar |
| C-CoPIM-TB-1 | 5400 | Pure-gas and 50/50 $CO_2/CH_4$ | >20 atm |
| C-CoPIM-TB-2 | 4200 | Pure-gas and 50/50 $CO_2/CH_4$ | >20 atm |
| CA | 6.5-9 | | 11-13 bar |
| CTA | 8 | | ~10 bar |
| HFPC | 34 | | ~21 bar |
| KAUST-PI-1 | 2400 | Pure-gas and 50/50 $CO_2/CH_4$ | <2 bar |
| KAUST-PI-5 | 1500 | Pure-gas and 50/50 $CO_2/CH_4$ | ~12 bar |
| Matrimid | 9 | 182 nm | ~6 atm |
| Matrimid | 9.2 | 20 μm | ~14 atm |
| Matrimid | 5 | Crosslinked, 30' at 350° C. | >44 bar |
| P84 | 1 | | ~22 bar |
| PC | 7.5 | 127 μm | ~34 bar |
| PEI | 1 | | ~28 bar |
| PES | 3.4 | | ~27 bar |
| PIM-1 | 450 | 200 nm | <2 bar |
| PIM-1 | 10600 | 30 μm | ~8 bar |
| PIM-1 | 5500-5600 | 50-102 μm | >10 bar |
| PIM-Trip-TB | 8400 | Pure-gas and 50/50 $CO_2/CH_4$ | >20 atm |
| PMMA | 0.5 | | <2 bar |
| PPO | 95 | 18-45 μm | ~14 bar |
| PPO | 41.5 | 192 nm | ~6 bar |

TABLE 2-continued

CO$_2$ plasticization pressure in glassy polymers from this work (bold) and from the literature.

| Polymer | CO$_2$ Permeability @ 1-2 bar (Barrer) | Peculiarities (treatment, thickness) | Plasticization pressure |
|---|---|---|---|
| PSf | 4.7 | 18-45 μm | ~34 bar |
| PSf | 9.2 | 191 nm | ~24 bar |
| PTMSP | 35500 | 115 μm | >28 atm |
| TMBPA-PC | 15 | | ~13 bar |
| TMPC | 22.5 | | ~21 bar |
| TPIM-1 | 1500 | Pure-gas and 50/50 CO$_2$/CH$_4$ | <2 bar |
| TPIM-2 | 450 | Pure-gas and 50/50 CO$_2$/CH$_4$ | N/A, constant profile up to 15 bar |

Figure 28A:
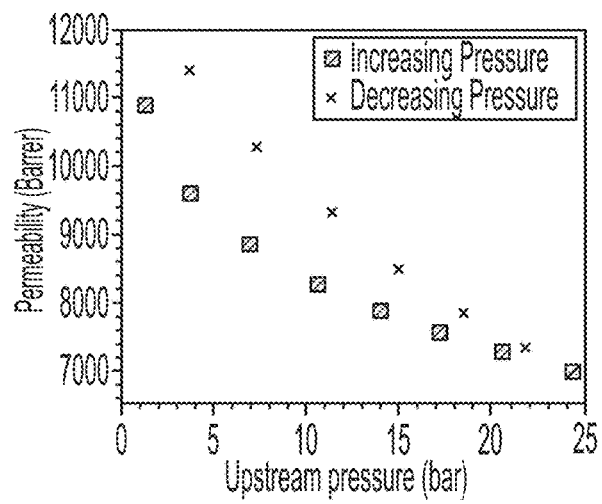
FIGS. 28A-28C show plots of a $CO_2$ plasticization study, according to one set of embodiments, with (FIG. 28A) $CF_3$-ROMP, treatment (D), tested up to 24 bar, 90 h aged, (FIG. 28B) $CF_3$-ROMP, treatment (E), tested up to 17 bar, 48 h aged, and (FIG. 28C) OMe-ROMP, treatment (E), tested up to 20.5 bar, 60 h aged.
Figure 28B:
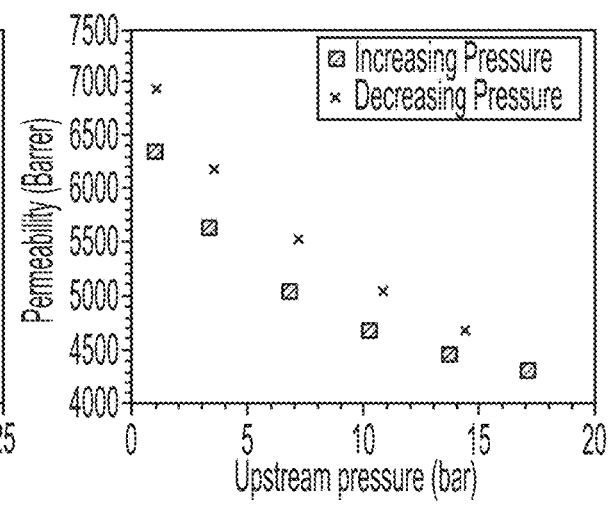
Figure 28C:
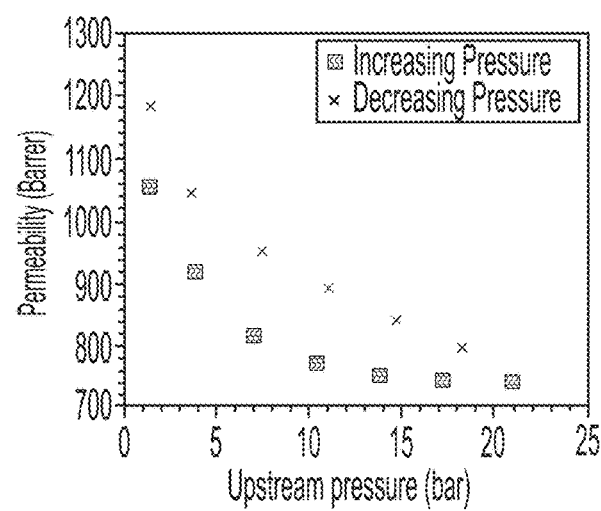

CO$_2$-induced plasticization curves obtained with a maximum pressure lower than 51 bar are shown in FIGS. 28A-28C. The duration of each experiment in the increasing pressure stage (filled markers) was 12 minutes and 15 minutes for CF$_3$-ROMP and OMe-ROMP, respectively, and 18 minutes and 21 minutes for CF$_3$-ROMP and OMe-ROMP, respectively, in the decreasing pressure stage (hysteresis), to ensure that pseudo-steady state was reached to calculate permeability.

Considering the high upstream pressures reached during CO$_2$-induced plasticization experiments, it is important to correct for the non-ideal behavior of CO$_2$. Permeability can be calculated modifying Equation (S1) by using fugacity, f, instead of pressure, as indicated in Equation (S7):

$$\mathcal{P}' = \frac{V}{RT} \frac{l}{A} \frac{1}{(f_u - f_d)} \left(\frac{df_d}{dt}\right) \quad \text{Equation (S7)}$$

The fugacity was calculated by means of Peng-Robinson Equation of State. FIGS. 29A-29C shows the results reported in the main communication, recalculated on a fugacity-based fashion. The permeability of CF$_3$-ROMP revealed to be decreasing with fugacity up to 40 bar, the whole range investigated, while OMe-ROMP showed a minimum at around 10 bar that was not experienced when permeability was calculated based on pressure instead of fugacity (FIG. 4A). PIM-1 results, instead, confirmed that a minimum value of permeability was obtained at a fugacity of ~21 bar.

11. Mixed-Gas Permeation

Mixed-gas permeation measurements of CO$_2$/CH$_4$ were carried out with CF$_3$-ROMP, the most permeable polymer in this study that also showed unprecedented plasticization resistance, using a 50/50 vol. % CO$_2$/CH$_4$ mixture. Mixed-gas feed pressures of 1 and 2 bar were tested, thus 0.5 and 1 bar or partial pressure of CO$_2$, respectively. A gas chromatograph (GC) (INFICON 3000 Micro GC) was used in order to measure the concentration of gas in the feed, residue, and permeate streams. A hold time of 30 minutes was found to be sufficient to reach steady state by monitoring the concentration of the permeate stream over time until a constant composition was reached. This is due to the very high diffusion coefficients of CF$_3$-ROMP as measured in pure-gas permeation studies (FIGS. 17A-17B and Table 1). Additionally, helium was used as a carrier gas to sweep permeate from the membrane surface. The following Equation S8 was used to calculate the mixed-gas permeability, $\mathcal{P}_A$:

$$\mathcal{P}_A = \frac{x_A^P F l}{x_{He}^P A (p_2 x_A^F - p_1 x_A^P)} \quad \text{Equation (S8)}$$

in which $x_A^P$ is the mole fraction of gas A in the permeate stream, F is the sweep gas flow rate, t is the thickness of the membrane, $x_{He}^P$ is the mole fraction of helium in the permeate stream, A is the area of membrane exposed to the gas stream, $x_A^F$ is the mole fraction of gas A in the feed stream, and p$_2$ and p$_1$ are the upstream and downstream total pressures, respectively.

Three different treatment conditions for CF$_3$-ROMP were tested to examine their effects on mixed-gas transport properties:

(E) As reported below;
(F) Vacuum drying at room temperature for 24 h;
(G) Soaking in liquid ethanol for 36 h, air-drying for 48 h, and full vacuum at room temperature for 4 h;

Table 3 summarizes results obtained from these three treatment methods for a 50/50 vol. % CO$_2$/CH$_4$ mixture at the feed pressures mentioned above. Pure CO$_2$ and CH$_4$ measurements were also conducted at 1 bar using the above described technique for the mixed-gas experiments. These tests can be directly compared to 50/50 vol. % mixed-gas permeability experiments performed at 2 bar, so that the partial pressure of each gas is 1 bar in both pure- and mixed-gas conditions.

TABLE 3

CO$_2$ and CH$_4$ permeability values for CF$_3$-ROMP with different treatment conditions: (E) Thermal treatment at 120° C. for 24 h and applying dynamic vacuum, (F) vacuum drying at room temperature for 24 h, and (G) soaking in liquid ethanol for 36 h, air-drying for 48 h, and full vacuum at room temperature for 4 h. Feed pressure is reported in bar, and permeability ($\mathcal{P}_x$) is reported in Barrer (10$^{-10}$ cm$^3$(STP) cm cm$^{-2}$ s$^{-1}$ cmHg$^{-1}$). All data were calculated at 35° C.

| Mixture Composition | Treatment | Feed Pressure (bar) | $\mathcal{P}_{CH_4}$ | $\mathcal{P}_{CO_2}$ |
|---|---|---|---|---|
| Pure-Gas | (E) | 1 | 644 | 6377 |
| | (F) | 1 | 1086 | 8867 |
| | (G) | 1 | 2368 | 13418 |
| 50/50 vol. % CO$_2$/CH$_4$ | (E) | 1 | 598 | 6373 |
| | | 2 | 779 | 7063 |
| | (F) | 1 | 1005 | 9925 |
| | | 2 | 1151 | 9266 |
| | (G) | 1 | 2279 | 15707 |
| | | 2 | 2183 | 15036 |

Figure 30A:
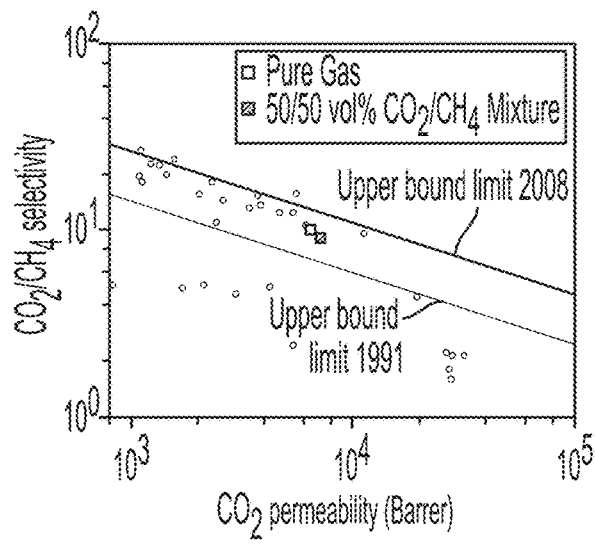
FIGS. 30A-30C show $CO_2/CH_4$ Robeson plots for $CF_3$-ROMP films undergoing three different treatments.
Figure 30B:
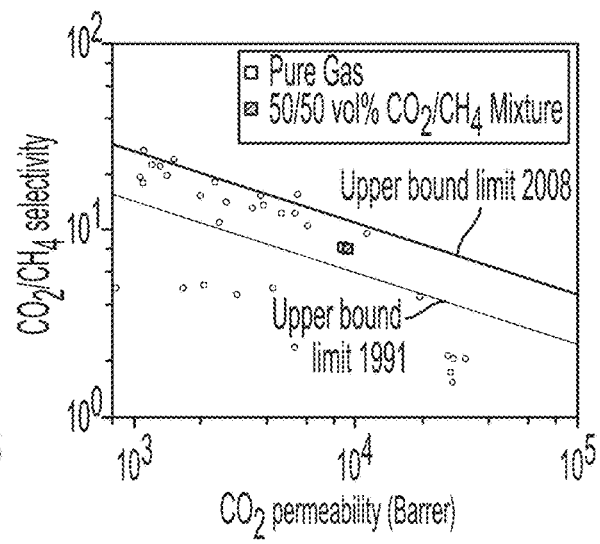
Figure 30C:
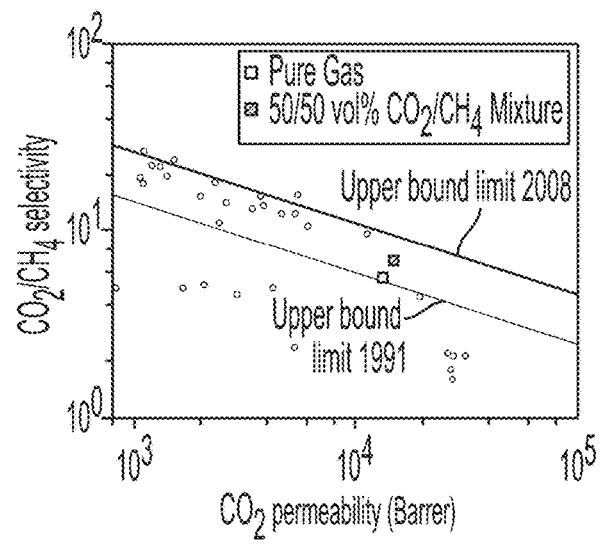

$CO_2/CH_4$ Robeson plots for both pure-gas and 50/50 vol. % $CO_2/CH_4$ mixtures at a $CO_2$ partial pressure of 1 bar are shown below in FIGS. 30A-30C. From the Robeson plots, there appears to be a systematic, albeit small, increase in permeability from the pure-gas case to the mixed-gas case. In FIG. 30C, which depicts the performance of $CF_3$-ROMP that underwent treatment (G), an increase in the separation factor of around 21.5% is also recorded from the pure-gas case to the mixed-gas case. This may be due to an increase in $CO_2/CH_4$ solubility-selectivity, due to the fact that the more condensable gas, $CO_2$, tends to exclude $CH_4$ from the polymer matrix. The plasticization-resistant nature of $CF_3$-ROMP reduces the swelling induced by $CO_2$, possibly preventing a significant increase of the $CH_4$ diffusion coefficient that would be observed otherwise. This would reduce the decrease in $CO_2/CH_4$ diffusivity-selectivity generally experienced from the pure-gas case to the mixed-gas case. Thus, the increase in solubility-selectivity may outweigh the decrease in diffusivity-selectivity, leading to the overall increase in the $CO_2/CH_4$ permselectivity. This result seems to be emphasized by the ethanol treatment.

Table 4 contains $CO_2/CH_4$ permselectivities reported in literature for various polymers during mixed-gas experiments. Feed pressures and temperatures are also reported, as well as treatment methods, if applicable. At a feed pressure of 2 bar, the ideal $CO_2/CH_4$ permselectivity of PIM-1 was reported to be 16, while that of AO-PIM-1 was reported to be 34. When exposed to a equimolar $CO_2/CH_4$ mixture with a $CO_2$ partial pressure of 2 bar, the $CO_2/CH_4$ permselectivities of PIM-1 and AO-PIM-1 decreased to 12 and 24, respectively. A similar decrease in $CO_2/CH_4$ permselectivity from the pure-gas case with feed pressures of 2 bar to the mixed-gas case with a $CO_2$ partial pressure of 2 bar and an equimolar $CO_2/CH_4$ mixture feed was observed with TPIM-1 (31 to ~30) and 6FDA-DAP (92 to ~87). However, the $CO_2/CH_4$ permselectivity of TPIM-2 slightly increased from the pure-gas case to the mixed-gas case (21 to ~23). TPIM-2 was reported to have high plasticization resistance, as the $CH_4$ permeability increased by less than 10% from the pure-gas case to the mixed-gas case. Similarly, the $CH_4$ permeability in the mixed-gas case for the plasticization-resistant $CF_3$-ROMP was around 6% higher than the pure-gas value at a $CH_4$ partial pressure of 1 bar for sample (F), while for the sample that underwent treatment (G), it revealed to be around 8% smaller. As a consequence, the latter film experienced a $CO_2/CH_4$ permselectivity increased up to around 21.5%. A similar increased in mixed-gas permselectivity was experienced before by HAB-6FDA and its thermally rearranged analogous.

TABLE 4

$CO_2$ plasticization pressure in glassy polymers from this work (bold) and from the literature. Feed pressure is reported in bar, temperature is reported in ° C., while permeability ($\mathcal{P}_X$) is reported in Barrer ($10^{-10}$ $cm^3$(STP) cm $cm^{-2}$ $s^{-1}$ $cmHg^{-1}$).

| Polymer | $CO_2/CH_4$ Mixture Composition | Feed Pressure (bar) | Temperature | Treatment Method | % $\alpha_{CO_2/CH_4}$ change[a] |
|---|---|---|---|---|---|
| $CF_3$-ROMP | 50/50 | 2 | 35 | Soaking in liquid ethanol for 36 h, air-drying for 48 h, and full vacuum at room temperature for 4 h; | +22% |
| PIM-1 | 50/50 | 4 | 35 | Drying at 45° C. for 2 days, soaking in liquid methanol for 24 h, air-drying, and heating at 120° C. for 24 h under high vacuum | −25% |
| AO-PIM-1 | 50/50 | 4 | 35 | Drying at 45° C. for 2 days, soaking in liquid methanol for 24 h, air-drying, and heating at 120° C. for 24 h under high vacuum | −29% |
| PIM-1 | 50/50 | 4 | 35 | Drying at 120° C. under vacuum for 12 h, soaking in liquid methanol for 24 h, and drying at 120° C. under vacuum for 24 h | −13% |
| TPIM-1 | 50/50 | 4 | 35 | Drying at 120° C. under vacuum for 12 h, soaking in liquid methanol for 24 h, and drying at 120° C. under vacuum for 24 h | −6% |
| TPIM-2 | 50/50 | 4 | 35 | Drying at 120° C. under vacuum for 12 h, soaking in liquid methanol for 24 h, and drying at 120° C. under vacuum for 24 h | +14% |

TABLE 4-continued $CO_2$ plasticization pressure in glassy polymers from this work (bold) and from the literature. Feed pressure is reported in bar, temperature is reported in °C., while permeability ($\mathcal{F}_X$) is reported in Barrer ($10^{-10}$ cm$^3$(STP) cm cm$^{-2}$ s$^{-1}$ cmHg$^{-1}$).

| Polymer | $CO_2/CH_4$ Mixture Composition | Feed Pressure (bar) | Temperature | Treatment Method | % $\alpha_{CO_2/CH_4}$ change[a] |
|---|---|---|---|---|---|
| TZPIM-2 | 50/50 or 80/20 | ~4 | 25 | Soaking in liquid methanol and drying at 120° C. in vacuum oven for 24 h. | −7.6 |
| 6FDA-mPDA | 50/50 | ~4 | 35 | Soaking in liquid methanol for 12 h, air-drying, and drying at 120° C. in a vacuum oven for 24 h | +1% |
| 6FDA-DAP | 50/50 | ~4 | 35 | Drying at 120° C. and post-drying at 200° C. in a vacuum oven for 24 h | −3% |
| 6FDA-DAR | 50/50 | ~4 | 35 | Drying at 120° C. and post-drying at 200° C. in a vacuum oven for 24 h | −1% |
| HAB-6FDA | 50/50 | ~4 | 35 | Drying at 80° C. under partial vacuum for 24 h and post-drying at 200° C. under full vacuum for 24 h | +26% |
| TR450 | 50/50 | ~4 | 35 | HAB-6FDA films heated under flowing $N_2$ at 300° C. for 1 h and at 450° C. for 1 h. | +20% |

[a]This column refers to the percentage difference between $CO_2/CH_4$ permselectivity from the pure-gas to the mixed-gas case.

$CO_2/CH_4$ permselectivity generally decreased as feed pressure was increased. While competitive sorption can result in a lower $CO_2$ permeability, plasticization of the polymer when exposed to higher pressures can lead to an increase in $CH_4$ permeability, which collectively can decrease the $CO_2/CH_4$ permselectivity. When increasing the feed pressure from 4 bar to 20 bar, PIM-1 was shown to have a mixed-gas $CO_2/CH_4$ permselectivity that decreased by approximately 38%, while the $CO_2/CH_4$ permselectivity of AO-PIM-1 decreased by only 13%. The polyimide 6FDA-mPDA experienced a $CO_2/CH_4$ permselectivity drop of 40% as feed pressure was increased from ~4 to ~40 bar, while the $CO_2/CH_4$ permselectivities of hydroxyl-functionalized polyimides 6FDA-DAP and 6FDA-DAR decreased by approximately 30% across the same feed pressure range. Similar results were recorded for HAB-6FDA and TR polymers. The unprecedented plasticization results of $CF_3$-ROMP may indicate that its $CO_2/CH_4$ permselectivity will not significantly change as the feed pressure increases. Future mixed-gas studies on both $CF_3$-ROMP and OMe-ROMP will be conducted in order to evaluate their performance and potential in realistic industrial conditions.

12. Mechanical Properties

Figure 31A:
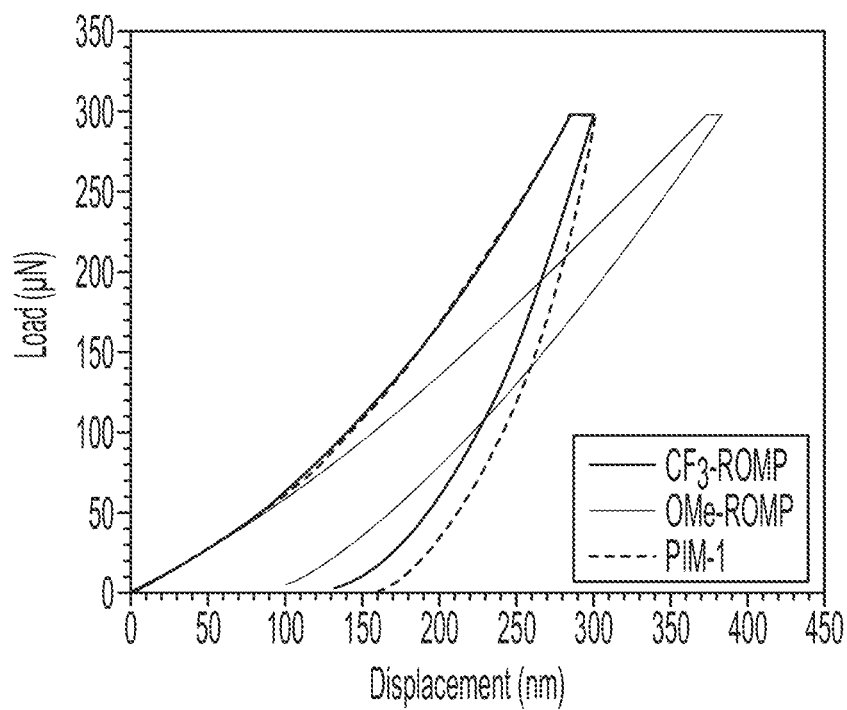
FIG. 31A shows a plot of a Load-displacement relationship for $CF_3$-ROMP, OMe-ROMP, and PIM-1, according to one set of embodiments.
Figure 31B:
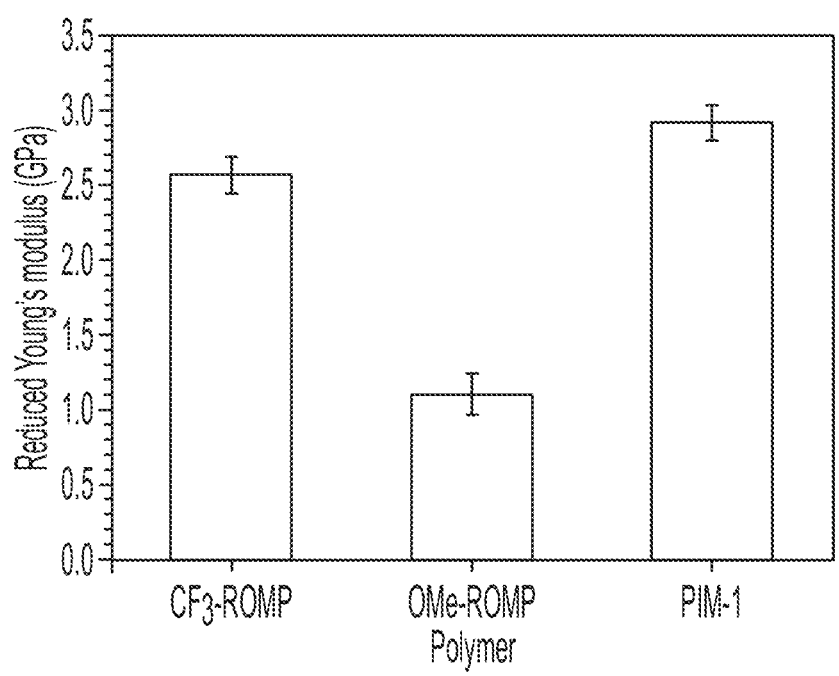
FIG. 31B shows a plot of reduced Young's modulus for $CF_3$-ROMP, OMe-ROMP, and PIM-1, according to one set of embodiments.

Due to the brittleness of $CF_3$-ROMP and OMe-ROMP, polymer films fractured during the clamping process of dynamic mechanical analysis (DMA), which rendered the measurements not possible. Instead, the reduced Young's modulus ($E_r$) of $CF_3$-ROMP, OMe-ROMP, and PIM-1 was measured using nanoindentation. Corresponding data is shown below (FIGS. 31A and 31B). While $CF_3$-ROMP has a larger $E_r$ than OMe-ROMP, both of them lie in the GPa range, which is on par with most polymers of intrinsic microporosity (e.g., 2.9 GPa for PIM-1). Differences between $CF_3$-ROMP and OMe-ROMP might be due to different packing states of rigid side chains attached to the polymer backbone.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/ or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape and/or geometric relationship of or between, for example, one or more articles, structures, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; surface and/or bulk material properties and/or spatial/temporal resolution and/or distribution—such as, smooth, reflective, transparent, clear, opaque, rigid, flexible, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, to an extent typically achievable and achieved for the recited fabrication technique as would be understood by those skilled in the art or as specifically described.

What is claimed is:

1. A membrane configured for separation, the membrane comprising a composition, the composition comprising:
   a flexible polymer backbone; and
   a plurality of rigid side chains associated with the flexible polymer backbone, each rigid side chain comprising a bridged bicyclic-based compound comprising two or more [2.2.2] bicyclic cores,
   wherein the composition is porous,
   wherein the membrane has a thickness of less than or equal to 180 microns.

2. A membrane as in claim 1, wherein the membrane exhibits a $CO_2$ plasticization pressure of greater than or equal to 50 bar.

3. A membrane as in claim 1, wherein the membrane resists plasticization by $CO_2$ at pressures up to 51 bar.

4. A membrane as in claim 1, wherein the membrane has a gas permeability to $CO_2$ of greater than or equal to 20000 Barrer.

5. A membrane as in claim 1, wherein the membrane has a gas permeability to $H_2$ of greater than or equal to 8000 Barrer.

6. A membrane as in claim 1, wherein the composition has a BET internal surface area of greater than or equal to 100 $m^2 g^{-1}$.

7. A membrane as in claim 1, wherein at least a portion of pores present in the membrane have a pore size of greater than or equal to 40 nm.

8. A membrane as in claim 1, wherein the flexible polymer backbone comprises poly(norbenzene).

9. A membrane as in claim 1, wherein at least one of the two or more [2.2.2] bicyclic cores has the following structure:

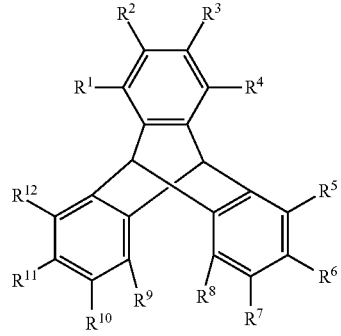

wherein:
R¹-R¹² are the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or, any two adjacent groups of R¹-R¹² are joined together to form an optionally substituted ring.

10. A membrane as in claim 1, wherein the bridged bicyclic-based compound is an oligoiptycene.

11. A membrane as in claim 1, wherein the bridged bicyclic-based compound has a structure as in:

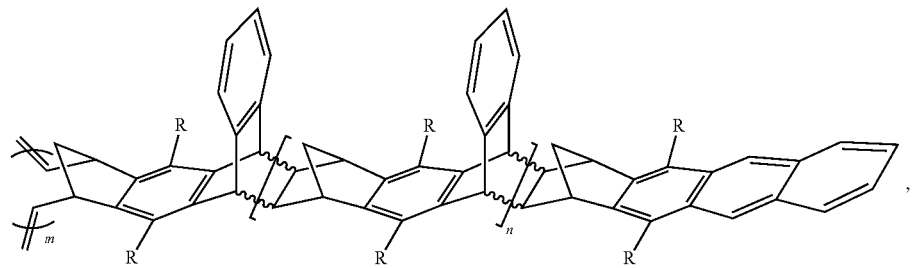

wherein:
each R is the same or different and are hydrogen, halo, hydroxyl, amino, alkyl, heteroalkyl, alkenyl, alkynyl, aryl, heteroaryl, heterocyclyl, or a carbonyl group, any of which is optionally substituted, or is joined together to form an optionally substituted ring,
m is an integer and is at least 1, and
n is an integer and is at least 1.

12. A membrane as in claim 11, wherein each R is $CF_3$ or OMe.

* * * * *